(12) United States Patent
Lyons et al.

(10) Patent No.: US 6,970,591 B1
(45) Date of Patent: Nov. 29, 2005

(54) IMAGE PROCESSING APPARATUS

(75) Inventors: Alexander Ralph Lyons, Guildford (GB); Adam Michael Baumberg, Guildford (GB)

(73) Assignee: Canon Kabushiki Kaisha, Tokyo (JP)

( * ) Notice: Subject to any disclaimer, the term of this patent is extended or adjusted under 35 U.S.C. 154(b) by 741 days.

(21) Appl. No.: 09/718,405

(22) Filed: Nov. 24, 2000

(30) Foreign Application Priority Data

| Nov. 25, 1999 | (GB) | 9927875 |
| Nov. 25, 1999 | (GB) | 9927876 |
| Aug. 3, 2000 | (GB) | 0019081 |
| Aug. 3, 2000 | (GB) | 0019122 |

(51) Int. Cl.$^7$ ............................................. G06K 9/00
(52) U.S. Cl. ..................... 382/154; 382/285; 345/419; 356/12; 348/42
(58) Field of Search ............................... 382/154, 181, 382/285, 208, 217, 294; 345/419–427; 356/12–14; 348/42–60; 359/462–477; 352/57–65; 33/20.4; 353/7–9; 378/41–42; 396/324–331

(56) References Cited

U.S. PATENT DOCUMENTS

| 5,511,153 | A |   | 4/1996 | Azarbayejani et al. ...... 395/119 |
| 5,850,469 | A | * | 12/1998 | Martin et al. ............... 382/154 |
| 5,870,099 | A | * | 2/1999 | Horii et al. ................. 345/427 |
| 6,044,181 | A |   | 3/2000 | Szeliski et al. ............. 382/284 |
| 6,278,798 | B1 | * | 8/2001 | Rao ........................... 382/154 |
| 6,297,825 | B1 | * | 10/2001 | Madden et al. ............. 345/419 |
| 6,348,918 | B1 | * | 2/2002 | Szeliski et al. ............. 345/419 |
| 6,515,099 | B2 |   | 2/2003 | Sato et al. .................. 528/310 |

(Continued)

FOREIGN PATENT DOCUMENTS

| EP | 0680014 | 11/1995 | ............. G06T/7/00 |
| EP | 0707288 | 4/1996 | ........... G06T/15/10 |
| EP | 0895192 | 2/1999 | ........... G06T/11/00 |
| EP | 0898245 | 2/1999 | ............. G06T/7/00 |
| EP | 0901105 | 3/1999 | ............. G06T/7/00 |
| EP | 0902395 | 3/1999 | ............. G06T/7/00 |
| GB | 2353659 | 2/2001 | ........... G06T/15/20 |

OTHER PUBLICATIONS

U.S. Appl. No. 09/718,342, filed Nov. 24, 2000.
U.S. Appl. No. 09/718,343, filed Nov. 24, 2000.

(Continued)

*Primary Examiner*—Bhavesh M. Mehta
*Assistant Examiner*—Aaron Carter
(74) *Attorney, Agent, or Firm*—Fitzpatrick, Cella, Harper & Scinto

(57) ABSTRACT

In an image processing apparatus 20 an input sequence 130 of video images is processed to determine the different positions and orientations at which the images were recorded in an efficient and accurate manner. A subset of the input images are selected as keyframes to form a sequence 250 of keyframes. Respective triples of keyframes having different, non-overlapping positions in the sequence 250 are selected and processed to determine the relative positions and orientations at which the keyframes in each triple were recorded to form respective sets of keyframes. The positions and orientations of keyframes between the keyframes in each triple are then calculated to form expanded sets of keyframes 266, 276, 286. The sets are further expanded by calculating the positions and orientations of keyframes which lie between sets in the sequence 250. The sets are merged by calculating the relationship between the coordinate systems in which the positions and orientations of the keyframes in each set are defined. During the processing, the positions and orientations calculated for keyframes in a set are adjusted to optimise the calculated solutions. This is performed in stages, considering at each stage a different window 270 of the keyframes and performing processing to minimise the error associated with the keyframes in the window. The window is moved sequentially through the keyframes so that every keyframe in a set is considered at least once.

36 Claims, 29 Drawing Sheets

U.S. PATENT DOCUMENTS

| | | | |
|---|---|---|---|
| 6,516,099 B1 | | 2/2003 | Davison et al. ............. 382/284 |
| 6,571,024 B1 | * | 5/2003 | Sawhney et al. ........... 382/294 |
| 6,614,429 B1 | * | 9/2003 | Zhang et al. ............... 345/420 |
| 6,628,819 B1 | * | 9/2003 | Huang et al. ............... 382/154 |
| 6,647,146 B1 | | 11/2003 | Davison et al. ............. 382/199 |
| 6,661,913 B1 | * | 12/2003 | Zhang et al. ............... 382/154 |
| 6,664,956 B1 | * | 12/2003 | Erdem ........................ 345/419 |
| 6,668,082 B1 | | 12/2003 | Davison et al. ............. 382/190 |

OTHER PUBLICATIONS

U.S. Appl. No. 09/718,413, filed Nov. 24, 2000.
U.S. Appl. No. 09/129,077, filed Aug. 5, 1998.
U.S. Appl. No. 09/129,079, filed Aug. 5, 1998.
U.S. Appl. No. 09/129,080, filed Aug. 5, 1998.
"Systems and Experiment Paper: Construction of Panoramic Image Mosaics with Global and Local Alignment" by Shum and Szeliski in International Journal of Computer Vision 36(2), pp. 101–130 (2000).
"A unifying Framework for Structure and Motion Recovery from Image Sequences" by P. F. McLauchlan and D. W. Murray in Proc 5th International Conf. on Computer Vision, Boston, pp. 314–320, Jun. 1995.
"The Variable State Dimension Filter applied to Surface-Based Structure from Motion" by Philip F. McLauchlan, CVSSP Technical Report VSSP–TR–4/99, pp. 1–52.
"Epipolar Geometry in Stereo, Motion and object Recognition".by Xu and Zhang, Chapter 2, Kluwer Academic Press, ISBN 0792341996.
"Euclidean Reconstruction from Uncalibrated Views" by Hartley in Applications of Invariance in Computer Vision: Proceedings of Second Joint Euro–US Workshop, Chapter 5, Ponta del Gada, Azores, Portugal, Oct. 1993, Springer–Verlag, ISBN 0387582401.
"Efficient Bundle Adjustment with Virtual Key Frames: A Hierarchical Approach to Multi–Frame Structure from Motion" by Shum et al in Proceedings of the 1999 IEEE Computer Society Conference on Computer Vision and Pattern Recognition, vol. 2, pp. 538–543, ISBN 0769501494.
"Calibration of Image Sequences for Model Visualisation" by Broadhurst and Cipolla in Proceedings of the 1999 IEEE Computer Society Conference on Computer Vision and Pattern Recognition, vol. 1, pp. 100–105, ISBN 0769501494.
"Multi–View 3D Estimation and Applications to Match Move" by Sawhney et al in 1999 IEEE Workshop on Multi–View Modelling and Analysis of Visual Scenes, pp. 21–28, ISBN 0769501109.
"Calibrating and 3D Modelling with a Multi–Camera System" by Wiles and Davison in 1999 IEEE Workshop on Multi–View Modelling and Analysis of Visual Scenes, pp. 29–36, ISBN 0769501109.
"Adaptive Least Squares Correlation: A Powerful Image Matching Technique" by A. W. Gruen in Photogrammetry Remote Sensing and Cartography, 14(3), 1985 pp. 175–187.

"Computer and Robot Vision Vol. 2", Section 13.4.15, by R. M. Haralick and L. G. Shapiro, Addison–Wesley Publishing Company, 1993, pp. 85–91, ISBN 0–201–56943–4 (v.2).
"Numerical Recipes in C", Chapter 15.5, pp. 681–688 by Press et al, Cambridge University Press, ISBN 0–521–43108–5.
"Closed Form Solution of Absolute Orientation Using Unit Quaternions" by Horn in Journal of Optical Soc. of America 4(4), pp. 629–649, Apr. 1987.
"Shape and Motion from Image Streams under orthography: a Factorization Method" by Tomasi and Kande, IJCV 9:2, 137154 (1992), pp. 137–154.
"Computer and Robot Vision vol. 1", Section 8, by R. M. Haralick and L. G. Shapiro, Addison–Wesley Publishing Company, 1992, pp. 371–452, ISBN 0–201–10877–1 (v.I).
"Rapid Octree Construction from Image Sequences" by R. Szeliski in CVGIP: Image Understanding, vol. 58, No. 2, Jul. 1993, pp. 23–32.
"Marching Cubes: A High Resolution 3D Surface Construction Algorithm" by W. E. Lorensen & H. E. Cline in Computer Graphics, SIGGRAPH 87 proceedings, 21; pp. 163–169, Jul. 1987.
"An Implicit Surface Polygonizer" by J. Bloomenthal in Graphics Gems IV, AP Professional, 1994, ISBN 0123361559, pp. 324–350.
"Photorealistic Scene Reconstruction by Voxel Coloring" by Seitz and Dyer in Proc. Conf. Computer Vision and Pattern Recognition 1997, pp. 1067–1073.
"Plenoptic Image Editing" by Seitz and Kutulakos in Proc. 6th International Conference on Computer Vision, pp. 17–24.
"What Do N Photographs Tell Us About 3D Shape?" by Kutulakos and Seitz in University of Rochester Computer Sciences Technical Report 680, Jan. 1998, pp. 1–8.
"A Theory of Shape by Space Carving" by Kutulakos and Seitz in University of Rochester Computer Sciences Technical Report 692, May 1998, pp. 1–27.
"Robust Video Mosaicing Through Topology Inference and Local to Global Alignment" by Sawhney et al in Proc. European Conference on Computer Vision, ECCV, Freiburg Germany vol. 2, pp. 103–119, Jun. 1998.
"The Variable State Dimension Filter" by Philip McLauchlan.
"Good Features to Track" by Shi and Tomasi in 1994 IEEE Conference on Computer Vision and Pattern Recognition pp. 593–600.
"A Multiple–Baseline Stereo" by Okutomi and Kanade in IEEE Transactions on Pattern Analysis and Machine Intelligence, vol. 15, No. 4, Apr. 1993, pp. 353–363.
"Relative Orientation", B. Horn, Inspec.l Abstract accession No. 3620717, Jun. 1990, Netherlands.

* cited by examiner

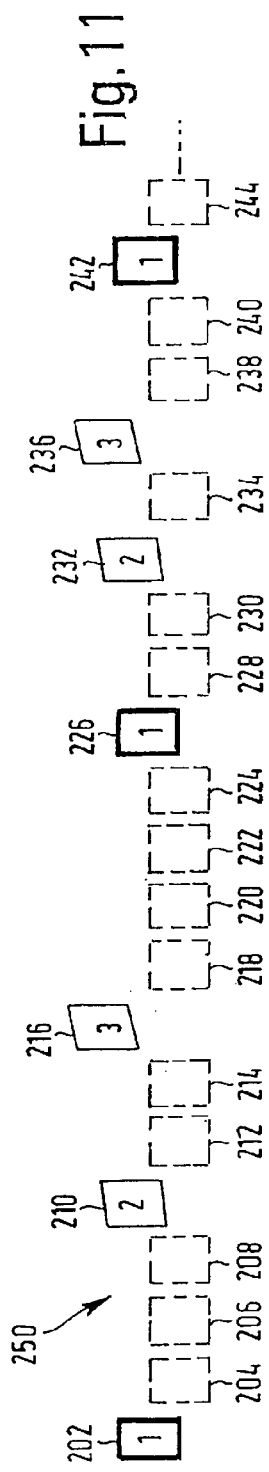
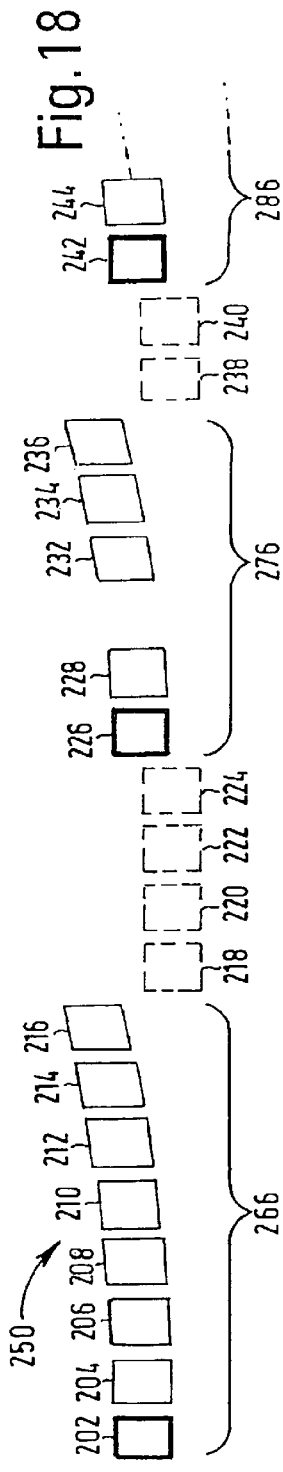
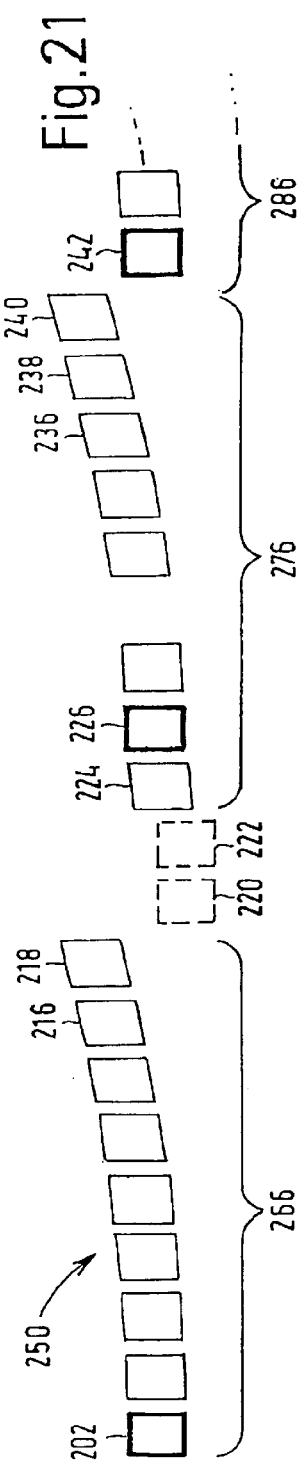

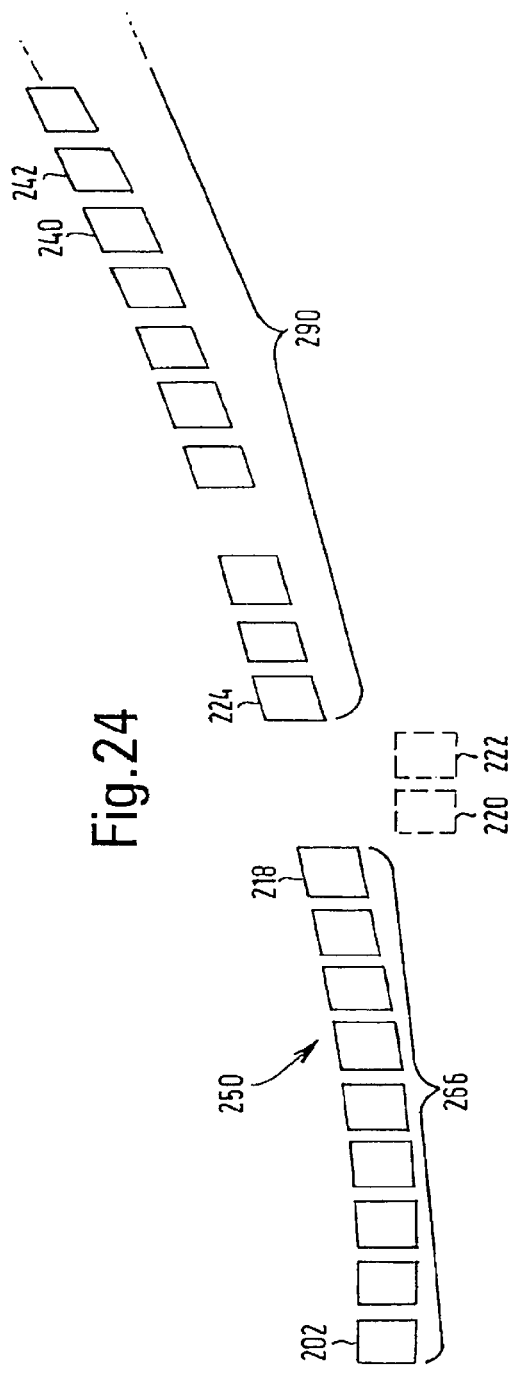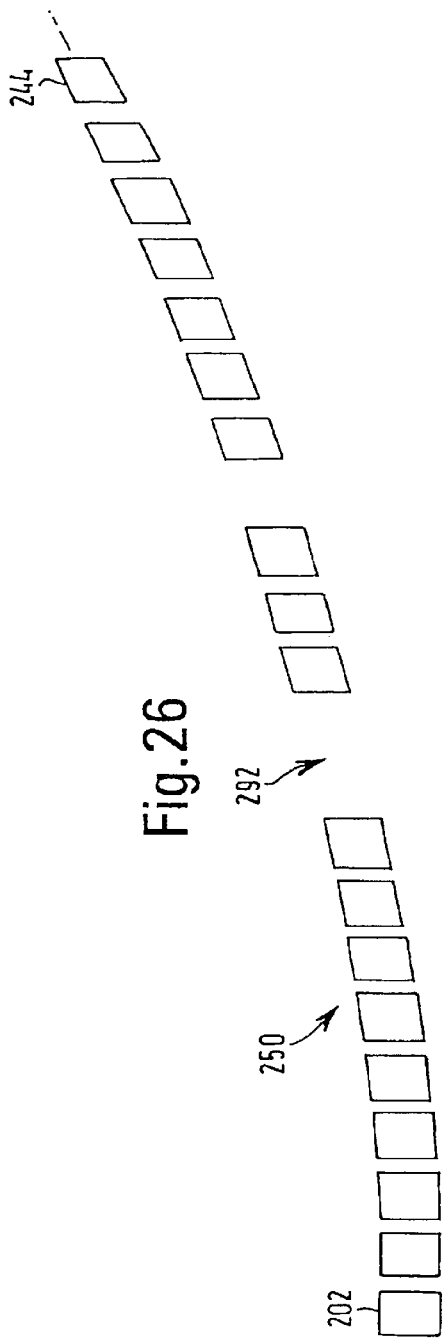

IMAGE PROCESSING APPARATUS

BACKGROUND OF THE INVENTION

Field of the Invention

The present invention relates to the field of image processing. In particular, the present invention relates to the processing of data defining a plurality of images of an object and data defining estimates of camera projections for the images, to improve the accuracy of the estimates, and also to the processing of image data defining a plurality of images recorded at different positions and orientations relative to a scene to determine camera projections for the images.

A camera projection for an image of a scene comprises a mathematical definition (typically a matrix or tensor) defining how points in the scene are projected into the image by the camera which recorded the image. Accordingly, a camera projection defines a mapping between a three-dimensional space containing the camera (typically referred to as the "world coordinate system") and a two-dimensional space of the image plane. Examples of common camera projections are given in "Epipolar Geometry in Stereo, Motion and Object Recognition" by Xu and Zhang, Chapter 2, Kluwer Academic Press, ISBN 0792341996. Examples include the perspective projection, the orthographic projection, the weak perspective projection, the affine projection, etc.

The combination of a camera projection with data defining the intrinsic parameters of the camera which recorded the image (that is, focal length, image aspect ratio, first order radial distortion coefficient, skew angle—the angle between the axes of the pixel grid, and principal point—the point at which the camera optical axis intersects the viewing plane) defines a position and orientation for the camera when the image was recorded. This position and orientation is defined in terms of a rotation and translation of the camera in the world coordinate system. In the case of some types of camera projection, such as a perspective projection, the recording position and orientation of the camera is completely specified by the camera projection and camera intrinsic parameters. For other types of camera projection, such as an affine projection, the recording position and orientation is defined by the camera projections and camera intrinsic parameters up to certain limits. For example, in the case of an affine projection, one limit is that the translation of the camera in the "Z" (depth) direction in the world coordinate system is not defined; this is because the camera would have recorded the same image for all translations in the depth direction for an affine projection and accordingly a single translation cannot be determined.

As is well known, a camera projection for an image can be calculated without knowing the intrinsic camera parameters. Further, if required, and if some or all of the intrinsic parameters are not known, they can be calculated from a plurality of images of the scene and the associated calculated camera projections.

A number of techniques are known for increasing the accuracy of calculated estimates of camera projections for images of a scene (sometimes referred to as "bundle adjustment").

For example, it is known that a Levenberg-Marquardt iteration method can be used to adjust initial estimates of camera projections for images of a scene to minimise a measure of the error in the estimates. For example, such a method is disclosed in Section 5 of "Euclidean Reconstruction from Uncalibrated Views" by Hartley in Applications of Invariance in Computer Vision: Proceedings of Second Joint Euro-US Workshop, Ponta del Gada, Azores, Portugal, October 1993, Springer-Verlag, ISBN 0387582401. The method comprises iteratively varying the camera projections for the images and the positions of 3D feature points representing points in the real-world scene shown in the images (calculated from the positions of the features in the images themselves and the estimated camera projections for the images) to minimise a squared error sum of the Euclidean distance between pixel locations of the feature points in the images and the 3D points when projected into the images using the calculated camera projections. This technique suffers from a number of problems, however. In particular, the amount of computation required increases as the number of images for which camera projections are to be optimised increases and/or the number of feature points in the images increases. Accordingly, the technique is unsatisfactory for long sequences of images and/or sequences of images containing a large number of feature points.

One way to address this problem is described in "Efficient Bundle Adjustment with Virtual Key Frames: A Hierarchical Approach to Multi-Frame Structure from Motion" by Shum et al in Proceedings of the 1999 IEEE Computer Society Conference on Computer Vision and Pattern Recognition, Volume 2, ISBN 0769501494, which discloses a method of reducing the number of images for which calculated camera projections need to be optimised by calculating a small number of virtual images and optimising the camera projections of only the virtual images. This technique, too, suffers from a number of problems, however. In particular, virtual images must be calculated, which is computationally expensive and time consuming.

It is an object of one aspect of the present invention to address the above problems.

Also known in the prior art are a number of techniques for calculating camera projections for images of a scene by processing data defining the images.

For example, EP-A-0898245 discloses a technique in which a camera projection is calculated for each image in a sequence by considering the images in respective overlapping groups in the sequence, each group comprising three images. More particularly, camera projections are calculated for images 1, 2 and 3 in the sequence, then images 2, 3 and 4, followed by images 3, 4 and 5 etc. until camera projections have been calculated for all the images in the sequence.

"Calibration of Image Sequences for Model Visualisation" by Broadhurst and Cipolla in Proceedings of the 1999 IEEE Computer Society Conference on Computer Vision and Pattern Recognition, Volume 1, ISBN 0769501494 discloses a technique in which the trifocal tensor of the three most extreme positional views in a long sequence of video images of a scene is calculated, as this is more accurate than the tensor of three successive views. Once this outer tensor is known, projection matrices for the intermediate frames are calculated. An iterative algorithm using Levenberg-Marquardt minimisation is then employed to perturb the twelve entries of the last camera matrix so that the algebraic error along the whole sequence is minimised.

"Multi-View 3D Estimation and Applications to Match Move" by Sawhney et al in 1999 IEEE Workshop on Multi-View Modelling and Analysis of Visual Scenes, ISBN 0769501109 discloses a technique in which the positions and orientations of each image in a sequence of images are initially calculated by pairwise estimation. The sequence of images is then split into a plurality of sub-sequences with a few frames overlap between consecutive sub-sequences, and the initial pairwise estimates are used to create position and orientation estimates for each image which are consistent over the sub-sequence in which the image lies. Subsequently, the sub-sequences are stitched together by using points that are visible in two overlapping sub-sequences to represent both the sub-sequences in a common coordinate system. In a final step, the positions and orientations for the complete set of images is bundle adjusted to compute the maximum likelihood estimate of the recording positions and orientations.

Despite the known techniques for calculating camera projections, there is still a requirement for techniques with improved efficiency (that is, processing resources and time necessary to carry out the technique) and/or which improve the accuracy of the calculated solutions.

Accordingly, it is an object of a second aspect of the present invention to address this problem.

SUMMARY OF THE INVENTION

According to the present invention, there is provided a method or apparatus for processing estimates of camera projections for a sequence of images to generate improved estimates, in which processing is performed on respective subsets of images in the sequence, with the subsets being selected sequentially from the sequence so that each image is processed as part of a subset at least once. For each subset, an error for the initial camera projections of the images therein is calculated. The error is then reduced by projecting features from the scene in the images from three-dimensions into the two-dimensions of the images, and calculating the distance between the positions of the projected features and the positions of the features as recorded in the images, the camera projections being adjusted and the point projection and distance measurement being performed again until camera projections are generated which give a reduced error.

The present invention also provides a computer program product, embodied for example as a storage device or signal, including instructions for causing a programmable processing apparatus to become operable to perform such a method or to become configured as such an apparatus.

According to the present invention, there is also provided a method or apparatus for processing input data defining a sequence of images to calculate camera projections for images within the sequence, in which a plurality of groups of images are selected from the sequence in dependence upon the input data, each group containing at least two images, a set is formed from each group by calculating relative camera projections for the images in the group, at least some of the sets are expanded by calculating a camera projection for a further image in the sequence relative to the set, and the relationship between the camera projections for different sets is determined.

The present invention also provides a computer program product, embodied for example as a storage device or signal, including instructions for causing a programmable processing apparatus to become operable to perform such a method or to become configured as such an apparatus.

BRIEF DESCRIPTION OF THE DRAWINGS

Embodiments of the invention will now be described, by way of example only, with reference to the accompanying drawings, in which:

FIG. 11 schematically illustrates an example of a result after the processing at step S8 in FIG. 3 has been applied to the example shown in FIG. 8b;

FIG. 18 schematically illustrates an example of a result after the processing at step S10 in FIG. 3 has been applied to the example shown in FIG. 11;

FIG. 21 schematically illustrates an example of a result after the processing at step S290 in FIG. 19 has been applied to the example shown in FIG. 18;

FIG. 24 schematically illustrates an example of a result after the processing at step S292 in FIG. 19 has been applied to the example shown in FIG. 21;

FIG. 26 schematically illustrates a result of applying the processing at step S294 in FIG. 19 to the example shown in FIG. 24.

Figure 1:
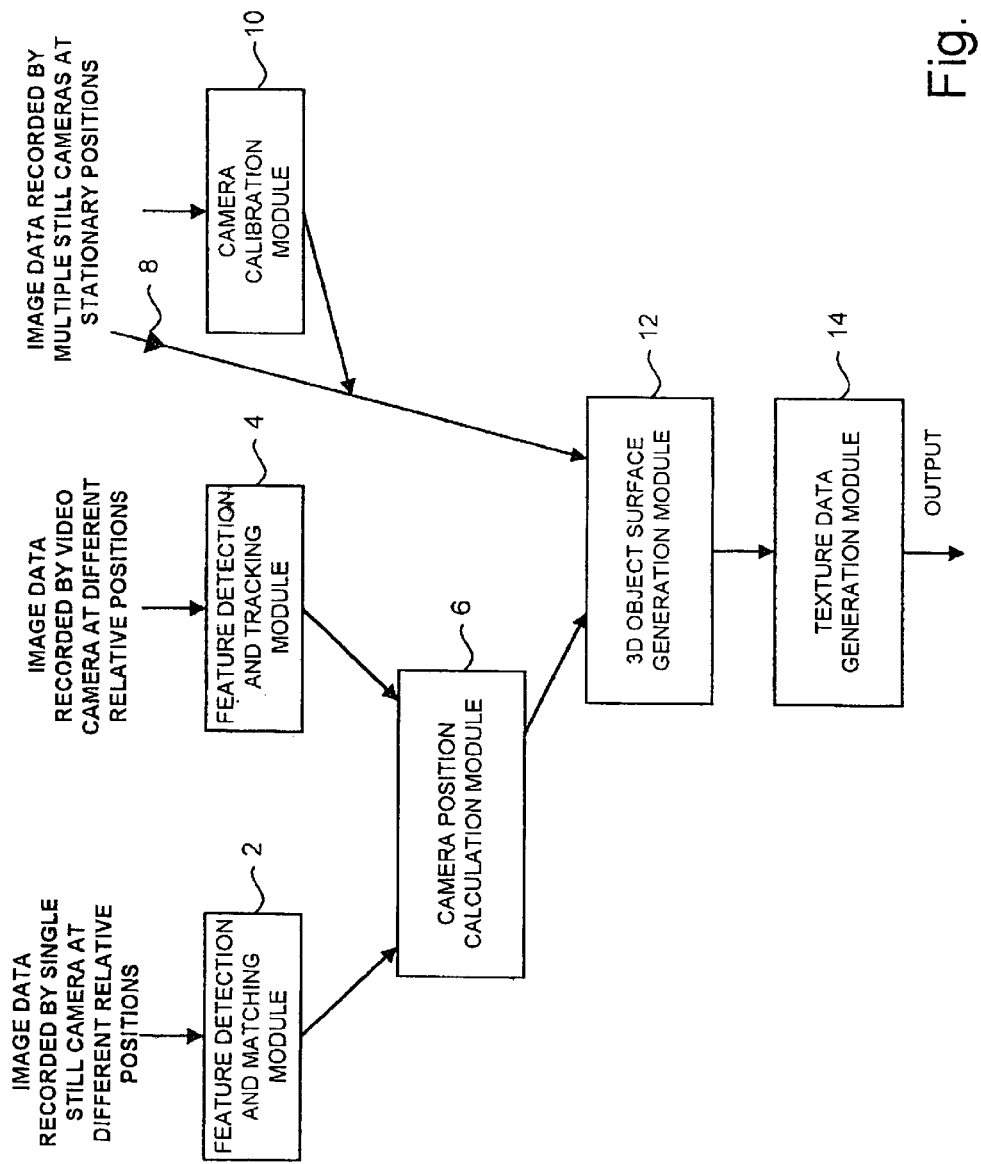
FIG. 1 schematically shows the components of a modular system in which the present invention is embodied.

The components of a modular system in which the present invention is embodied are schematically shown in FIG. 1.

These components can be effected as processor-implemented instructions, hardware or a combination thereof.

Referring to FIG. 1, the components are arranged to process data defining images (still or moving) of one or more objects in order to generate data defining a three-dimensional computer model of the object(s).

The input image data may be received in a variety of ways, such as directly from one or more digital cameras, via a storage device such as a disk or CD ROM, by digitisation of photographs using a scanner, or by downloading image data from a database, for example via a datalink such as the Internet, etc.

The generated 3D model data may be used to display an image of the object(s) from a desired viewing position; control manufacturing equipment to manufacture a model of the object(s), for example by controlling cutting apparatus to cut material to the appropriate dimensions; perform processing to recognise the object(s), for example by comparing it to data stored in a database; carry out processing to measure the object(s), for example by taking absolute measurements to record the size of the object(s), or by comparing the model with models of the object(s) previously generated to determine changes therebetween; carry out processing so as to control a robot to navigate around the object(s); store information in a geographic information system (GIS) or other topographic database; or transmit the object data representing the model to a remote processing device for any such processing, either on a storage device or as a signal (for example, the data may be transmitted in virtual reality modelling language (VRML) format over the Internet, enabling it to be processed by a WWW browser); etc.

The feature detection and matching module 2 is arranged to receive image data recorded by a still camera from different positions relative to the object(s) (the different positions being achieved by moving the camera and/or the object(s)).

The received data is then processed in order to match features within the different images (that is, to identify points in the images which correspond to the same physical point on the object(s)).

The feature detection and tracking module 4 is arranged to receive image data recorded by a video camera as the relative positions of the camera and object(s) are changed (by moving the video camera and/or the object(s)). As in the feature detection and matching module 2, the feature detection and tracking module 4 detects features, such as corners, in the images. However, the feature detection and tracking module 4 then tracks the detected features between frames of image data in order to determine the positions of the features in other images.

The camera position calculation module 6 is arranged to use the features matched across images by the feature detection and matching module 2 or the feature detection and tracking module 4 to calculate a respective camera projection for each image and to calculate the transformation between the camera positions at which the images were recorded and hence determine the orientation and position of the camera focal plane when each image was recorded.

The feature detection and matching module 2 and the camera position calculation module 6 may be arranged to perform processing in an iterative manner. That is, using camera positions and orientations calculated by the camera position calculation module 6, the feature detection and matching module 2 may detect and match further features in the images using epipolar geometry in a conventional manner, and the further matched features may then be used by the camera position calculation module 6 to recalculate the camera positions and orientations.

If the positions at which the images were recorded are already known, then, as indicated by arrow 8 in FIG. 1, the image data need not be processed by the feature detection and matching module 2, the feature detection and tracking module 4, or the camera position calculation module 6. For example, the images may be recorded by mounting a number of cameras on a calibrated rig arranged to hold the cameras in known positions relative to the object(s).

Alternatively, it is possible to determine the positions of a plurality of cameras relative to the object(s) by adding calibration markers to the object(s) and calculating the positions of the cameras from the positions of the calibration markers in images recorded by the cameras. The calibration markers may comprise patterns of light projected onto the object(s). Camera calibration module 10 is therefore provided to receive image data from a plurality of cameras at fixed positions showing the object(s) together with calibration markers, and to process the data to determine the positions of the cameras. A preferred method of calculating the positions of the cameras (and also internal parameters of each camera, such as the focal length etc) is described in "Calibrating and 3D Modelling with a Multi-Camera System" by Wiles and Davison in 1999 EEE Workshop on Multi-View Modelling and Analysis of Visual Scenes, ISBN 0769501109.

The 3D object surface generation module 12 is arranged to receive image data showing the object(s) and data defining the positions at which the images were recorded, and to process the data to generate a 3D computer model representing the actual surface(s) of the object(s), such as a polygon mesh model.

The texture data generation module 14 is arranged to generate texture data for rendering onto the surface model produced by the 3D object surface generation module 12. The texture data is generated from the input image data showing the object(s).

Techniques that can be used to perform the processing in the modules shown in FIG. 1 are described in EP-A-0898245, EP-A-0901105, pending U.S. application Ser. Nos. 09/129,077, 09/129,079 and 09/129,080, the full contents of which are incorporated herein by cross-reference, and also Annex A.

The present invention is embodied in particular as part of the camera position calculation module 6, and provides particular advantage when there is a large number of input images, for example images recorded by a video camera Accordingly, a description will now be given of the feature detection and tracking module 4 and the camera position calculation module 6.

To assist understanding, the processing operations performed by the feature detection and tracking module 4 and the camera position calculation module 6 in the embodiment will be described with reference to functional units.

Figure 2:
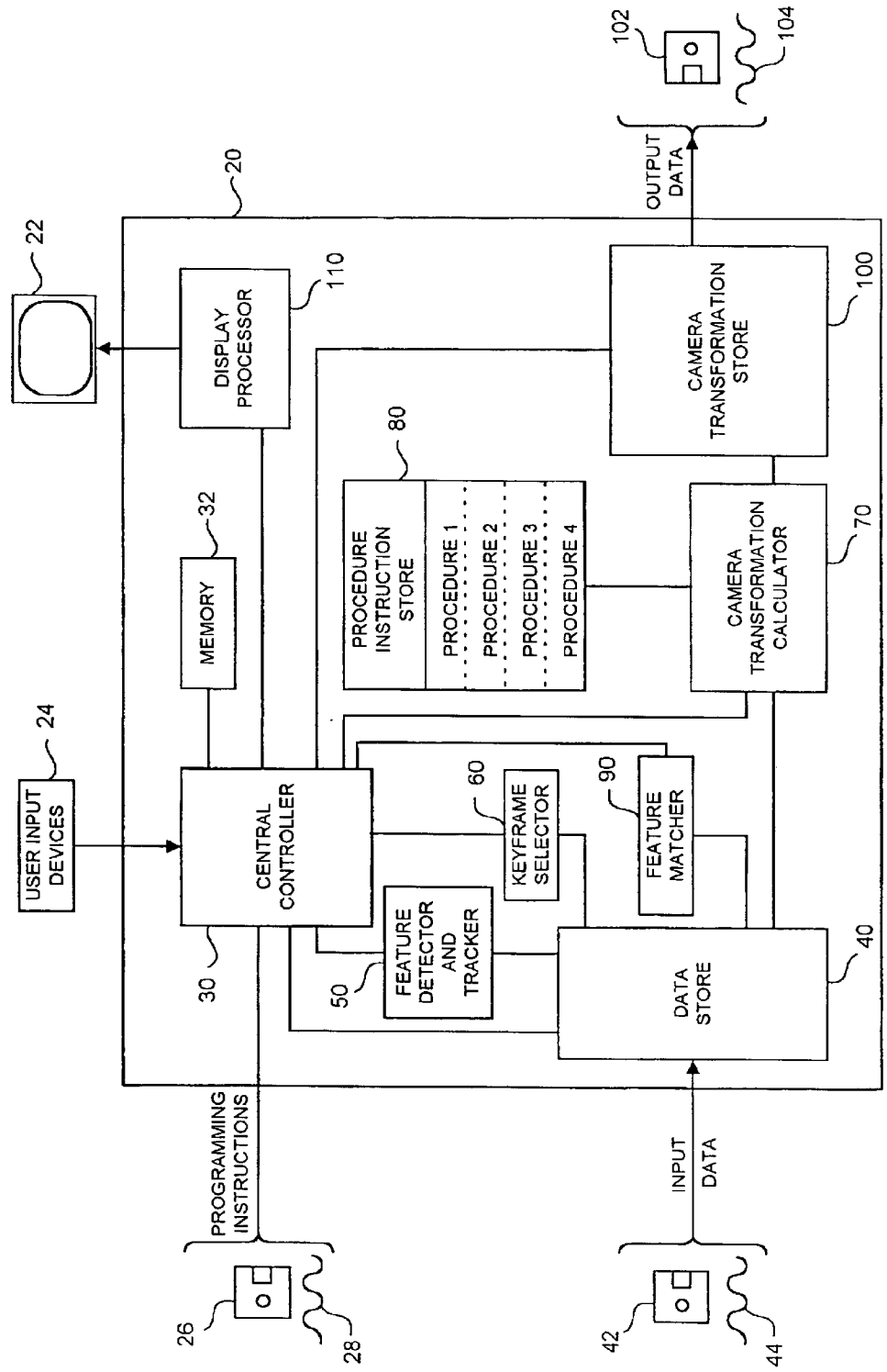
FIG. 2 schematically shows the components of an embodiment of the invention, together with the notional functional processing units into which the processing apparatus component may become configured when programmed by programming instructions.

FIG. 2 shows examples of such functional units and their interconnections within a single processing apparatus 20 which is arranged to perform the processing operations of the feature detection and tracking module 4 and the camera position calculation module 6.

In this embodiment, processing apparatus 20 is a conventional processing apparatus, such as a personal computer, containing, in a conventional manner, one or more processors, memory, graphics cards etc together with a display device 22, such as a conventional personal computer monitor, and user input devices 24, such as a keyboard, mouse etc.

The processing apparatus 20 is programmed to operate in accordance with programming instructions input, for example, as data stored on a data storage medium, such as disk 26, and/or as a signal 28 input to the processing apparatus, for example from a remote database, by transmission over a communication network (not shown) such as the Internet or by transmission through the atmosphere, and/or entered by a user via a user input device 24 such as a keyboard.

When programmed by the programming instructions, the processing apparatus 20 effectively becomes configured into a number of functional units for performing the processing operations which will be described below.

As noted above, examples of such functional units and their interconnections are shown in FIG. 2. The units and interconnections, illustrated in FIG. 2 are, however, notional and are shown for illustration purposes only to assist understanding; they do not necessarily represent the exact units and connections into which the processor, memory etc of the processing apparatus 20 become configured.

Referring to the functional units shown in FIG. 2, a central controller 30 processes inputs from the user input devices 24, and also provides control and processing for a number of the other functional units. Memory 32 is provided for use by central controller 30 and the other functional units.

Data store 40 stores input data input to the processing apparatus 20 as data stored on a storage device, such as disk 42, or as a signal 44 transmitted to the processing apparatus 20. In this embodiment, the input data defines a sequence of video images (frames) of an object, together with the intrinsic parameters of the camera which recorded the images, that is, aspect ratio, focal length, principal point (the point at which the optical axis intersects the imaging plane), first order radial distortion coefficient, and skew (the angle between the axes on the pixel grid; because the axes may not be exactly orthogonal).

Feature detector and tracker 50 processes the input image data to detect features, such as corners, in the images and to track the position of each detected feature between the input image frames.

Keyframe selector 60 uses information from feature detector and tracker 50 about the tracked features in each frame to select a sub-set of the input image frames as "keyframes", and groups the selected keyframes for further processing.

Camera transformation calculator 70 calculates camera projections for different ones of the keyframes selected by keyframe selector, 60. Further, in this embodiment, camera transformation calculation 70 is arranged to use the intrinsic camera parameters stored in data store 40 with the calculated camera projections to calculate transformations defining the relationship between the positions and orientations at which the selected keyframes were recorded. Camera transformation calculator 70 is arranged to calculate transformations in accordance with a number of different procedures, control instructions for which are stored in procedure instructions store 80.

Feature matcher 90 matches features between different ones of the keyframes selected by keyframe selector 60 to provide additional data for use by camera transformation calculator 70 in calculating the camera transformations.

Camera transformation store 100 stores camera transformations calculated by camera transformation calculator 70, and controls the output of these transformations as output data, for example as data on a storage device, such as disk 102, or as a signal 104.

Display processor 110, under the control of central controller 30, displays images and instructions to a user via display device 22.

Figure 3:
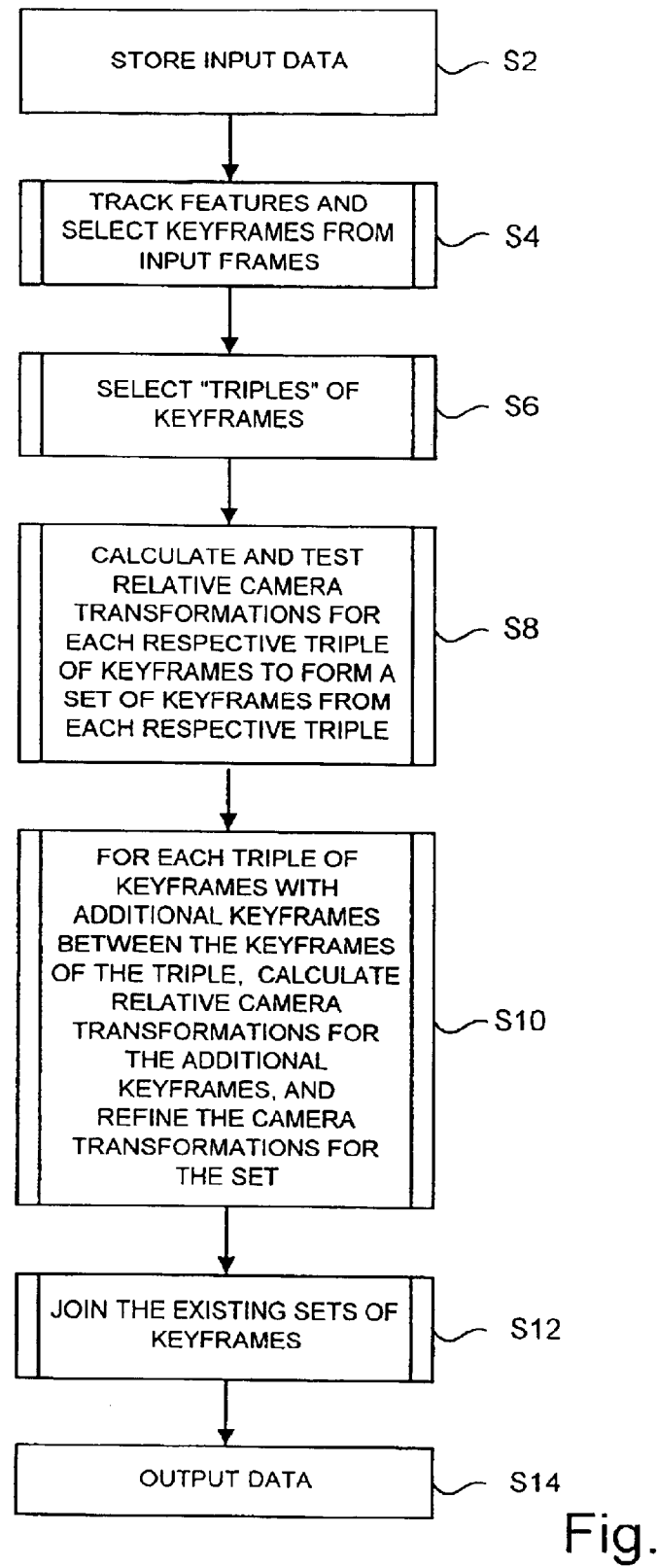
FIG. 3 shows the processing operations performed on input data by the apparatus shown in FIG. 2.

FIG. 3 shows the processing operations performed by processing apparatus 20 in this embodiment.

Referring to FIG. 3, at step S2, image data defining images of a scene recorded at different locations input to the processing apparatus 20, for example on disk 42 or as a signal 44, is stored in the data store 40.

Figure 4:
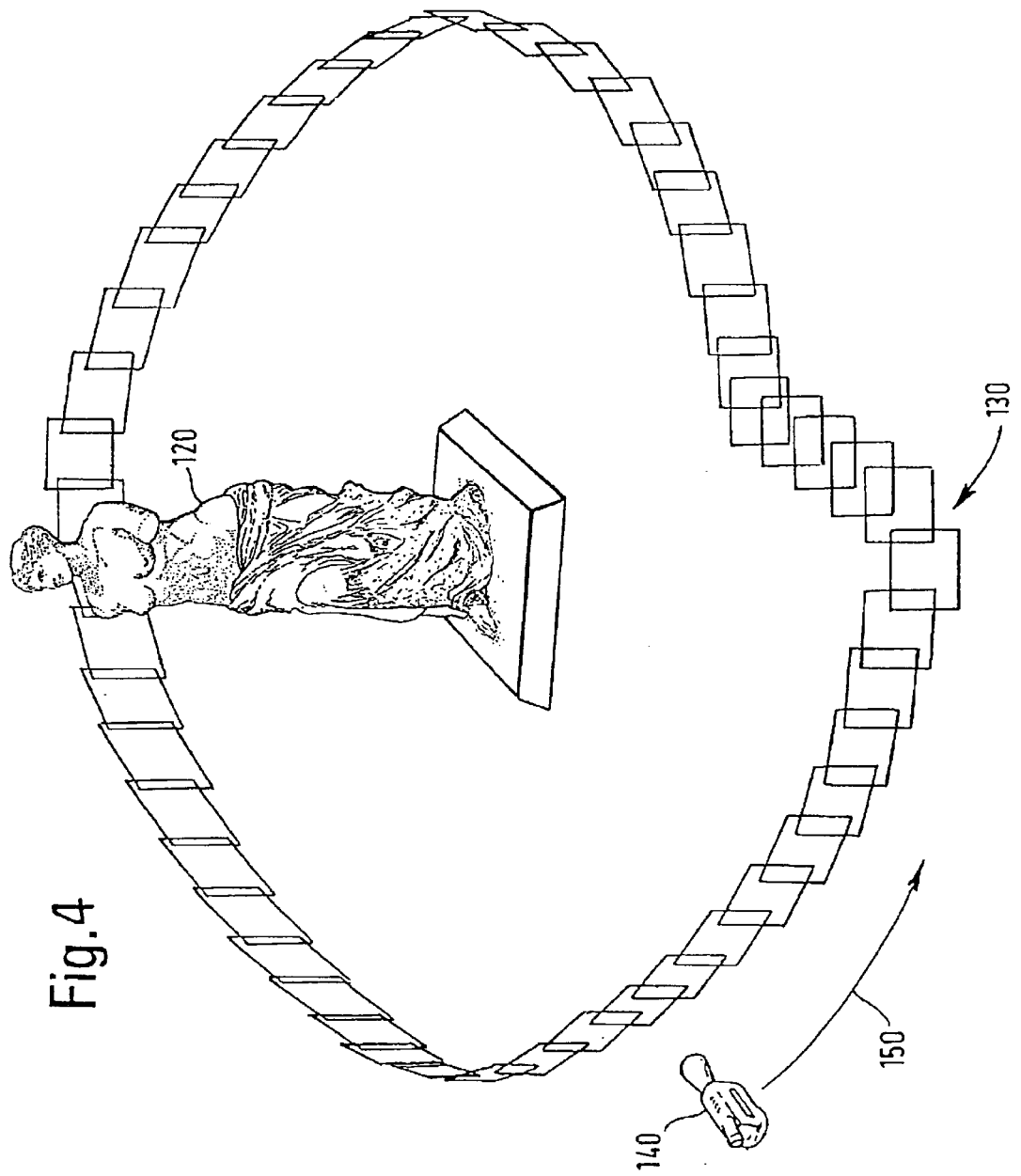
FIG. 4 schematically illustrates a sequence of images recorded at different positions and orientations around an object, which is input to the processing apparatus shown in FIG. 1.

Referring to FIG. 4, in which an example scene is shown (in this case, a museum statue 120), the data stored at step S2 defines a plurality of image frames 130 showing the statue 120 from different positions and/or viewing directions, the image frames 130 being recorded by moving video camera 140 in the direction of arrow 150 around the statue 120.

In addition, data is stored at step S2 defining the intrinsic parameters of the camera 140, that is the focal length, the aspect ratio (height-to-width) of the pixels 130, the principal point, the first order radial distortion coefficient, and the skew angle, This data, too, may be input on a storage device such as disk 42 or as a signal 44, or, instead, may be input by a user using an input device 24 such as a keyboard.

At step S4, feature detector and tracker 50 and keyframe selector 60 together with central controller 30 process the data stored at step S2 to identify feature points in the input image frames, to track the positions of the feature points across different input image frames, and to select a sub-set of the input image frames as keyframes.

Figure 5:
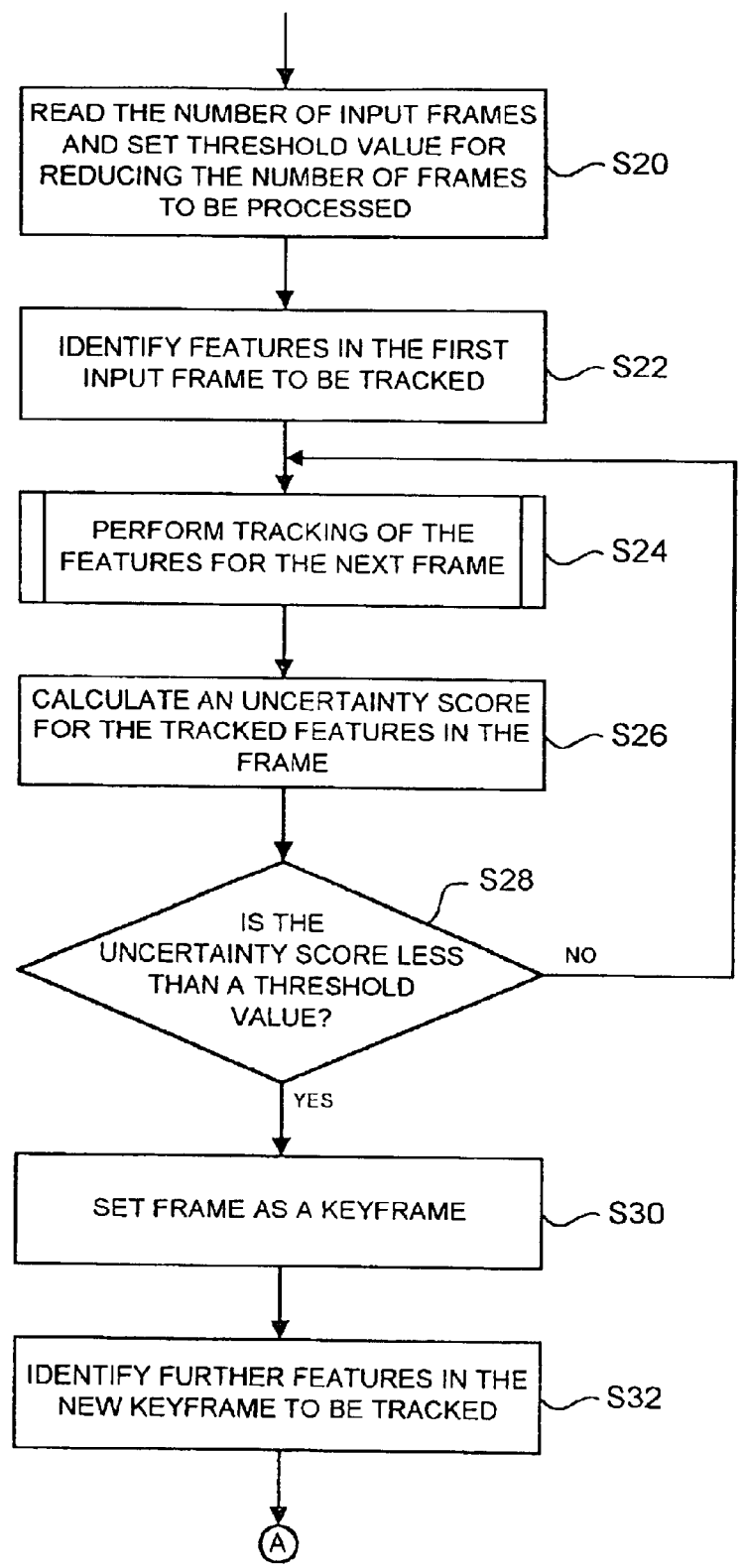
FIG. 5 shows the processing operations performed at step S4 in FIG. 3.
Figure 5:
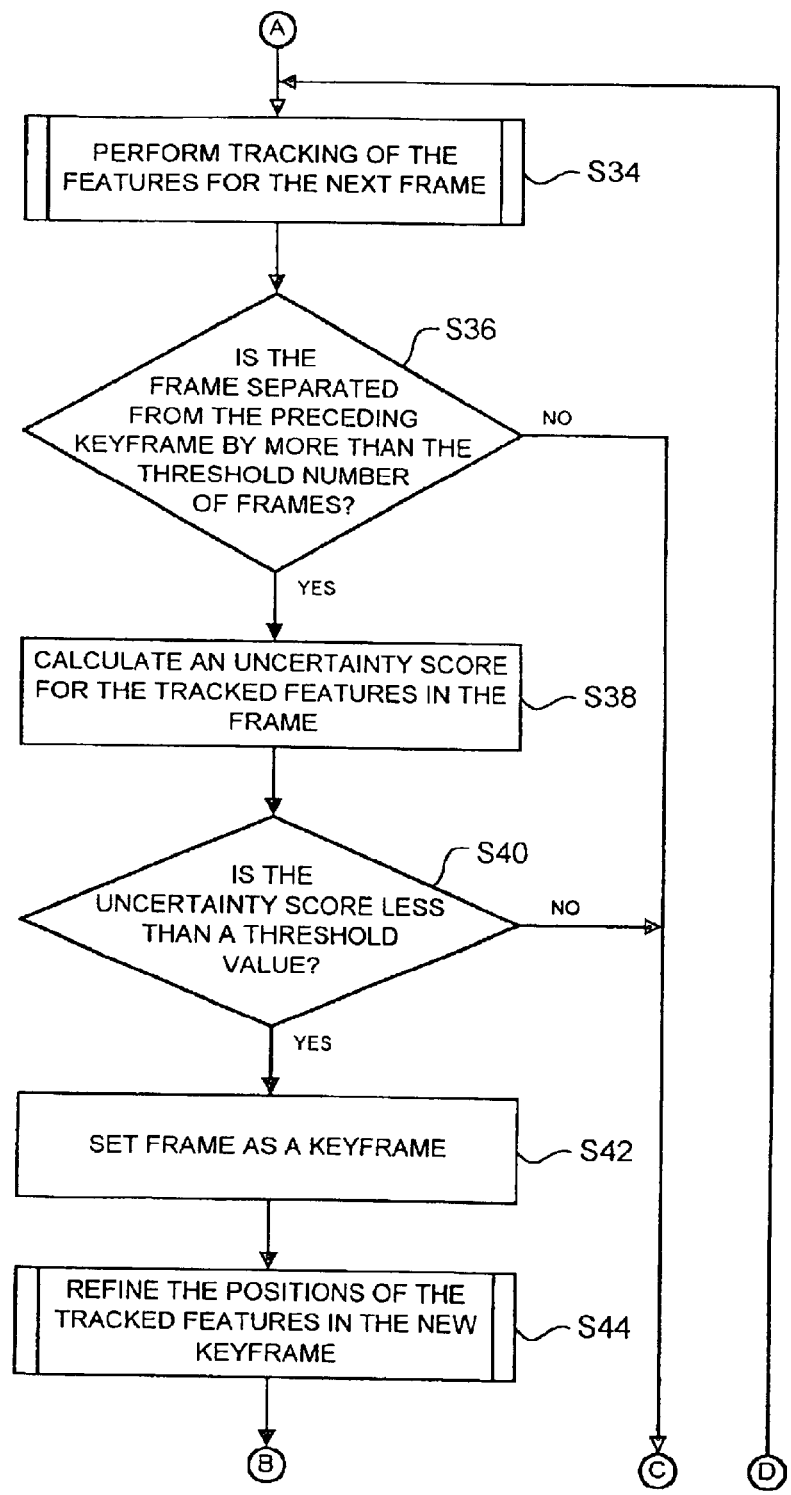
Figure 5:
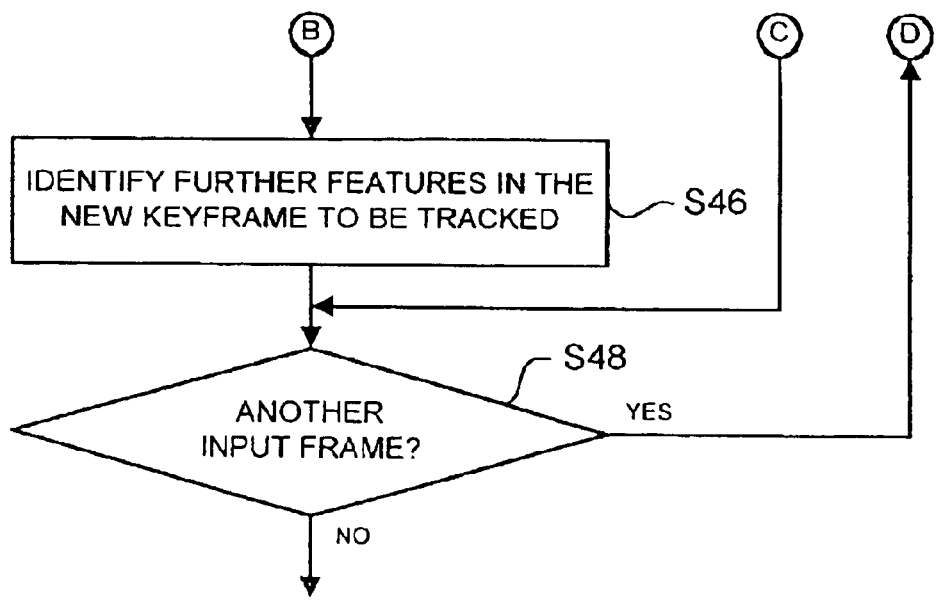

FIG. 5 shows the processing operations performed at step S4 in this embodiment.

Referring to FIG. 5, at step S20, central controller 30 reads the number of input frames and sets a threshold value for use in subsequent processing to reduce the number of image frames for which camera transformations are to be calculated. More particularly, the threshold value is set in dependence upon the number of input frames, the processing power available within processing apparatus 20 and any constraints on the time available within which camera transformations for the input image frames must be calculated. As will be described below, the threshold value set at step S20 represents the minimum number of frames which must be present between the keyframes selected by keyframe selector 60. Accordingly, if the threshold value is set to "zero", then keyframes may be selected which are successive image frames in the input sequence 130, whereas if a threshold value of "ten" is set, then subsequent keyframe selection will result in the number of input frames being reduced by a factor of at least ten.

At step S22, feature detector and tracker 50 processes the image data for the first image frame in the sequence 130 (that is, the frame recorded at the earliest time because the frames are arranged in time-of-recording order within sequence 130) to identify features in the image for tracking. In this embodiment, processing is carried out in a conventional manner, for example as described in section 1 of Annex A, to identify corner points in the image frame for tracking.

At step S24, feature detector and tracker 50 together with central controller 30 perform tracking of the feature points identified at step S22 for the next frame in the input sequence 130.

In this embodiment, the tracking process uses a constant image velocity Kalman filter to predict the motion of the feature points, and a correlation-based matcher to make measurements of feature point correspondences between image frames. The method assumes that the motion of feature points is smooth enough across the sequence of image frames 130 that a constant velocity Kalman filter is useful, and that feature point measurements and motion can be modelled by Gaussians.

Figure 6:
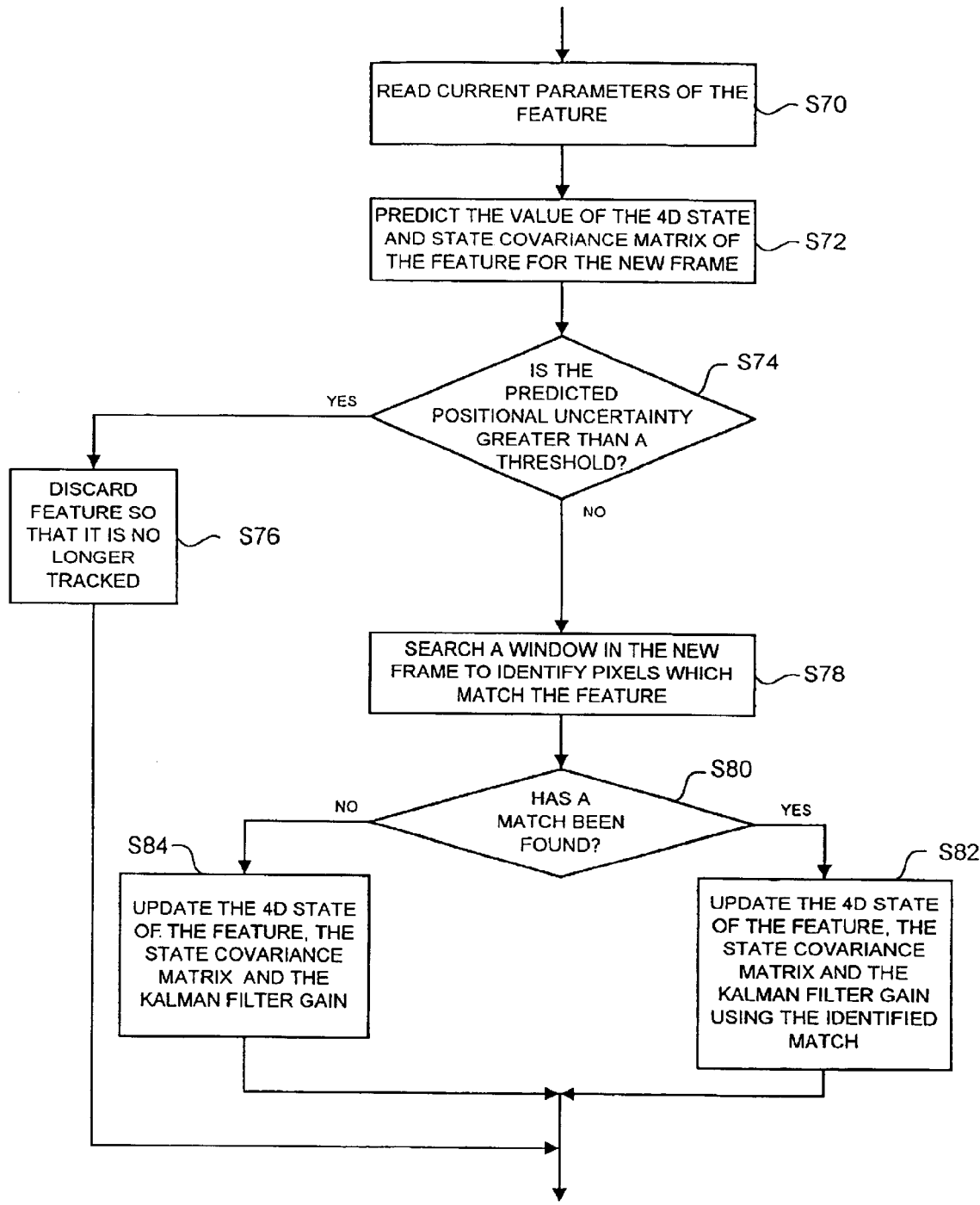
FIG. 6 shows the processing operations performed at step S24 and step S34 in FIG. 5.

FIG. 6 shows the processing operations performed by feature detector and tracker 50 and central controller 30 at step S24 to perform tracking for one feature point (the same processing being performed for each of the other feature points).

Referring to FIG. 6, at step S70, feature detector and tracker 50 reads the current 4D state, X, of the feature point (defined by the position and velocity vector of the feature point in a conventional manner) and the state covariance matrix, K, for the feature point. In this embodiment, the initial value for the 4D state of a feature point is defined using the position of the feature point in the first image frame and zero velocity, while the initial condition for the state covariance matrix, $K_0$, is defined by:

$$K_0 = \begin{pmatrix} 0 & 0 \\ 0 & \sigma_0^2 I \end{pmatrix} \quad (1)$$

where $\sigma_0^2$ is the initial velocity variance and is set to $\sigma_0^2 = 200 (\text{pixels/frame})^2$, and "I" is the identity matrix.

At step S72, feature detector and tracker 50 uses the parameter values read at step S70 in the following standard Kalman filter equations to predict the value of the 4D state and state covariance matrix for the feature point for the new image frame (that is the next frame in the sequence 130), assuming a constant velocity and random uniform Gaussian acceleration model for the dynamics:

$$X_{n+1} = \theta X_n \quad (2)$$

$$X_{n+1} = \theta K_n \theta^T + Q \quad (3)$$

where:

$X_{n+1}$ is the prediction of the 4D state of the feature point for the new frame;

$X_n$ is the 4D state of the feature point for the current frame;

$K_{n+1}$ is the prediction of the state covariance matrix for the new frame;

$K_n$ is the state covariance matrix for the current frame;

$\theta$ is the transition matrix which, in this embodiment, is constant and has the following value:

$$\theta = \begin{pmatrix} I & I \\ 0 & I \end{pmatrix} \quad (4)$$

Q is the process covariance matrix which, in this embodiment, is constant and has the following value:

$$Q = \begin{pmatrix} 0 & 0 \\ 0 & \sigma_v^2 I \end{pmatrix} \quad (5)$$

where $\sigma_2^v$ is the process velocity variance which, in this embodiment, is set to the fixed value of 200 (pixels/frame)$^2$ if the camera 140 was hand-held when the images 130 were recorded, and to the value of 50 (pixels/frame)$^2$ if the camera 140 was mounted on a support, such as a robot arm etc, to record the images 130. The value of $\sigma_v^2 = 50$ (pixels/frame)$^2$ would also be applicable if the camera 140 had been held stationary (for example on a tripod) while the object 120 was rotated on a turntable.

At step S74, feature detector and tracker 50 tests whether the predicted positional uncertainty of the feature point (given by the top two diagonal elements of the state covariance matrix, $K_{n+1}$) is greater than a threshold which, in this embodiment is set to 400 pixels$^2$.

If it is determined at step S74 that the predicted positional uncertainty is greater than the threshold, then, at step S76, the feature point is discarded so that it is no longer tracked.

On the other hand, if it is determined at step S74 that the predicted positional uncertainty is not greater than the threshold, then, at step S78, feature detector and tracker 50 searches within a window of the new frame (that is, frame n+1) to identify pixels which match the feature point being tracked. More particularly, feature detector and tracker 50 searches pixels in the new frame within a rectangular window centred on the predicted position of the feature point in the new frame, the dimensions of the rectangular window being given by:

$$\Delta x = \sqrt{K_{11}}, \Delta y = \sqrt{K_{22}} \quad (6)$$

where $K_{11}$ and $K_{22}$ are the top two diagonal elements of the state covariance matrix, $K_{n+1}$.

A respective correlation score is calculated for each pixel within the window in the new image defining the correlation between the pixel and the pixels within a second window of size 15 pixels by 15 pixels centred on the last measured position of the feature point in a frame. This may be a frame earlier in the sequence 130 than frame "n" since a position may not be found in each frame for the feature point. Accordingly, the pixels in the second window around the last measured position of the feature point are cached to avoid having to retrieve the whole image from memory to allow the correlation score to be calculated.

In this embodiment, the correlation score, C, is calculated between the pixels in the 15 by 15 window centred on the last measured position of the feature point and the pixels in a 15 by 15 pixel window centred on the pixel in the new frame for which a correlation score is to be calculated (that is, a pixel from the window of size $\Delta x$ by $\Delta y$ in the new frame centred on the predicted position). More particularly, the correlation score is calculated in a conventional manner, by calculating:

$$C = \frac{1}{N \sigma^{(1)} \sigma^{(2)}} \sum_i [I_i^{(1)} - \langle I^{(1)} \rangle][I_i^{(2)} - \langle I^{(2)} \rangle] \quad (7)$$

where:

$$\sigma^{(j)2} = \frac{1}{N} \sum_i [I_i^{(j)} - \langle I^{(j)} \rangle]^2 \quad (8)$$

"i" labels the different pixels in the window being considered;

"j" labels the different images (j=1,2);

$I^{(1)}$ is the pixel image intensity in the first image of the pair;

$I^{(2)}$ is the pixel image intensity in the second image of the pair,

< > denotes the mean value of the image intensity in the window;

N is the number of pixels in the window (15×15=225 in this embodiment).

In this embodiment, feature detector and tracker 50 calculates the value of $\sigma^{(1)^2}$ and $\sigma^{(2)^2}$ given by equation (8) before calculating the correlation score, C, given by equation (7). Further, only if the values of both $\sigma^{(1)2}$ and $\sigma^{(2)2}$ are greater than 100 does feature detector and tracker 50 calculate a correlation score, C. This ensures that correlation scores are not calculated based on windows of pixels which have approximately uniform texture (which would lead to artificially high correlation scores).

At step S80, feature detector and tracker 50 uses the correlation scores calculated at step S78 to determine whether a match has been found for the feature point being tracked. More particularly, feature detector and tracker 50 reads the values of the highest two correlation scores calculated at step S78. Feature detector and tracker 50 then determines whether, firstly, the top correlation score is larger than a threshold $C_0$ (in this embodiment set to $C_0$=0.9), and, secondly, the difference between the top two correlation scores is larger than a threshold ΔC (in this embodiment ΔC=0.001). If these first and second criteria are met, then it is determined that the pixel having the highest correlation score represents a match for the feature point being tracked. On the other hand, if the two criteria are not met, then it is determined that no match has been found.

If it is determined at step S80 that a match has been found then, at step S82, the measurement of the feature point position in the new frame made at step S78 (that is, the pixel having the highest correlation score) is used to update the 4D state, X, of the feature point, the state covariance matrix, K, and the Kalman filter gain, G, in a conventional manner as follows:

$$G = KH^T(HKH^T+R)^{-1} \quad (9)$$

$$X \rightarrow X + G(\hat{X}-HX) \quad (10)$$

$$K \rightarrow (I-GH) \quad (11)$$

where $\hat{X}$ is the position measurement (pixel position) from step S78, "H" is the measurement matrix, and "R" is the measurement covariance matrix. In this embodiment, "H" is constant, being given by:

$$H = (I0) \quad (12)$$

R is given by:

$$R = \sigma^2 I \quad (13)$$

where a is the measurement variance given by:

$$\sigma^2 = (rk+a) \quad (14)$$

where $k = \sqrt{(K_{11}\ K_{22})}$ (that is, a measure of the positional uncertainty), "r" is a parameter related to the likelihood of obtaining an outlier (in this embodiment set to r=0.1), and "a" is a parameter related to the measurement uncertainty of inliers (in this embodiment set to a=1.0).

The updated parameters given by equations (9), (10) and (11) are stored by feature detector and tracker 50, but the values of the parameters before they were updated are also retained as they may be required for subsequent processing at step S108 or S110 in FIG. 7, which is described later.

On the other hand, if it is determined at step S80 that a match has not been found for the feature point being tracked, then, at step S84, the feature detector and tracker 50 updates the 4D state, X, of the feature point, the state covariance matrix, K, and the Kalman filter gain in a conventional manner as follows:

$$G = 0 \quad (15)$$

$$X \rightarrow X \quad (16)$$

$$K \rightarrow K \quad (17)$$

Referring again to FIG. 5, at step S26, keyframe selector 60 calculates a score representing a total positional uncertainty for the tracked features in the new frame (that is, the frame for which the positions of the features were predicted and measured at step S24). More particularly, in this embodiment, keyframe selector 60 calculates an uncertainty score as follows:

$$\text{Uncertainty score} = \sum_{\substack{n \text{ lowest} \\ \text{measurement} \\ \text{variances}}} \min(\sigma_i^2, \sigma_{\max}^2)$$

where: $\sigma_i^2$ is the measurement variance of the position of the "i"th feature point (corner in this embodiment) given by equation (14) above;

$\sigma_{max}^2$ represents an upper threshold on the measurement variance, and is set to 40 in this embodiment;

$\min(\sigma_i^2, \sigma_{max}^2)$ is the minimum of $\sigma_i^2$ and $\sigma_{max}^2$ (so that the maximum variance value that a point can contribute to the summation is $\sigma_{max}^2$); and the summation is carried out for the lowest "n" measurement variances ("n" being set to 100 in this embodiment). If there are less than "n" tracked feature points for the frame, then the uncertainty score is calculated by adding the values min $\sigma_i^2, \sigma_{max}^2$ for the "m" existing points and $(n-m) \times \sigma_{max}$ (that is, $(n-m) \times 40$ in this embodiment).

At step S28, keyframe selector 60 determines whether the uncertainty score calculated at step S26 is less than a threshold value, which, in this embodiment is set to 2,000.

If it is determined at step S28 that the uncertainty score is not less than the threshold, then steps S24 to S28 are iteratively repeated for each subsequent frame in the sequence 130 until it is determined at step S28 that the uncertainty score for a frame is less than the threshold value.

When it is determined at step S28 that the uncertainty score is less than a threshold value, then, at step S30, keyframe selector 60 designated the frame which has the uncertainty score less than the threshold as a keyframe.

At step S32, feature detector and tracker 50 processes the image data for the keyframe designated at step S30 to identify further features to be tracked. The processing performed at step S32 is the same as that performed at step S22 described above, and consequently will not be described again here. When identifying further features to be tracked at step S32, however, feature detector and tracker 50 discards any feature point which is within a predetermined distance of an existing feature point which has been tracked. In this embodiment, the predetermined distance is set to five pixels.

At step S34, feature detector and tracker 50 performs tracking of the features for the next frame in the sequence. This step is performed for the features tracked into the keyframe designated at step S30 (that is, by performing the tracking at step S24) and also for the new features identified at step S32. The processing performed at step S34 is the same as that performed at step S24, described above, and consequently will not be described again here.

At step S36, keyframe selector 60 determines whether the current frame is separated from the preceding keyframe by more than the threshold number of frames which was set at step S20.

If it is determined at step S36 that the current frame is not separated from the preceding keyframe by more than the threshold number of frames, then the processing proceeds to step S48, at which it is determined whether there is another frame in the sequence 130. Steps S34, S36 and S48 are then repeated until it is determined at step S36 that the current frame is separated from the preceding keyframe by more than the threshold number of frames, at which time the processing proceeds to step S38.

At step S38, keyframe selector 60 calculates a score representing the total relative positional uncertainty of the tracked features in the current frame. More particularly, in this embodiment, keyframe selector 60 calculates an uncertainty score as follows:

$$\text{Relative uncertainty score} = \sum_{n \text{ lowest relative uncertainty values}} \min\left\{\frac{\sigma_i^2}{|\underline{d}_i|^2}, (\sigma_{\max}^{(r)})^2\right\} \quad (19)$$

where: $\sigma_i^2$ is the measurement variance of the position of the "i"th feature point (corner in this embodiment) given by equation (14) above;
- $\underline{d}_i$ is the disparity vector of the "i"th feature point defining the movement of the position of the point from the previous keyframe to the current frame;
- $\sigma_i^2/|\underline{d}_i|^2$ is the relative uncertainty value for the "i"th feature point;
- $(\sigma_{max}^{(r)})^2$ represents an upper threshold on the relative uncertainty, and is set to 40 in this embodiment;
- min $\{\sigma_i^2/|\underline{d}_i|^2, (\sigma_{max}^{(r)})^2\}$ is the minimum of $\sigma_i^2/|\underline{d}_i|^2$ and $(\sigma_{max}^{(r)})^2$ (so that the maximum relative uncertainty value that a point can contribute to the summation is $(\sigma_{max}^{(r)})^2$; and
- the summation is carried out for the lowest "n" relative uncertainty values of points which were present in the preceding keyframe as well as the current frame (so that $\underline{d}$ can be calculated), "n" being set to 100 in this embodiment. If there are less than "n" tracked feature points which are present in both the current frame and the preceding keyframe, then the relative uncertainty score is calculated by adding the values min $\{\sigma_i^2/|\underline{d}_i|^2, (\sigma_{max}^{(r)})^2\}$ for the "m" existing points which are present in both frames and (n−m) maximum×$(\sigma_{max}^{(r)})^2$ (that is, (n−m)×40 in this embodiment).

At step S40, keyframe selector 60 determines whether the relative uncertainty score calculated at step S38 is less than a threshold value, which, in this embodiment, is set to 1,000.

If it is determined at step S40 that the uncertainty value is less than the threshold value, then, because the current frame is also separated from the preceding keyframe by more than the threshold number of frames (tested at step S36), at step S42, keyframe selector 60 designates the current frame as a keyframe.

On the other hand, if it is determined at step S40 that the relative uncertainty score is not less than the threshold value, then processing proceeds to step S48 so that subsequent frames in the input sequence 130 are processed in the manner described above.

At step S44, feature detector and tracker 50 performs processing to refine the measurements of the positions of the tracked features in the frame designated as a keyframe at step S42.

Figure 7:
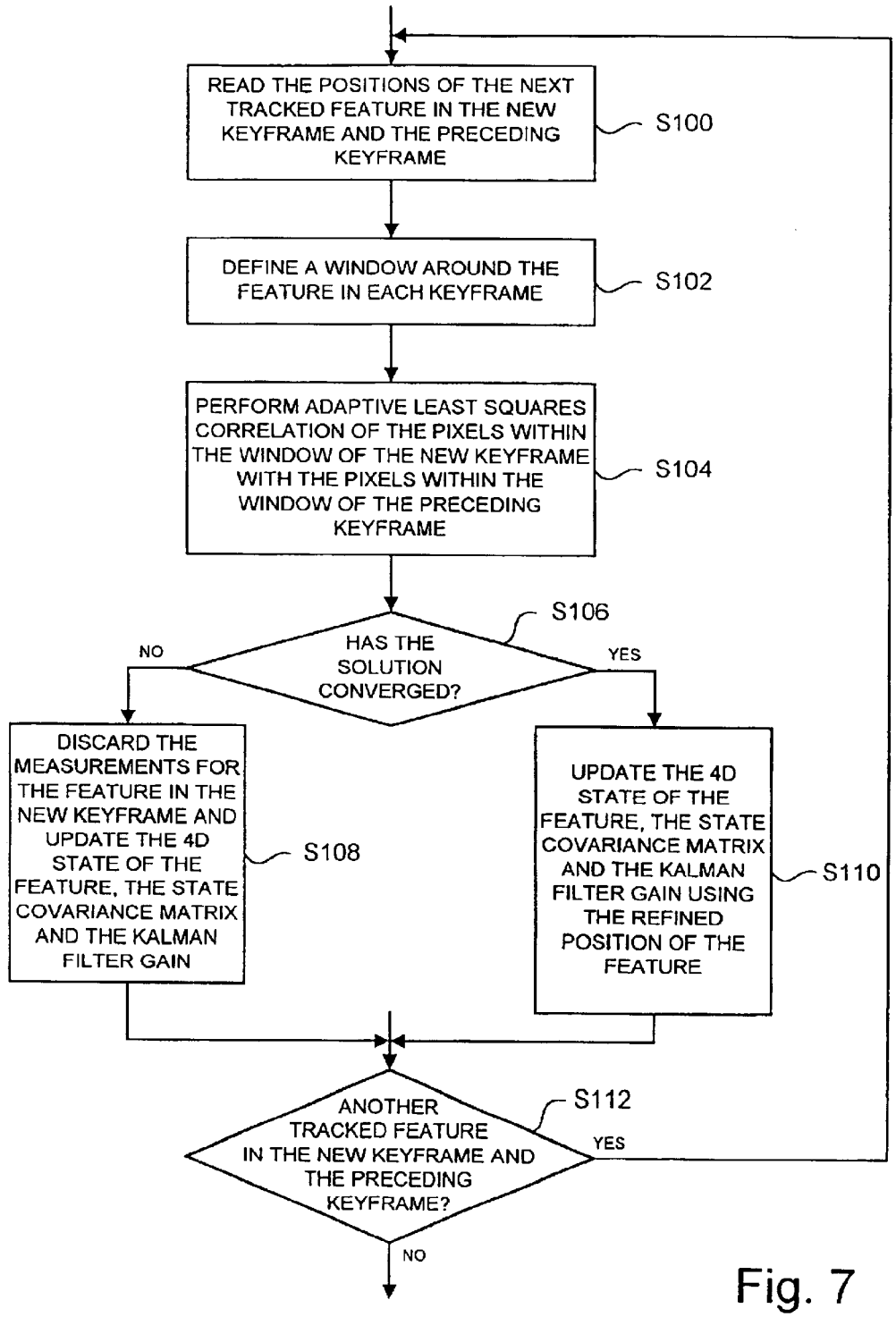
FIG. 7 shows the processing operations performed at step S44 in FIG. 5.

FIG. 7 shows operations performed by feature detector and tracker 50 at step S44.

Referring to FIG. 7, at step S100, feature detector and tracker 50 reads the position of the next tracked feature (this being the first tracked feature the first time step S100 is performed) in the new keyframe designated at step S42 and the position of the same feature in the preceding keyframe.

At step S102, feature detector and tracker 50 defines a respective window of size 15 pixels by 15 pixels in the new keyframe and in the preceding keyframe centred on the position of the tracked feature read at step S100.

At step S104, feature detector and tracker 50 performs adaptive least squares correlation of the pixels within the windows using a conventional technique, for example as described in "Adaptive Least Squares Correlation: A Powerful Image Matching Technique" by A. W. Gruen in Photogrammetry Remote Sensing and Cartography, 14(3), 1985 pages 175–187.

At step S106, feature detector and tracker 50 determines whether the solution of the adaptive least squares correlation performed at step S104 has converged.

If it is determined at step S106 that the solution has not converged, then, at step S108, feature detector and tracker 50 discards the position measurement for the feature in the new keyframe previously made at step S78 (FIG. 6) when performing step S34 (FIG. 5). In addition, feature detector and tracker 50 updates the values of the 4D state, X, of the point, the covariance matrix, K, and the Kalman filter gain, G, previously calculated at step S82 (FIG. 6) when performing step S34 (FIG. 5) using equations (15), (16) and (17) above and the values of X and K existing before the update at step S82 was performed.

On the other hand, if it is determined at step S106 that the solution has converged, then, at step S110, feature detector and tracker 50 updates the values of the 4D state, X, of the point, the state covariance matrix, K, and the Kalman filter gain, G, previously calculated at step S82 (FIG. 6) when performing step S34 (FIG. 5) using the values of X and K existing before the update at step S82 was performed and the value of X calculated at step S104 in equations (9), (10) and (11).

Following the processing steps S100 to S110, the current tracked feature has been dealt with and accordingly, at step S112, feature detector and tracker 50 determines whether there is another tracked feature in the new keyframe and the preceding keyframe. Steps S100 to S112 are then repeated until each tracked feature which is present in both the new keyframe and the preceding keyframe has been processed in the manner described above.

Referring again to FIG. 5, at step S46, feature detector and tracker 50 repeats the processing performed at step S32 for the current keyframe to identify further features to be tracked. As this processing has been described above, it will not be described again here.

At step S48, feature detector and tracker 50 determines whether there is another frame in the input sequence 130, and steps S34 to S48 are repeated until all of the frames have been processed in the manner described above.

Figure 8:
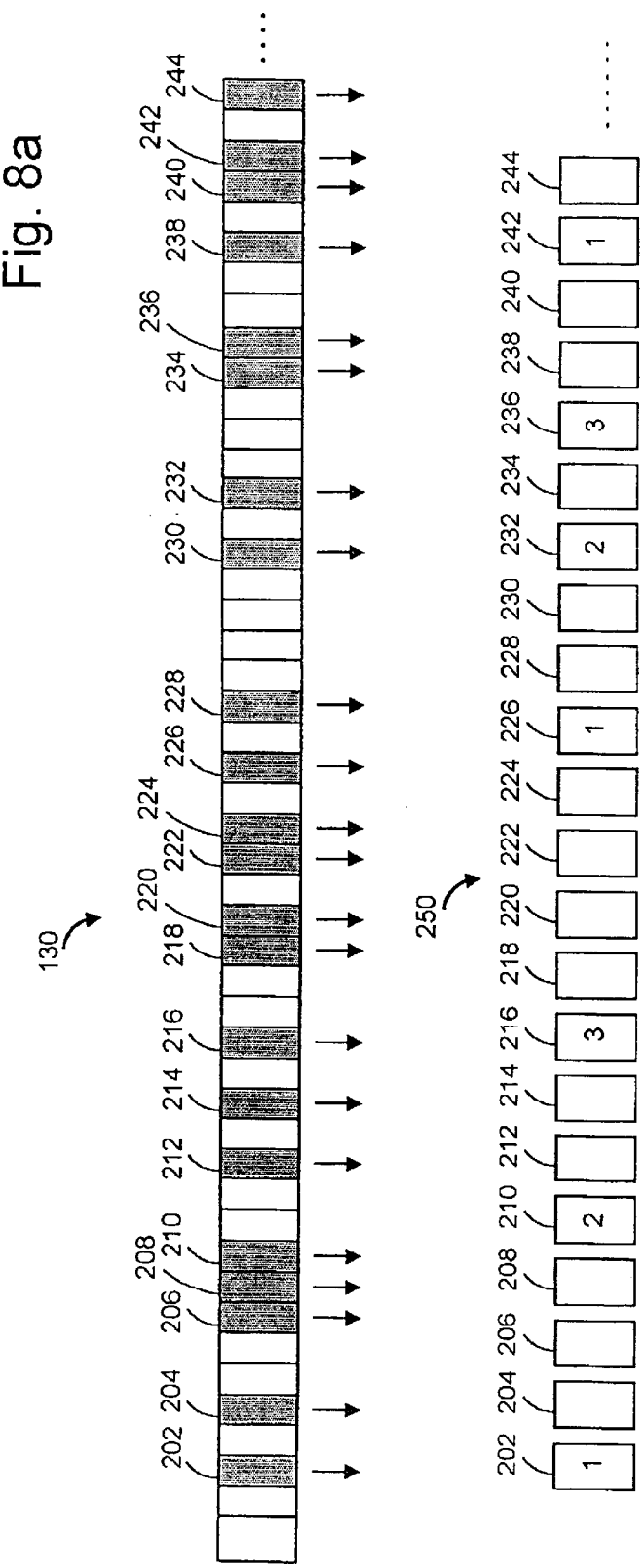
FIGS. 8a and 8b schematically illustrate an example of the selection of keyframes at step S4 in FIG. 3 and the selection of triples of keyframes at step S6 in FIG. 3.

Referring to FIGS. 8a and 8b, in which FIG. 8a shows a part of the sequence 130 of input frames, after performing the processing described above with respect to FIG. 5, processing apparatus 20 has processed the image data for the input sequence 130 to designate a plurality of the frames in the sequence as keyframes 202 to 244 for subsequent processing. Accordingly, a sequence 250 of keyframes has been defined, in which the keyframes are arranged in time-of-recording order and comprise a subset of the frames in the original input sequence 130.

Referring again to FIG. 3, at step S6, keyframe selector 60 together with central controller 30 select so-called "triples" of keyframes, that is respective groups each of which comprises three keyframes, for which subsequent processing will be carried out to determine transformations defining the relationship between the positions and orientations of the camera 140 when the keyframes in the group were recorded.

Figure 9:
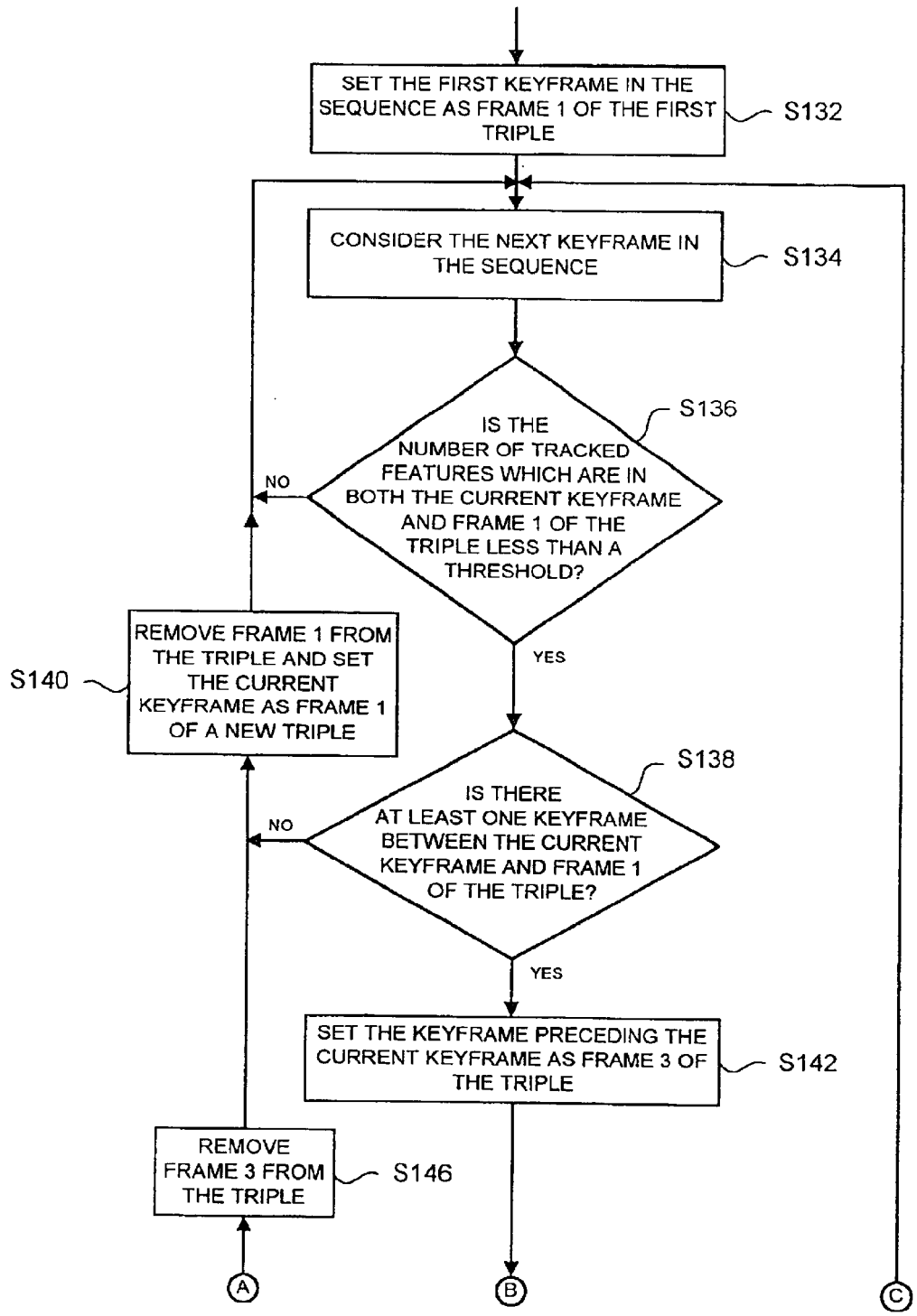
FIG. 9 shows the processing operations performed at step S6 in FIG. 3.
Figure 9:
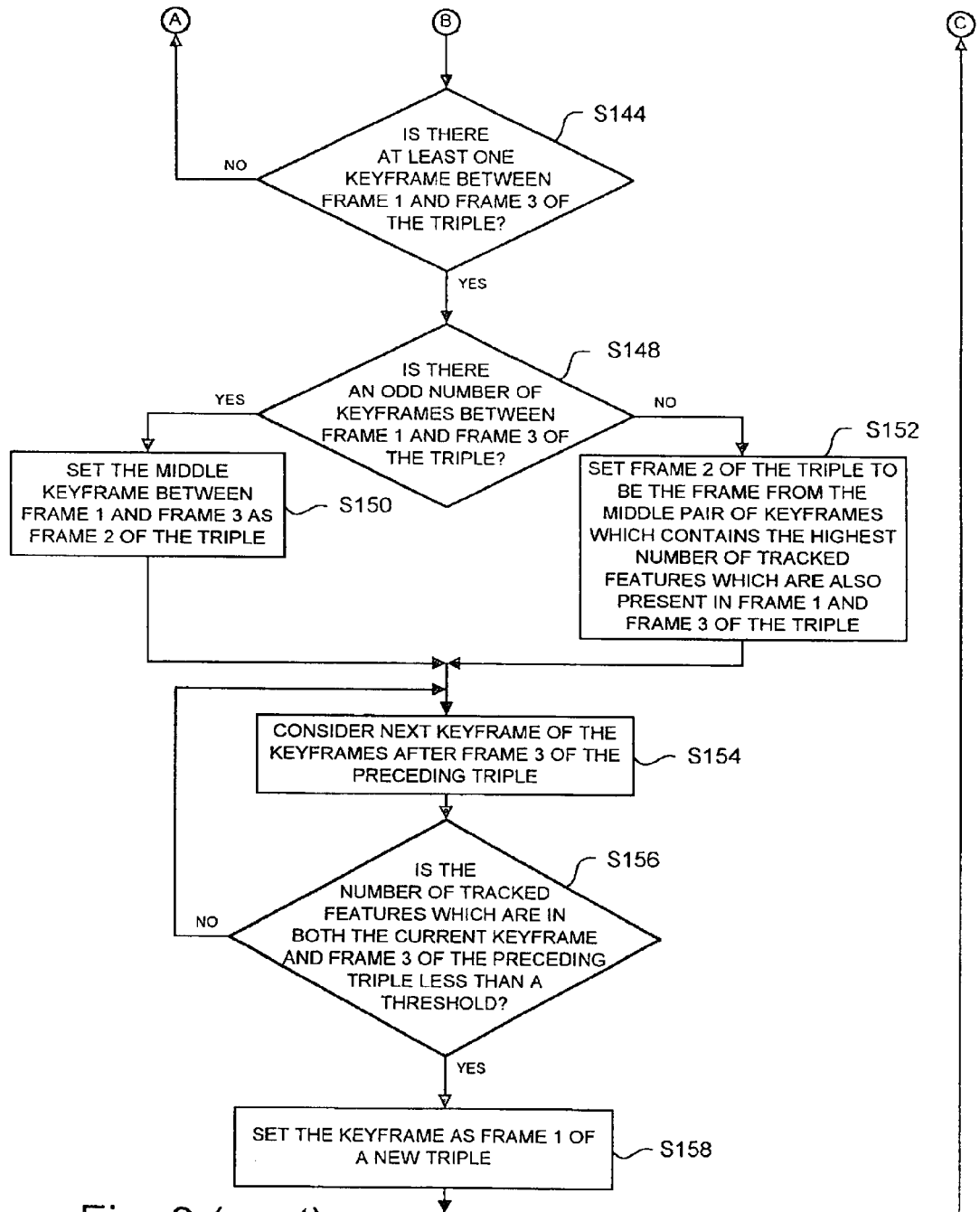

FIG. 9 shows the processing operations performed at step S6.

Referring to FIG. 9, at step S132, keyframe selector 60 sets the first keyframe in the sequence 250 (that is, frame 202 in the example shown in FIG. 8b) to be frame 1 of the first triple.

At step S134, keyframe selector 60 considers the next keyframe in the sequence 250.

At step S136, keyframe selector 60 determines whether the number of tracked features which are in both the current keyframe considered at step S134 and frame 1 of the triple, that is the number of features which have been tracked from frame 1 of the triple to the current keyframe, is less than a threshold value, which is set to ensure that frame 1 and frame 3 of a triple are as far apart as possible without the number of features tracked between the keyframes falling below a threshold. In this embodiment, the threshold is set to 50 features.

If it is determined at step S136 that the number of tracked features common to the current keyframe and frame 1 of the triple is not less than the threshold, steps S134 and S136 are iteratively repeated for each subsequent keyframe in the sequence 250 until it is determined at step S136 that the number of tracked features is less than the threshold value, at which time processing proceeds to step S138.

At step S138, keyframe selector 60 determines whether there is at least one keyframe between the current keyframe and frame 1 of the triple. Referring to the example shown in FIG. 8b, if keyframe 204 was considered at step S134 and it was determined at step S136 that the number of tracked features having a measured position in both keyframe 204 and keyframe 202 was less than the threshold, then it would be determined at step S138 that there was not at least one keyframe between the current keyframe (frame 204) and frame 1 of the triple (frame 202). However, for any other given keyframe in the sequence 250, the would be at least one keyframe between the given keyframe and frame 1 of the triple.

If it is determined at step S138 that there is not at least one keyframe in the sequence 250 between the current keyframe and frame 1 of the triple, then, at step S140, keyframe selector 60 removes frame 1 from the triple and sets the current keyframe as frame 1 of a new triple. Thus, referring to the example shown in FIG. 8b, keyframe 202 would no longer be designated as frame 1 of the first triple, and instead keyframe 204 would be designated as frame 1. Processing then returns to step S134 to consider the next keyframe in the sequence 250, as described above.

On the other hand, if it is determined at step S138 that there is at least one keyframe in the sequence 250 between the current keyframe and frame 1 of the triple, then, at step S142, keyframe selector 60 sets the keyframe preceding the current keyframe in the sequence 250 as frame 3 of the triple. Thus, referring to the example shown in FIG. 8b, if the current keyframe being processed is keyframe 218 and it is determined at step S136 that the number of tracked features is less than the threshold then, because there is at least one keyframe between keyframe 218 and keyframe 202 (which is frame 1 of the triple), at step S142, keyframe 216, (that is, the keyframe immediately preceding keyframe 218 in the sequence 250), is set as frame 3 of the first triple.

By performing processing to set frame 3 of the triple as described above, it is ensured that frames 1 and 3 of the triple are as far apart as possible in the sequence 250 (and hence in distance around object 120, too) without the number of tracked features which are common to the keyframes falling below a threshold. This provides a wide baseline between frame 1 and frame 3 of the triple, which enables more accurate camera transformations to be calculated since, in general, the wider the baseline, the more accurate the calculated camera transformations.

At step S144, keyframe selector 60 determines whether there is at least one keyframe between frame 1 of the triple and frame 3 of the triple which was set at step S142.

If it is determined at step S144 that there are no keyframes between frame 1 and frame 3 of the triple, then processing proceeds to step S146, at which frame 3 is removed from the triple (and consequently becomes a normal keyframe again), and then to step S140, at which frame 1 is removed from the triple and the current keyframe is set as frame 1 of a new triple. The processing then returns to step S134 to consider the next keyframe in the sequence 250 as described above.

On the other hand, if it is determined at step S144 that there is at least one keyframe between frame 1 and frame 3 of the triple, then, at step S148, keyframe selector 60 determines whether there is an odd number of keyframes between frame 1 and frame 3 of the triple.

If it is determined at step S148 that there is an odd number of frames between frame 1 and frame 3 of the triple, then, at step S150, keyframe selector 60 sets the middle frame of the keyframes between frame 1 and frame 3 as frame 2 of the triple.

On the other hand, if it is determined at step S148 that there is an even number of keyframes between frame 1 and frame 3 of the triple, then, at step S152, keyframe selector 60 sets frame 2 of the triple to be the frame from the middle pair of keyframes which contains the highest number of tracked features which are also present in frame 1 and frame 3 of the triple. Thus, referring to FIG. 8b by way of example, there is an even number of keyframes between keyframe 202 (frame 1 of a triple) and keyframe 216 (frame 3 of a triple). Accordingly, keyframe selector 60 selects either keyframe 208 or keyframe 210 as frame 2 of the triple (keyframe 210 in the example shown in FIG. 8b) depending upon which of these two keyframes has the highest number of tracked features which are also present in keyframe 202 and keyframe 216.

At step S154, having set up a triple of keyframes, keyframe selector 60 considers the next keyframe in the sequence 250 after frame 3 of the preceding triple (keyframe 218 in the example shown in FIG. 8b).

At step S156, keyframe selector 60 determines whether the number of tracked features which appear in both the current keyframe considered at step S154 and frame 3 of the preceding triple is less than a threshold. This threshold is set to a low value to ensure that the new triple of keyframes to be created is sufficiently independent from the preceding triple of keyframes (that is, the views of the object 120 present in the new triple to be set up are sufficiently different from the views of the keyframes in the preceding triple). In this embodiment, the threshold value is set to 10 features.

If it is determined at step S156 that the number of tracked features is not less than the threshold, then processing returns to step S154 to consider the next keyframe in the sequence 250. Steps S154 and S156 are repeated to consider each further keyframe in the sequence 250 in turn until it is determined at step S156 that the number of tracked features which are in both the keyframe being considered and frame 3 of the preceding triple is less than the threshold.

When it is determined at step S156 that the number of tracked features in the current keyframe and frame 3 of the preceding triple is less than the threshold, then, at step S158, keyframe selector 60 sets the current keyframe as frame 1 of a new triple.

Processing then returns to step S134 to define frame 3 and frame 2 of the triple and to define further triples of keyframes in the manner described above.

After performing the processing described above with respect to FIG. 9, processing apparatus 20 has processed the keyframes in sequence 250 to define a plurality of triples of keyframes, each triple comprising three of the keyframes from the sequence 250. In addition, as a result of selecting the keyframes to make up a triple as described above, none of the resulting triples overlap in the sequence 250.

As shown in the example in FIG. 8b, the keyframes within a triple will typically have further keyframes therebetween (for example keyframes 204, 206 and 208 are between frame 1 and frame 2 of the first triple and keyframes 212 and 214 are between frame 2 and frame 3 of the first triple). Further, successive triples will also typically have keyframes therebetween (for example keyframes 218 to 224 are between the first triple and the second triple in the example shown in FIG. 8b).

Referring again to FIG. 3, at step S8, camera transformation calculator 70 calculates and tests transformations defining the relationships between the positions and orientations at which frame 1, frame 2 and frame 3 of each of the triples of keyframes defined at step S6 were recorded. The calculated transformations are then stored in camera transformation store 100.

In this embodiment, for each given triple of keyframes, camera transformation calculator 70 calculates transformations for frame 2 and frame 3 which are relative to frame 1 of the triple, that is, which define the movement of the camera 140 to frame 2 and frame 3 from the position of frame 1 in the given triple. As a result of this processing, a respective "set" of keyframes is created from each triple, a set being a group of keyframes in which the camera projection for each frame in the set is defined relative to another frame in the set.

Figure 10:
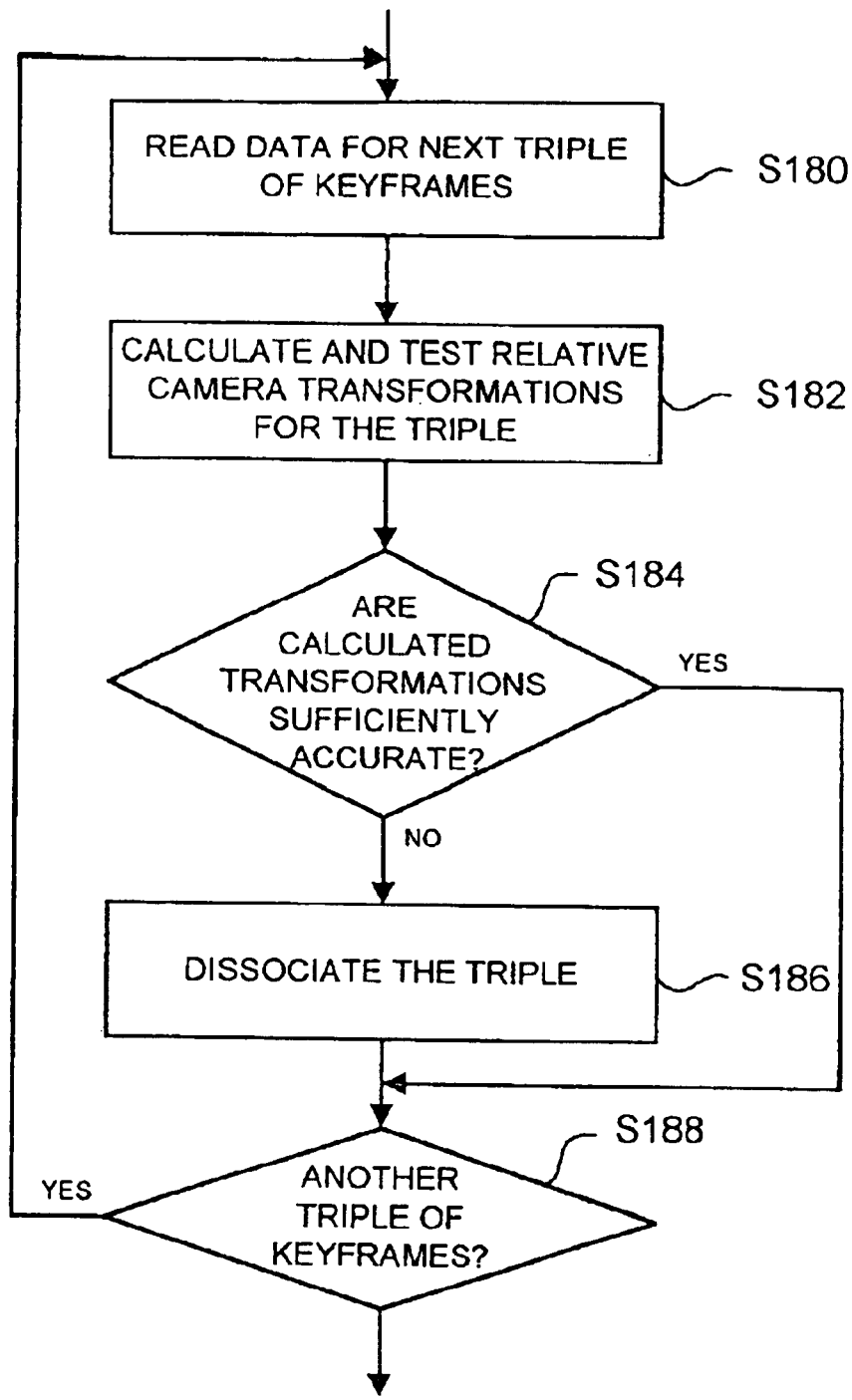
FIG. 10 shows the processing operations performed at step S8 in FIG. 3.

FIG. 10 shows the processing operations performed by camera transformation calculator 70 at step S8.

Referring to FIG. 10, at step S180, camera transformation calculator 70 reads data previously generated by feature detector and tracker 50 defining the positions of matching feature points (points which represent the same actual point on the object 120) in frame 1, frame 2 and frame 3 of the next triple (this being the first triple the first time step S180 is performed). That is, camera transformation calculator 70 reads data defining the positions of feature points tracked between frame 1 and frame 2 of the triple, between frame 1 and frame 3 of the triple, and between frame 2 and frame 3 of the triple.

At step S182, camera transformation calculator 70 calculates and tests transformations which define the movement of the camera 140 from the position and orientation at which frame 1 of the triple was recorded to the position and orientation at which frame 2 of the triple was recorded, and transformations which define the movement of the camera 140 from the position and orientation at which frame 2 of the triple was recorded to the position and orientation at which frame 3 of the triple was recorded.

To perform the processing at step S182, camera transformation calculator 70 uses a first procedure defined in procedure instruction store 80. More particularly, in this embodiment, the processing performed at step S182 by camera transformation calculator 70 is the same as the processing described with respect to FIGS. 21 to 35 in EP-A-0898245, EP-A-0901105, and pending U.S. application Ser. Nos. 09/129,077, 09/129,079 and 09/129,080. The full contents of pending U.S. application Ser. Nos. 09/129,077, 09/129,079 and 09/129,080 are incorporated herein by cross-reference. Accordingly, the processing will not be described again here in detail. In summary, however, to calculate the relative camera transformations at step S182, camera transformation calculator 70 calculates a full perspective transformation and a scaled affine transformation defining the movement between frame 1 and frame 2 in the triple, and a full perspective transformation and a scaled affine transformation defining the movement between frame 2 and frame 3 in the triple. Camera transformation calculator 70 then considers each combination of these transformations to select the best transformations defining the movement between frame 1, frame 2 and frame 3 as a whole. To test the calculated transformations for the triple as a whole, camera transformation calculator 70 uses matching feature points in frame 1 and frame 3 of the triple and the calculated positions and orientations of these frames to estimate the position in three-dimensions of the point on the object 120 which the feature points represent. The estimated 3D point is then projected into frame 2 of the triple using the calculated transformations, and the distance between the projected point in frame 2 and the position of the feature point in frame 2 as measured by feature detector and tracker 50 is calculated. The total number of points for which this distance is less than a threshold is then used as an accuracy measure of the calculated transformations, together with an error measurement based on the total of all of the distances between projected points and measured points in frame 2.

At step S184, camera transformation calculator 70 determines whether the transformations calculated at step S182 are sufficiently accurate. The processing performed at this step comprises reading whether the tests performed at step S184 determined whether the calculated transformations were sufficiently accurate (determined at step S362 or S370 in FIG. 28 of EP-A-0898245, EP-A-0901105, or pending U.S. application Ser. Nos. 09/129,077, 09/129,079 and 09/129,080).

If it is determined at step S184 that the calculated transformations are not sufficiently accurate, then, at step S186, camera transformation calculator 70 dissociates the triple of keyframes currently being considered. On the other hand, if it is determined at step S184 that the calculated transformations are sufficiently accurate, then step S186 is omitted, and the calculated transformations are stored in camera transformation store 100.

At step S188, camera transformation calculator 70 determines whether there is another triple of keyframes to be processed. Steps S180 to S188 are repeated until each triple of keyframes has been processed in the manner described above.

After performing the processing at step S8, camera transformation calculator 20 has formed a set of keyframes from each triple of keyframes by calculating, for each triple, the position and orientation of frame 2 in the triple relative to frame 1 in the triple and the position and orientation of frame 3 in the triple relative to frame 2 in the triple. Thus, referring to FIG. 11, the position and orientation of keyframe 210 has been calculated relative to keyframe 202, and the position and orientation of keyframe 216 has been calculated relative to keyframe 210. Similarly, the position and orientation of keyframe 232 has been calculated relative to keyframe 226, and the position and orientation of keyframe 236 has been calculated relative to keyframe 232.

At this stage, transformations have not been calculated for keyframes between the keyframes making up a triple (that is, the frames 204, 206, 208, 212, 214, 228, 230, 234 and 244 in the example shown in FIG. 11) or for keyframes between frame 3 of one triple and frame 1 of the next triple (that is, keyframes 218, 220, 222, 224, 238 and 240).

Referring again to FIG. 3, at step S10, camera transformation calculator 70 considers each triple of keyframes which has additional keyframes between frame 1 and frame 2 and/or between frame 2 and frame 3 of the triple, and performs processing to calculate camera transformations for the additional keyframes.

More particularly, at step S10, camera transformation calculator 70 calculates relative transformations for each keyframe lying between frame 1 and frame 2 and between frame 2 and frame 3 of the triple (that is, transformations defining the movement of the camera 140 from frame 1 of the triple to the keyframe), and subsequently refines the calculated camera transformations.

Figure 12:
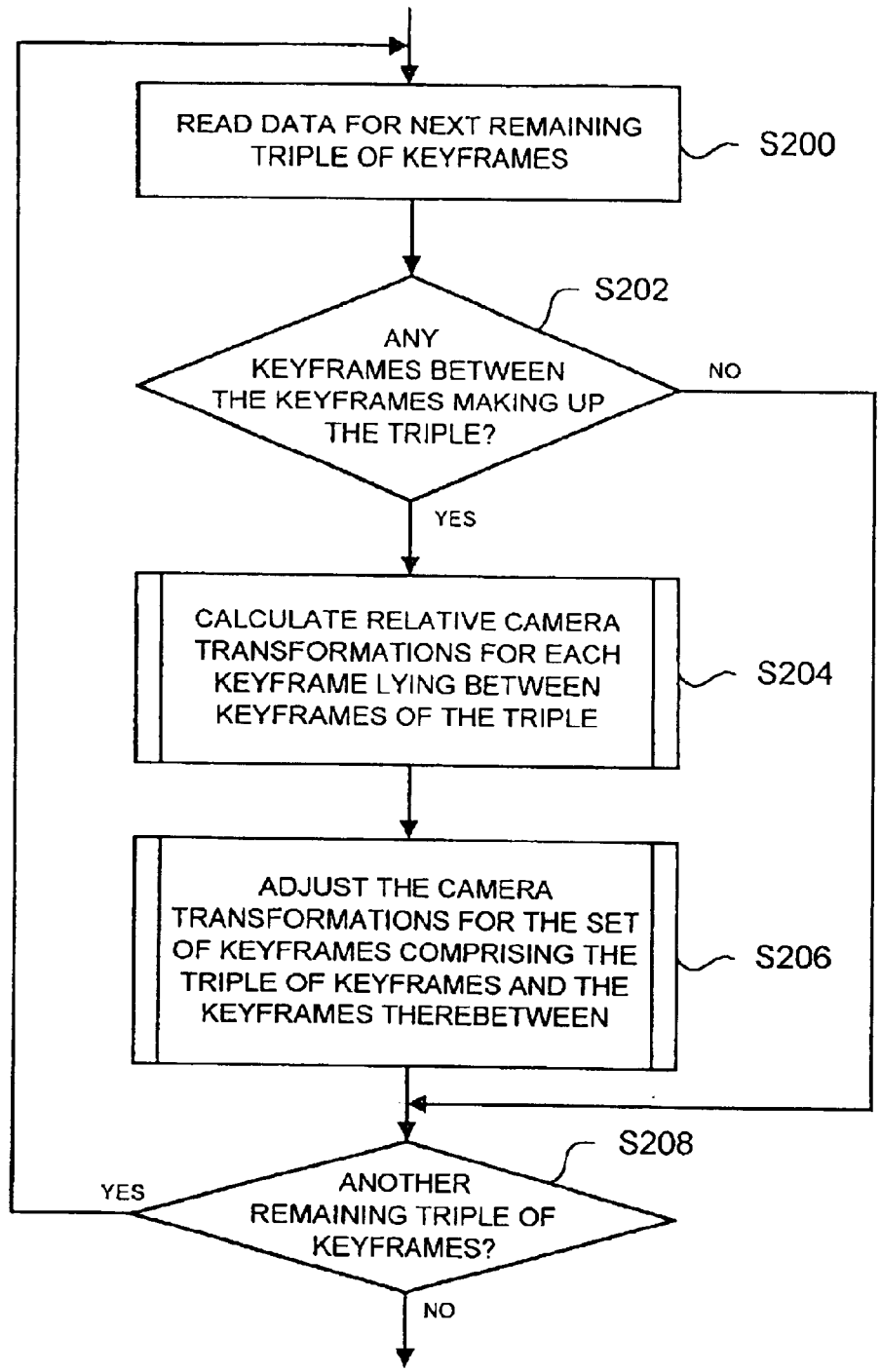
FIG. 12 shows the processing operations performed at step S10 in FIG. 3.

FIG. 12 shows the processing operations performed by camera transformation calculator 70 at step S10.

Referring to FIG. 12, at step S200, camera transformation calculator 70 reads data defining which keyframes make up the next remaining triple of keyframes (that is, the next triple which remains after the processing described above with respect to FIG. 10 has been performed, in which some triples may have been dissociated if the calculated camera transformations were not sufficiently accurate).

At step S202, camera transformation calculator 70 determines whether there are any keyframes between frame 1 and frame 2 of the triple and/or between frame 2 and frame 3 of the triple. If it is determined that there are no such keyframes, then processing proceeds to step S208, at which it is determined whether there is another remaining triple of keyframes, and, if there is, to step S200 at which the next triple is considered.

On the other hand, if it is determined at step S202 that there is at least one keyframe between frames 1, 2 and 3 of the triple, then, at step S204, camera transformation calculator 70 calculates relative camera transformations for each of the keyframes lying between the keyframes of the triple.

Figure 13:
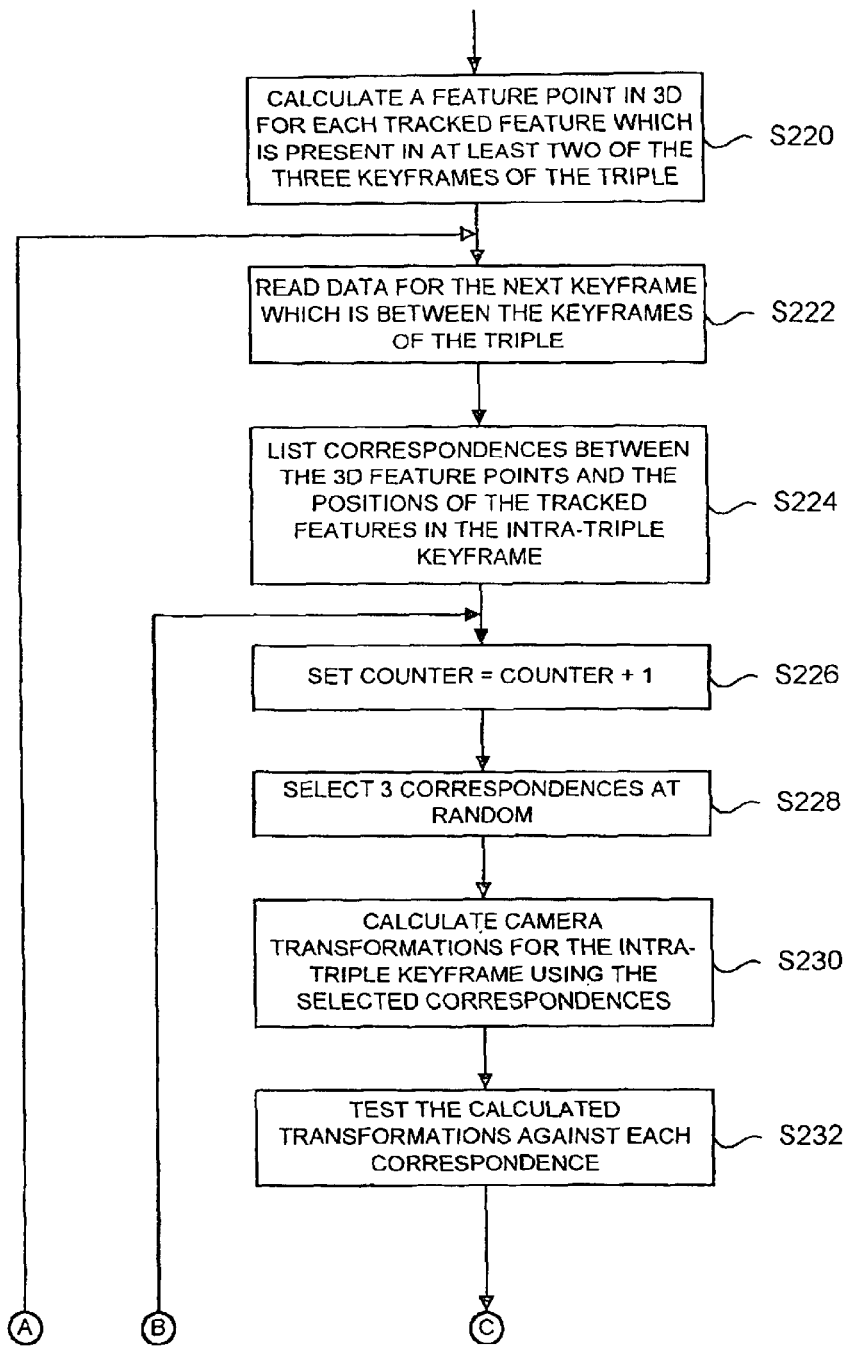
FIG. 13 shows the processing operations performed at step S204 in FIG. 12.
Figure 13:
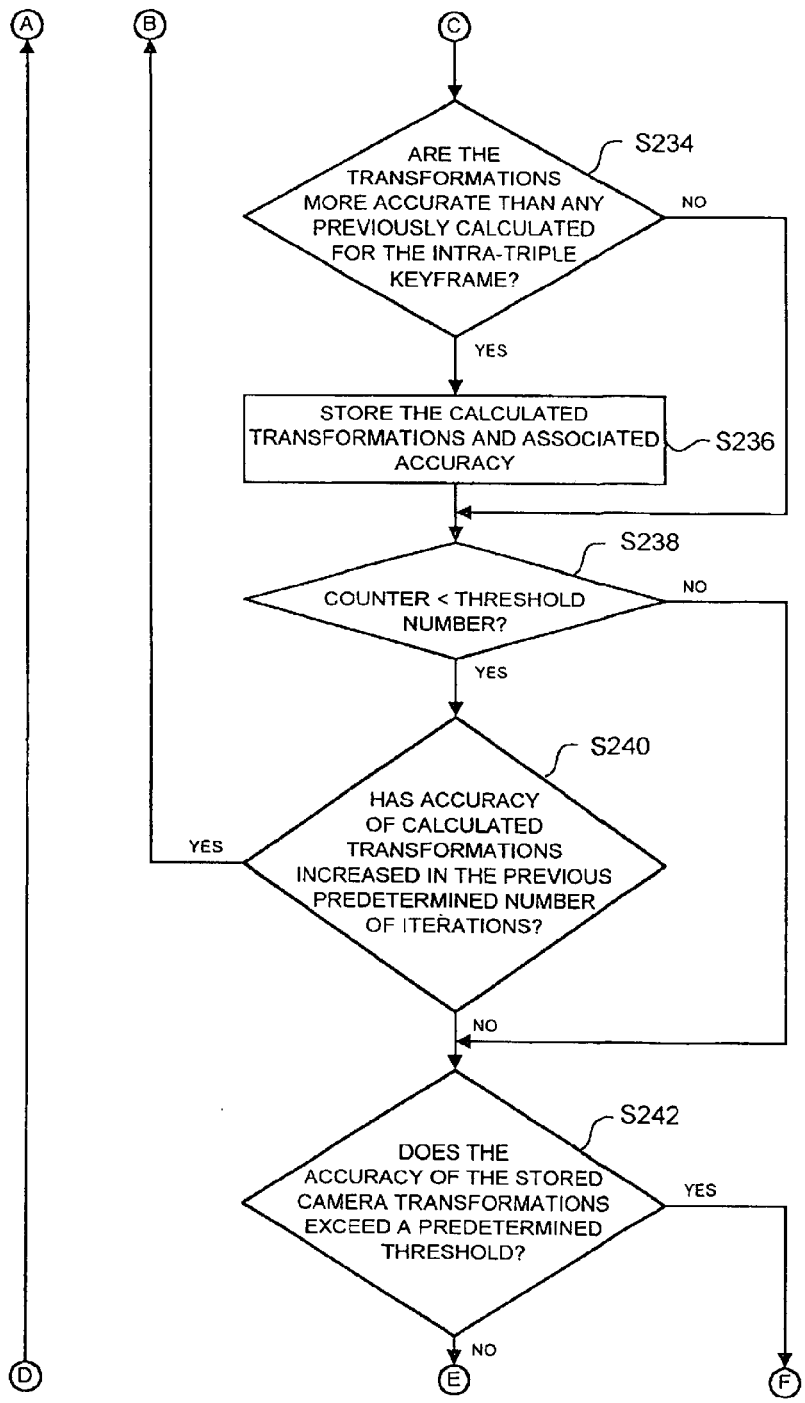
Figure 13:
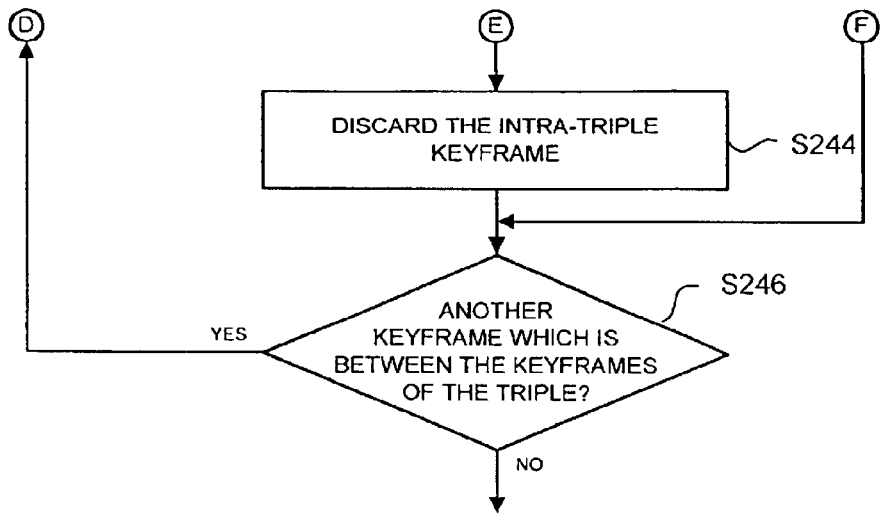

FIG. 13 shows the processing operations performed at step S204 by camera transformation calculator 70.

Referring to FIG. 13, at step S220, camera transformation calculator 70 calculates the position in three-dimensions of a feature point for each feature tracked by feature detector and tracker 50 which is present in at least two of the three keyframes of the triple. Each feature point calculated at step S220 therefore represents the position of an actual point on the object 120 in three-dimensions predicted on the basis of the position of the feature in the keyframes and the positions and orientations of the keyframes previously calculated at step S8. In this embodiment, camera transformation calculator 70 calculates the 3D position of each feature point using the technique described in EP-A-0898245, EP-A-0901105 and pending U.S. application Ser. Nos. 09/129,077, 09/129,079 and 09/129,080 with respect to FIGS. 41 to 48 therein.

At step S222, camera transformation calculator 70 reads data for the next keyframe (this being the first keyframe the first time step S222 is performed) which is between the keyframes of the triple (an "intra-triple" keyframe).

Figure 14:
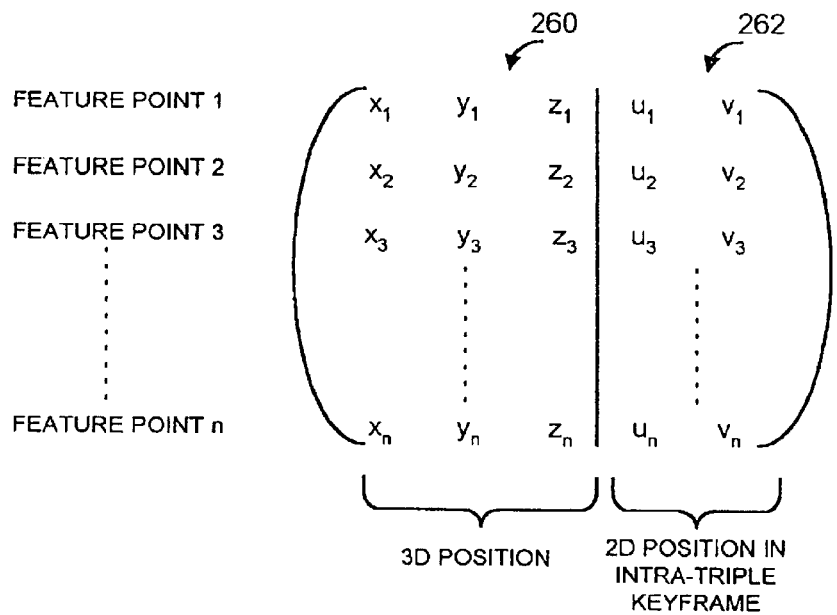
FIG. 14 shows an example of a list of correspondences generated at step S224 in FIG. 13.

At step S224, camera transformation calculator 70 generates a list of correspondences between the 3D positions of the feature points calculated at step S220 and the 2D positions of the corresponding features in the intra-triple keyframe for which data was read at step S222. More particularly, referring to FIG. 14, for each feature point 1 to "n" which has both a 2D position in the intra-triple keyframe (previously calculated by feature detector and tracker 50) and a 3D position (calculated at step S220), camera transformation calculator 70 lists the coordinates 260 of the 3D position and the coordinates 262 of the 2D position.

At step S226, camera transformation calculator 70 increments the value of a counter by 1 (the counter being set to the value 1 the first time step S226 is performed).

At step S228, camera transformation calculator 70 selects at random three of the correspondences listed at step S224 (each correspondence defining the coordinates 260 of the feature point in 3D and the coordinates 262 of the feature in the intra-triple keyframe).

At step S230, camera transformation calculator 70 uses the three correspondences selected at step S228 to calculate transformations defining the movement of the camera 140 from frame 1 in the triple to the intra-triple keyframe, in accordance with instructions stored in procedure instruction store 80 defining a second transformation calculation procedure. More particularly, camera transformation calculator 70 performs processing at step S230 to calculate the transformations in a conventional manner, for example as described in section 13.4.15 of "Computer and Robot Vision Volume 2", by R. M. Haralick and L. G. Shapiro, Addison-Wesley Publishing Company, 1993, ISBN 0-201-56943-4 (v.2).

At step S232, camera transformation calculator 70 tests the transformations calculated at step S230 against each of the correspondences which were listed at step S224. More particularly, for each feature point listed in the correspondences generated at step S224, camera transformation calculator 70 calculates the distance between the position of the feature in the intra-triple keyframe as measured by the feature detector and tracker 50 (defined by the U, V coordinates 262 in FIG. 14) and the position in the intra-triple keyframe of the corresponding 3D feature point calculated at step S220 when projected into the intra-triple keyframe using the transformations calculated at step S230, and determines whether the calculated distance between these positions is less than a threshold. This processing is performed using the following equation, and is repeated for each point listed in the correspondences generated at step S224, to determine the number of points for which the inequality holds:

$$\left| x_i - \frac{PX_i}{(PX_i)_3} \right| < d \qquad (20)$$

where: $x_i$ is the position of the "i"th tracked feature in the inta-triple keyframe, given by $x_i = (u_i, v_i, 1)$;

$X_i$ is the position of the "i"th tracked feature in 3D (calculated at step S220), given by $X_i = (x_i, y_i, z_i, 1)$;

"P" defines the camera transformations calculated at step S230, which is a 3 by 4 matrix, and is given in a conventional manner by P=K[R t], which K is a matrix defining the intrinsic parameters of the camera 140, "R" is the calculated rotation and "t" is the calculated translation;

$(PX_i)_3$ is the third component of the vector $PX_i$;

$P\underline{X}_i/(PX_i)_3$ is the predicted position of the "i"th 3D feature point in the intra-triple keyframe on the basis of the calculated camera transformations; and "d" is a threshold value, which, in this embodiment, is set to d=3 pixels.

At step S234, camera transformation calculator 70 determines whether the camera transformations calculated at step S230 and tested at step S232 are more accurate than any camera transformations calculated when step S230 was performed during a previous iteration. More, particularly, camera transformation calculator 70 determines from the result of the tests performed at step S232 whether the number of points which satisfy the inequality given in equation (20) is greater than the number of points which satisfied the inequality when the current most accurate camera transformations were tested.

If it is determined at step S234 that the calculated transformations are more accurate than any calculated at step S230 during a previous iteration, then, at step S236, camera transformation calculator 70 stores the calculated transformations together with the number of points satisfying the inequality defined in equation (20) in camera transformation store 100. On the other hand, if it is determined that step S234 that the camera transformations are not more accurate than any previously calculated, then step S236 is omitted.

At step S238, camera transformation calculator 70 determines whether the value of the counter incremented at step S226 is less than a threshold number defining the maximum number of iterations of steps S226 to S236 to be performed, which, in this embodiment, is set to 100,000.

If it is determined at step S238 that the counter value is less than the threshold (indicating that the required number of iterations have not yet been performed), then, at step S240, camera transformation calculator 70 determines whether the accuracy of the camera transformations calculated at step S230 (represented by the number of points satisfying the inequality in equation (20) tested at step S232) has increased in the last 20,000 iterations of steps S226 to S238.

If it is determined at step S240 that the accuracy has increased during the last 20,000 iterations, then it is determined that it is worthwhile performing further iterations, and steps S226 to S240 are repeated.

On the other hand, if it is determined at step S240 that there has not been any change in the accuracy of the calculated camera transformations, or if it is determined at step S238 that the counter value is no longer less than the threshold, then no further camera transformations are calculated for the current intra-triple keyframe, and processing proceeds to step S242.

At step S242, camera transformation calculator 70 determines whether the accuracy of the camera transformations for the intra-triple keyframe currently stored (that is, the most accurate transformations calculated) exceeds a predetermined threshold. More particularly, camera transformation calculator 70 determines whether the number of points satisfying the inequality given by equation (20) for the stored camera transformations exceeds the value five.

If it is determined at step S242 that the accuracy of the camera transformations does not exceed the threshold, then, at step S244, the intra-triple keyframe is discarded so that it no longer forms part of the sequence of keyframes 250. On the other band, if it is determined at step S242 that the accuracy of the stored transformations does exceed the threshold, then step S244 is omitted.

At step S246, camera transformation calculator 70 determines whether there is another keyframe which is between the keyframes of the triple currently being considered, and steps S222 to S246 are repeated until each intra-triple keyframe has been processed in the manner described above.

As a result of performing the processing at step S204 (FIG. 12) to calculate camera transformations defining the position and orientation of each intra-triple keyframe within a given triple, processing apparatus 20 has increased the number of keyframes in the set (which originally comprised just the triple of keyframes). The position and orientation of each keyframe in the set is defined relative to the first frame in the set (that is, frame 1 of the original triple). Thus, referring to the example shown in FIG. 15a, an expanded set 266 of keyframes is created by performing the processing described above with respect to FIG. 13 for the first triple of keyframes in the example shown in FIG. 11. The expanded set 266 comprises the keyframes 202, 210 and 216 making up the original triple together with the original intra-triple keyframes 204, 206, 208, 212 and 214. As discussed previously, the position and orientation of each of keyframes 204 to 216 is defined relative to keyframe 202.

Referring again to FIG. 12, at step S206, camera transformation calculator 70 uses a third transformation calculation procedure defined by instructions stored in procedure instruction store 80 to refine the camera transformations for the expanded set of keyframes generated at step S204, so that error in the calculated transformations is minimised and distributed evenly through the keyframes in the set. The refined transformations are then stored in camera transformation store 100.

Figure 15A:
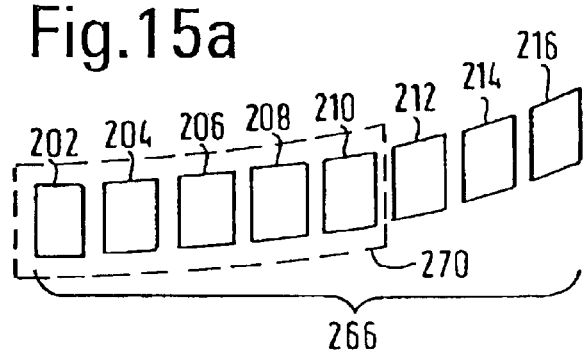
FIGS. 15a, 15b, 15c and 15d schematically illustrate the processing performed at step S206 in FIG. 12.
Figure 15B:
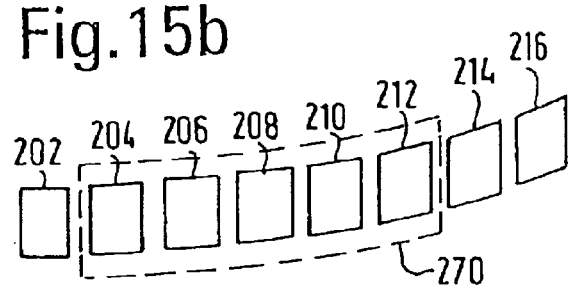
Figure 15C:
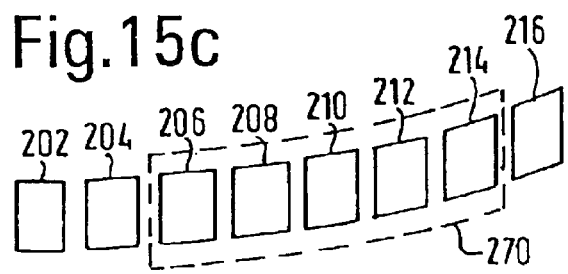

Referring to FIGS. 15a to 15d, in this embodiment, at step S206, camera transformation calculator 70 refines the camera transformations in stages, considering at each stage the calculated camera transformations for a different subset of the keyframes within the overall set. More particularly, referring to FIG. 15a, in the first stage of processing, camera transformation calculator 70 considers a "window" 270 containing a number of keyframes, and refines the camera transformations for the keyframes within the window. Referring to FIG. 15b, during the second stage of processing, camera transformation calculator 70 moves the window 270 by one keyframe within the set 266, and considers the next subset of keyframes which now lie within the window to refine the camera transformations therefor. Similarly, referring to FIG. 15c and FIG. 15d, during subsequent stages of processing, camera transformation calculator 70 again moves the window 270 by one keyframe at each stage and refines the calculated camera transformations for the keyframes within the window. In this way, the camera transformations for every keyframe within the set 266 are refined, but only a subset (window) of the keyframes are considered at each stage, thereby significantly reducing processing requirements. This method of refining the camera transformations is particularly applicable where there are a large number of keyframes and/or a large number of tracked features in the keyframes (rather than the small number of keyframes within set 266 shown in FIGS. 15a to 15d, which is used for illustration purposes only).

Figure 16:
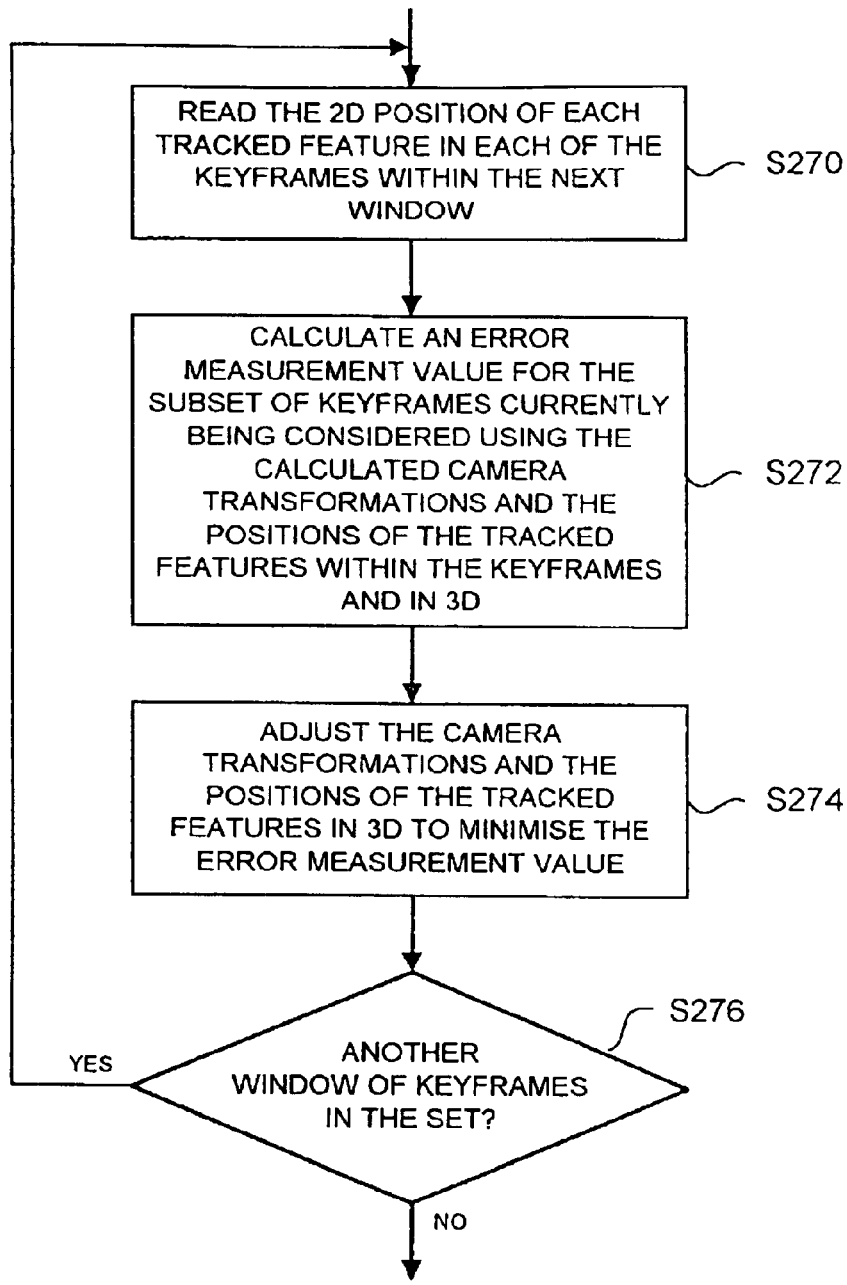
FIG. 16 shows the processing operations performed at step S206 in FIG. 12.

FIG. 16 shows the processing operations perform ed by camera transformation calculator 70 at step S206.

Referring to FIG. 16, at step S270, camera transformation calculator 70 reads the 2D position of each tracked feature point in each of the keyframes within the next window (this being the first window, that is the first selected number of keyframes in the set, the first time step S270 is performed).

In the example shown in FIGS. 15a to 15d, the window 270 has a size of five keyframes. However, in practice, the size of the window 270 is set taking into account the number of keyframes within the set 266 to be processed, the number of tracked features therein, the time available to carry out the processing, and the processing resources available to carry out the processing. More particularly, as camera transformation calculator 70 increases the number of keyframes within the window 270, the amount of processing operations to be performed increases, although the accuracy of the adjusted camera transformations will also increase.

Figure 17:
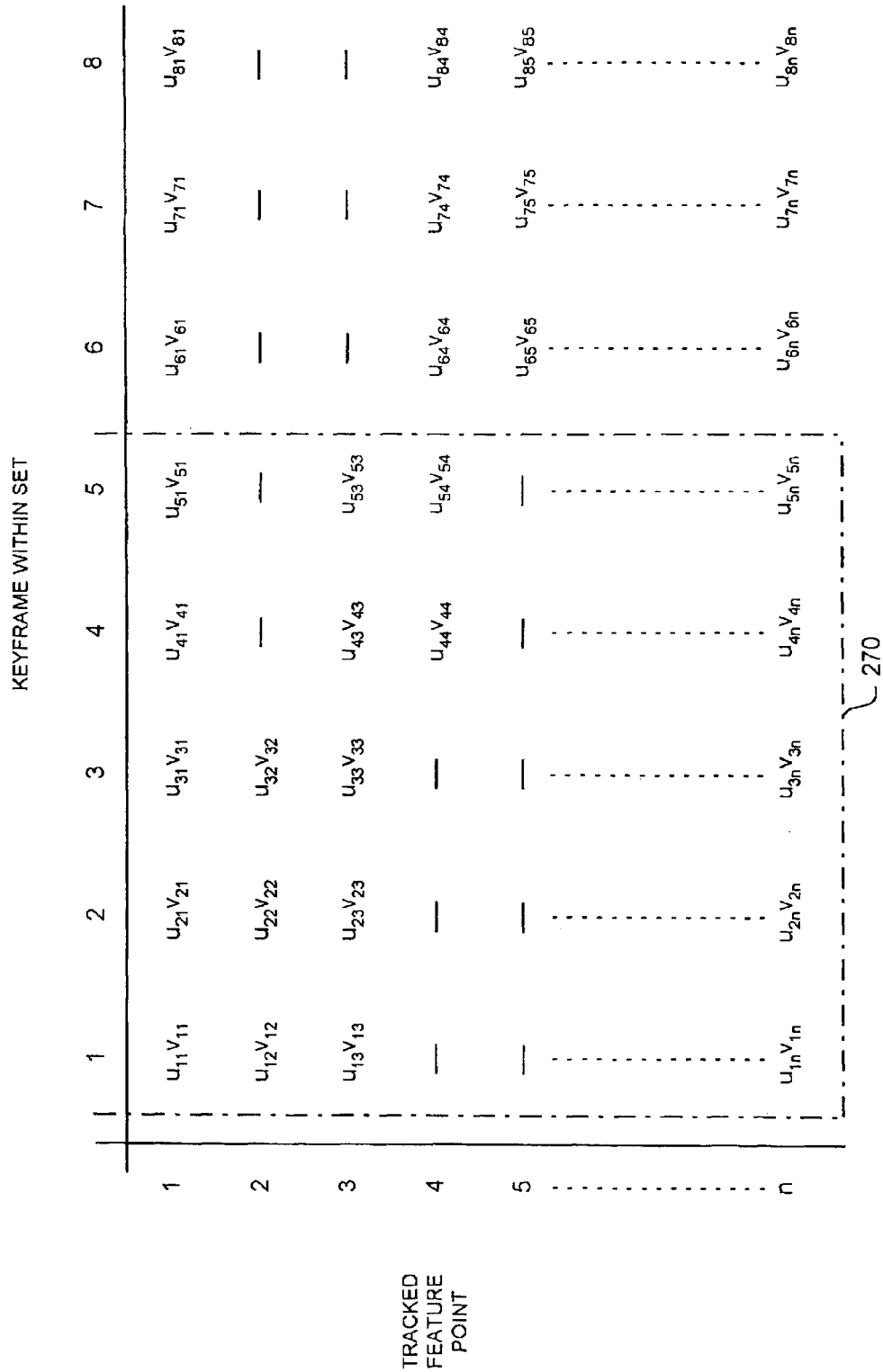
FIG. 17 shows an example of data read at step S270 in FIG. 16.

Referring to FIG. 17, an example is shown of a list of each tracked feature point 1 to "n" which appears in any of the keyframes in the set 266 in the example shown in FIGS. 15a to 15d, together with the position (U, V) of each feature point in each keyframe within the set 266. For example, tracked feature point 1 has a position $U_{11}$, $V_{11}$) within, frame 1 (that is, frame 202 of the set), a position ($U_{21}$, $V_{21}$) in the second keyframe 204 of the set, a position ($U_{31}$, $V_{31}$) in the third keyframe 206 of the set, etc. Similarly, tracked feature point 2 has a position ($U_{12}$, $V_{12}$) in the first keyframe 202 of the set etc. but was not tracked into the fourth to eighth frames in the set by feature detector and tracker 50 and accordingly does not have a position within these frames.

At step S270, therefore, camera transformation calculator 70 reads the 2D coordinates (U, V) within the window 270 shown in FIG. 17, that is the coordinates of each tracked feature point which has a position within at least one keyframe within the window 270. Thus, referring to the example shown in FIG. 17, the coordinates within the window 270 of each of the tracked feature points 1, 2, 3, 4 and "n" (and possibly others between 5 and "n") is read since each of these points has a (U, V) value (that is, a measured position) within the window 270. However, the tracked feature point 5 is not taken into consideration because this point does not have a position in any of the keyframes within the window 270.

Referring again to FIG. 16, at step S272, camera transformation calculator 70 calculates an error measurement value using the 2D positions of the tracked features read at step S270, the 3D positions calculated at step S220 (FIG. 13) which correspond to the tracked features read at step S270, and the camera transformations for the subset of keyframes within the window 270 previously calculated at step S182 (if the keyframe was part of the original triple of keyframes) or at step S204 (if the keyframe was an intra-triple keyframe).

More particularly, in this embodiment, camera transformation calculator 70 calculates the error measurement value by determining, for each keyframe in the window 270 and each tracked feature point which has a measured position in at least one of the keyframes in the window 270, the difference between the position of the tracked feature point in the keyframe as measured by feature detector and tracker 50 and the position of the corresponding 3D point when projected into the keyframe using the calculated camera transformations, squaring these distances and summing the squared distances. More particularly, camera transformation calculator 70 calculates an error measurement value, E(P,X), as follows:

$$E(P, X) = \sum_{i,j,\alpha} \left[ (x_{ij})_\alpha - \frac{(P_i X_j)_\alpha}{(P_i X_j)_3} \right]^2 W_{ij} \quad (21)$$

where: "i" labels keyframes within the window 270 (in the example shown in FIG. 17, i=1 . . . 5);
"j" labels the tracked feature points which have a position measured by feature detector and tracker 50 in at least one of the keyframes in the window 270;
"α"=1, 2, being the column and the row of the position of a tracked feature point or projected point in a keyframe;

"x" is the position of a tracked feature point in a keyframe within window 270 measured by feature detector and tracker 50, given in terms of the column or row (depending on the value of "α") of the pixel representing the tracked feature point (this may be a subpixel value, that is, the column or row values are not necessarily integers);
"X" is the position of a feature point in 3D (calculated at step S220), given by X=(x, y, z, 1);
"P" defines the camera transformations for a keyframe (calculated at step S182 or step S204). "P" is a 3 by 4 matrix, and is given in a conventional manner by P=K[R t], in which "K" is a matrix defining the intrinsic parameters of the camera 140, "R" is the calculated rotation and "t" is the calculated translation. The camera transformations for the first keyframe in a set (frame 202 in the example shown in FIG. 15a) are given by P=K[I, O], where "T" is the identity matrix (since the transformation for subsequent keyframes are defined relative to the first keyframe);
$(PX)_3$ is the third component of the vector PX;
$PX/(X)_3$ is the predicted position when a 3D feature point is projected into a keyframe on the basis of the calculated camera transformations. The predicted position is given in terms of the column or row (depending on the value of "α") of the pixel representing the projected feature point;
"W" is a weighting factor, which, in this embodiment, is fixed and is set to:

$$W_{ij} = \frac{1}{\sigma_{ij}^2} \quad (22)$$

where $\sigma^2$ represents the positional uncertainty, and is set, in this embodiment, to $\sigma^2=1$.

At step S274, camera transformation calculator 70 adjusts the previously calculated camera transformations of the keyframes in the window 270 (that is, P in equation 21) and the 3D positions of selected feature points (that is, "X" in equation 21) previously calculated at step S220 in accordance with a minimisation algorithm to minimise the error measurement value calculated at step S272. More particularly, camera transformation calculator 70 adjusts the calculated camera transformations (P) for each keyframe in the window 270 and the 3D positions (X) for each feature point which corresponds to a tracked feature having a measured position (u, v) within at least one keyframe in the window 270 but no measured position in keyframes within the set which are outside the window 270. Thus, referring to the example shown in FIG. 17, the camera transformations for the keyframes 1 to 5 and the 3D positions of feature point 2 and feature point 3 are adjusted, but not the 3D positions of feature points 1, 4 and "n". After adjusting the camera transformations (P) and the 3D positions (X), camera transformation calculator 70 performs processing to recalculate the error measurement value in accordance with equation (21) by using the adjusted camera transformations to reproject the adjusted 3D feature points and the unchanged 3D feature points which correspond to a tracked feature having a measured position (u, v) in at least one keyframe in the window 270 and a measured position (u, v) in another keyframe in the set outside the window 270.

This processing is performed in an iterative manner, with the camera transformations (P) and 3D positions (X) being adjusted and the error measurement value being recalculated in accordance with equation (21) using the adjusted values at each iteration, and the iterations being continued until the error measurement value converges to a minimum value. In this embodiment, when adjusting the camera transformations, P, the values defining the intrinsic parameters, K, of the camera 140 remain fixed, and the camera transformations for the keyframe in the set which was originally frame 1 of the triple also remain fixed (since the camera transformations for all of the other keyframes in the set are defined relative to frame 1 of the triple).

More particularly, in this embodiment, camera transformation calculator 70 performs processing in accordance with a Levenberg-Marquardt minimisation algorithm based on the method described in chapter 15.5 of "Numerical Recipes in C" by Press et al, Cambridge University Press, ISBN 0-521-43108-5 (in which $\chi^2(a)$ corresponds to E(P,X) in equation (21) above). However, different criteria are used to determine whether to increase or decrease $\lambda$. More particularly:

if $\chi^2(a+\delta a) \geq \chi^2(a^1)-\epsilon$, then $\lambda$ is increased by a factor of 10; or (23)

if $\chi^2(a+\delta a) < \chi^2(a^1)-\epsilon$, then $\lambda$, is decreased by a factor of 10 (24)

where $\epsilon = 3 \times \sqrt{2n}$ (25)

where "n" is the number of terms (labelled by i, j, a) in the summation of equation (21) above.

Since the value of $\epsilon$ depends on the standard deviation of the $\chi^2$ distribution, equations (23) and (24) ensure that statistically insignificant changes in the value of $\chi^2$ are ignored. In addition, equations (23) and (24) enable criteria based on the value of $\lambda$ alone to be used in this embodiment to determine when to stop iterating. More particularly, iterations are stopped when:

$\lambda \geq \lambda_{th}$ (26)

where $\lambda_{th}$ is a threshold constant, which, in this embodiment, is set to $1 \times 10^6$.

At step S276, camera transformation calculator 70 determines whether there is another window of keyframes in the set of keyframes currently being processed. More particularly, camera transformation calculator 70 determines whether the last keyframe within the window for which calculations have just been performed is the last keyframe within the set. If it is determined that the last keyframe in the window is not the last keyframe in the set (for example as shown in FIG. 15a since keyframe 208 is not the last keyframe in the set 266) then, processing returns to step S270, at which the next window of keyframes is considered (as noted above, this being the window displaced by one keyframe with respect to the previous window so that the first keyframe in the previous window drops out of the window).

Figure 15D:
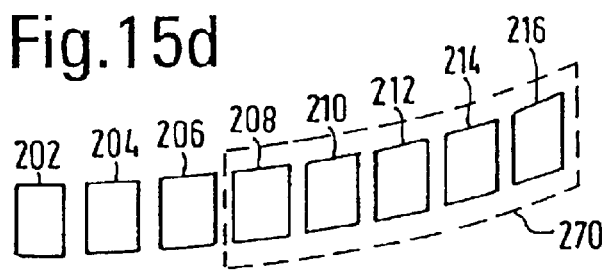

Steps S270 to S276 are repeated until each window of keyframes in the set has been processed in the manner described above (that is, when it is determined at step S276 that the last keyframe in the window is the last keyframe in the set, for example as shown in FIG. 15d).

Referring again to FIG. 12, at step S208, camera transformation calculator 70 determines whether there is another remaining triple of keyframe in the sequence 250. Steps S200 to S208 are repeated until each triple of keyframes has been processed in the manner described above.

Referring to FIG. 18, as a result of performing the processing at step S10 (FIG. 3), processing apparatus 20 has generated a plurality of expanded sets 266, 276, 286 of keyframes within the sequence 250. Within each set, the position and orientation of each keyframe has been calculated relative to the first keyframe in the set (keyframe 202 in set 266, keyframe 226 in set 276 and keyframe 242 in set 286). Any keyframe which was discarded at step S244 (FIG. 13) because the calculated camera transformations were not sufficiently accurate will leave a gap in the sequence 250, such as the gap between keyframes 228 and 232 in set 276.

At this stage, the positions and orientations of the keyframes between sets (keyframes 218, 220, 222, 224, 238 and 240 in the example shown in FIG. 18) remain uncalculated.

Referring again to FIG. 3, at step S12, camera transformation calculator 70 performs processing to join the sets of keyframes within the sequence 250, and stores the results in camera transformation store 100.

Figure 19:
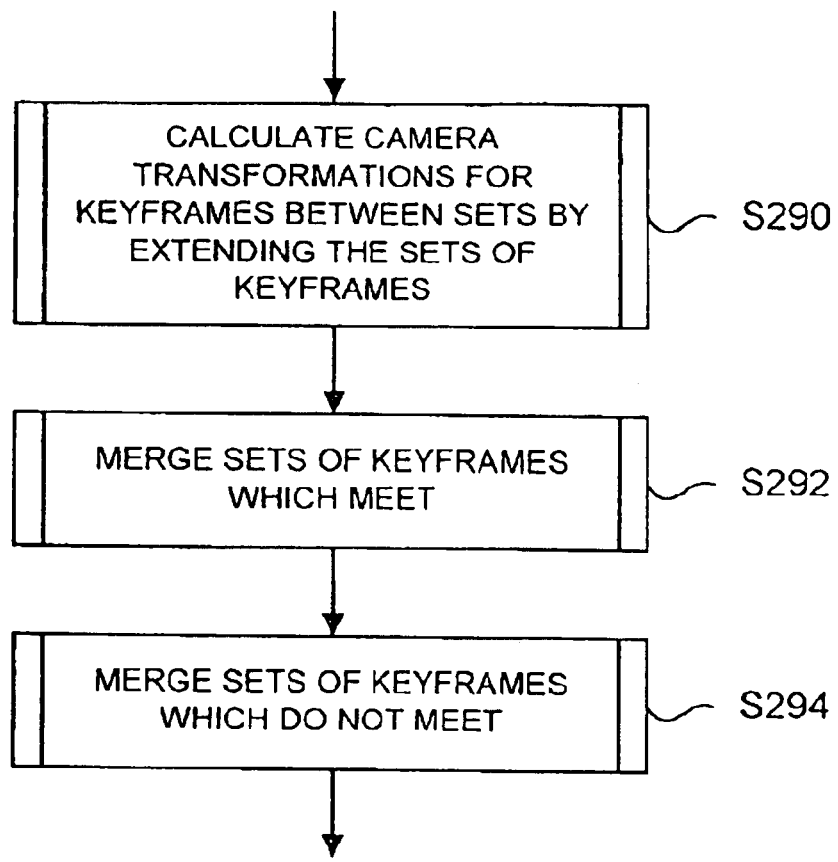
FIG. 19 shows the processing operations performed at step S12 in FIG. 3.

FIG. 19 shows the processing operations performed by camera transformation calculator 70 at step S 12.

Referring to FIG. 19, at step S290, camera transformation calculator 70 calculates transformations for keyframes within sequence 250 which are between sets of keyframes. This is performed by extending the sets of keyframes to further expand the number of keyframes in the sets, as will now be described.

Figure 20:
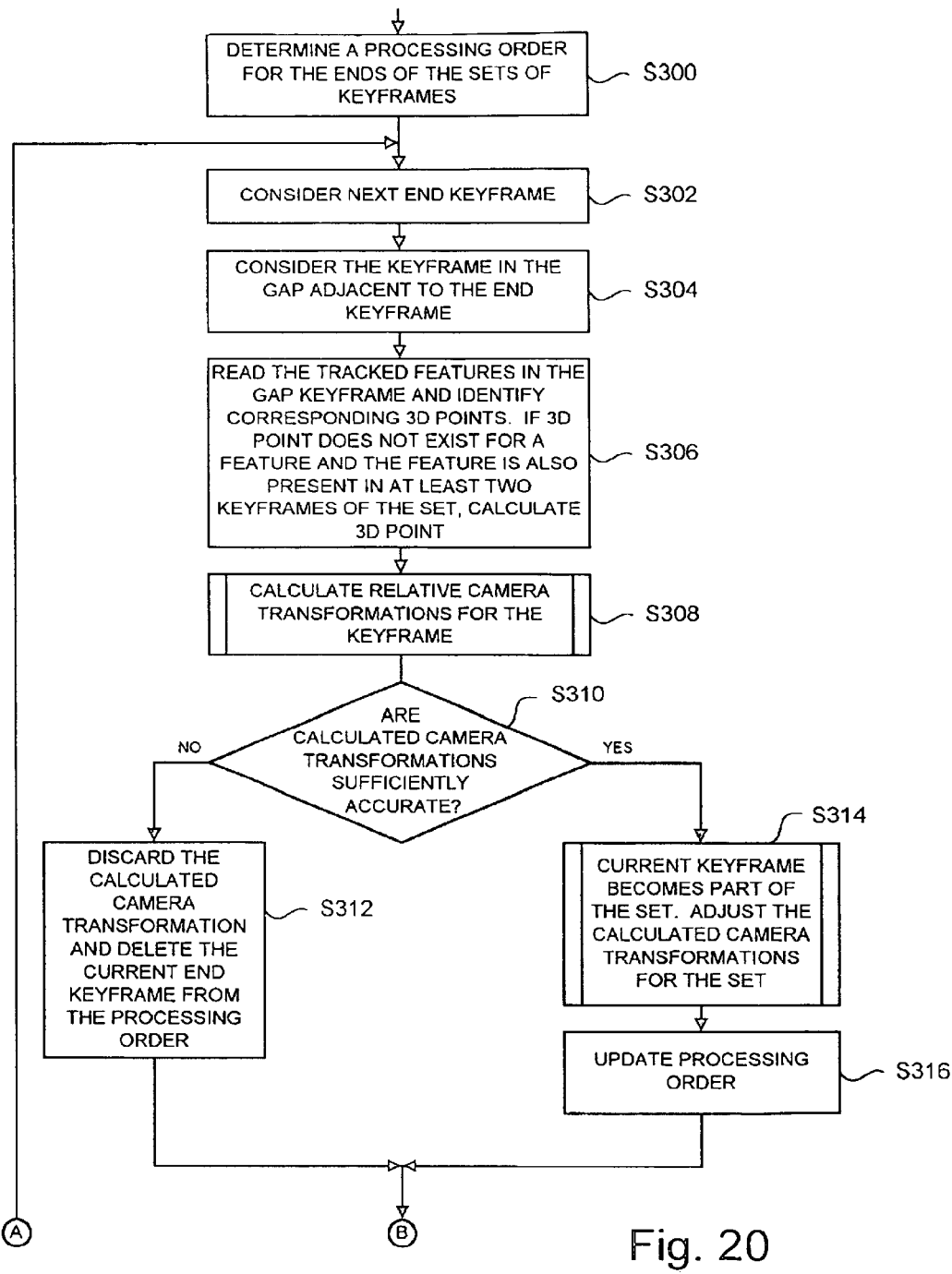
FIG. 20 shows the processing operations performed at step S290 in FIG. 19.
Figure 20:
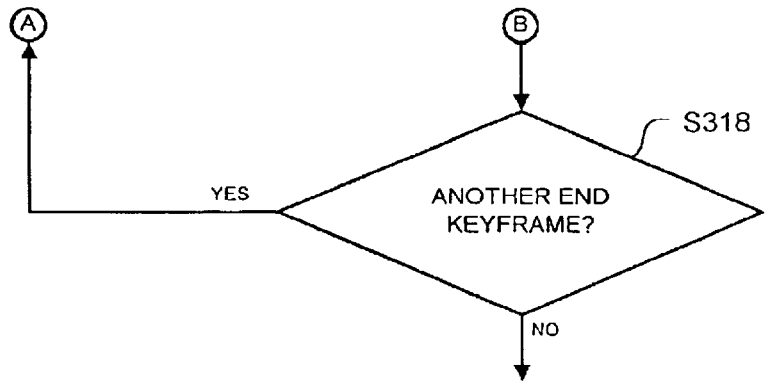

FIG. 20 shows the processing operations performed by camera transformation calculator at step S290.

Referring to FIG. 20, at step S300, camera transformation calculator 70 defines an order in which the ends of the sets of keyframes are to be processed to extend the sets. More particularly, in this embodiment, camera transformation calculator 70 defines a processing order based on the accuracy of the keyframe at the beginning and end of each set (that is, keyframes 202 and 216, 226 and 236 and 242 in the example shown in FIG. 18) so that these end keyframes are processed in the order of decreasing accuracy. The accuracy used by camera transformation calculator 70 to define the processing order at step S300 is the accuracy calculated at step S182 (FIG. 10). This accuracy represents the accuracy of the keyframes in the original triple, and accordingly the first keyframe and the last keyframe in each respective set will have the same accuracy values. For this reason, in this embodiment, frame 1 in a set is placed in the processing order so that it is considered before frame 3 (the end keyframe) in a set.

At step S302, camera transformation calculator 70 considers the next end keyframe in the processing order defined at step S300 (that is, the end keyframe of highest accuracy), and, at step S304, considers the keyframe adjacent to the end keyframe in the gap between the sets. Thus, referring to FIG. 18 by way of example, if the processing order defines keyframe 226 as the next keyframe to be considered, then, at step S304, keyframe 224 is considered. Similarly, if the processing order defines keyframe 216 as the next keyframe to be considered, then, at step S304, keyframe 218 is considered.

Referring again to FIG. 20, at step S306, camera transformation calculator 70 reads which tracked features are present in the keyframe considered at step S304 and identifies the corresponding 3D points which were calculated at step S220 (FIG. 13) or at step S274 (FIG. 16). If no 3D point exists for a tracked feature point which has a measured position in the keyframe, and the tracked feature point is also present in at least two keyframes of the set which contains the end keyframe considered at step S302, then camera transformation calculator 70 calculates a 3D point in the manner described previously at step S220.

At step S308, camera transformation calculator 70 calculates relative camera transformations for the gap keyframe, that is transformations defining the rotation and translation of the keyframe relative to frame 1 in the set which contains the end keyframe considered at step S302. The processing performed by camera transformation calculator 70 at step S308 is the same as that performed at step S204, which is described above with respect to FIG. 13, and accordingly will not be described again here.

At step S310, camera transformation calculator 70 tests whether the transformations calculated at step S308 are sufficiently accurate (this step corresponding to step S242 in FIG. 13).

If it is determined at step S310 that the camera transformations are not sufficiently accurate, then, at step S312, camera transformation calculator 70 discards the transformations calculated at step S308, and deletes the keyframe considered at step S302 from the processing order (so that it is not considered again).

On the other hand, if it is determined at step S310 that the camera transformations calculated at step S308 are sufficiently accurate, the transformations are retained so that the gap keyframe becomes part of the set containing the end keyframe considered at step S302. Then, at step S314, camera transformation calculator 70 adjusts the calculated camera transformations for the extended set including the keyframe which was previously in the gap, so that error in the calculated transformations is minimised and distributed evenly through a number of the keyframes in the extended set. More particularly, camera transformation calculator 70 performs the same processing as the processing at steps S270, S272 and S274 (FIG. 16), with the window 270 in a fixed (non-moving) position such that the gap keyframe for which camera transformations were calculated at step S308 is the first keyframe in the window if the gap keyframe was before the set in the sequence 250 or the last keyframe in the window if the gap keyframe was after the set in the sequence 250. As this processing has been described above, it will not be described again here.

At step S316, camera transformation calculator 70 updates the processing order for the ends of the sets of keyframes to take into account the keyframe considered at step S304, which now forms the end of a set. More particularly, camera transformation calculator 70 deletes the old end keyframe considered at step S302 from the processing order (so that it is not considered again) and inserts the new end keyframe in the processing order in accordance with the accuracy of the calculated transformations read at step S310.

At step S318, camera transformation calculator 70 determines whether there is another end keyframe in the processing order list. Steps S302 to S318 are repeated until there are no longer any end keyframes in the processing order list, that is, until each keyframe set has been expanded to the point where it is no longer possible to expand the sets without the camera transformations falling below an acceptable accuracy.

By performing the processing at step S290 (FIG. 19) in the manner described above with respect to FIG. 20, processing apparatus 20 attempts to extend the sets of keyframes such that the most accurate end of a set is always considered for extension before a lower accuracy end. This results in higher accuracy camera transformations being calculated for the keyframes within the gaps between sets. Further, by expanding sets of keyframes in both directions within the sequence 250 (that is, from the first keyframe in the set and the last keyframe in the set) if camera transformations for a keyframe within a gap (such as keyframe 240 in FIG. 18) can not be calculated with sufficient accuracy relative to the set on one side (such as set 286) then it may still be possible to calculate sufficiently accurate camera transformations relative to the set on the other side (set 276) when this set is expanded towards the keyframe in question.

As a result of the processing at step S290, some of the sets of keyframes will have been expanded to such an extent that there is no longer a keyframe separating adjacent sets in the sequence, while in other cases, adjacent sets in the sequence will remain separated by at least one keyframe. Referring to FIG. 21 by way of example, set 266 has been expanded to include keyframe 218 at its end, and set 276 has been expanded to include keyframe 224 at its start and keyframes 238 and 240 at its end. Thus, sets 276 and 286 now meet (they are not separated by any keyframe in the sequence 250) while sets 266 and 276 have a gap therebetween as they are still separated by keyframes 220 and 222.

Referring again to FIG. 19, at step S292, camera transformation calculator 70 merges sets of keyframes which meet in the sequence 250 (sets 276 and 286 in the example shown in FIG. 21).

Figure 22:
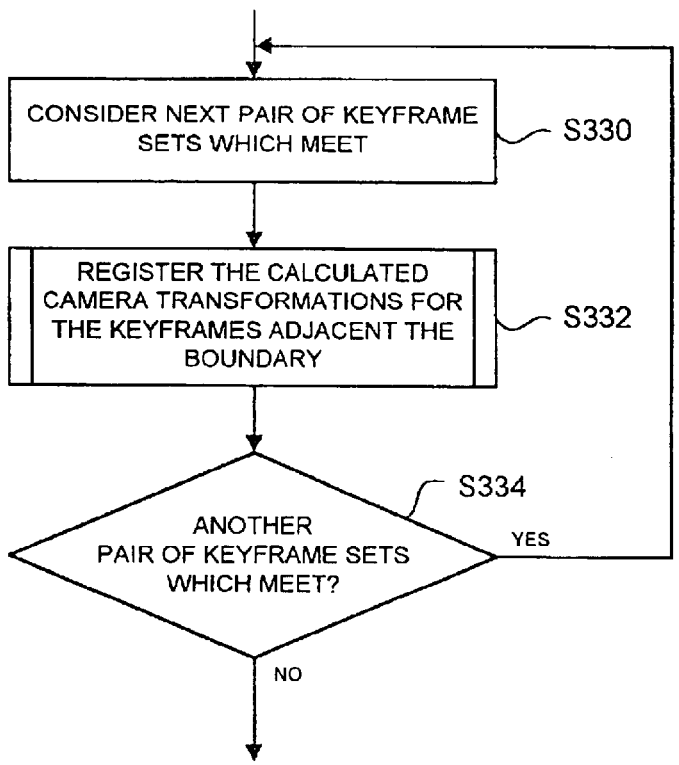
FIG. 22 shows the processing operations performed at step S292 in FIG. 19.

FIG. 22 shows the processing operations performed by camera transformation calculator 70 at step S292.

Referring to FIG. 22, at step S330, camera transformation calculator 70 considers the next pair of keyframe sets which meet in the sequence 250 (this being the first pair the first time step S330 is performed).

At step S332, camera transformation calculator 70 uses a fourth procedure defined by instructions stored in procedure instruction store 80 to register the camera transformations previously calculated for the keyframes which are adjacent to the boundary where the sets meet (that is, keyframe 240 and keyframe 242 in FIG. 21). As noted previously, the camera transformations for the keyframes in each respective set are defined relative to different keyframes (that is, frame 1 of the original triple of keyframes for the set). Accordingly, the processing performed at step S332 calculates the relationship between the transformations for each set so that the sets become merged.

Figure 23:
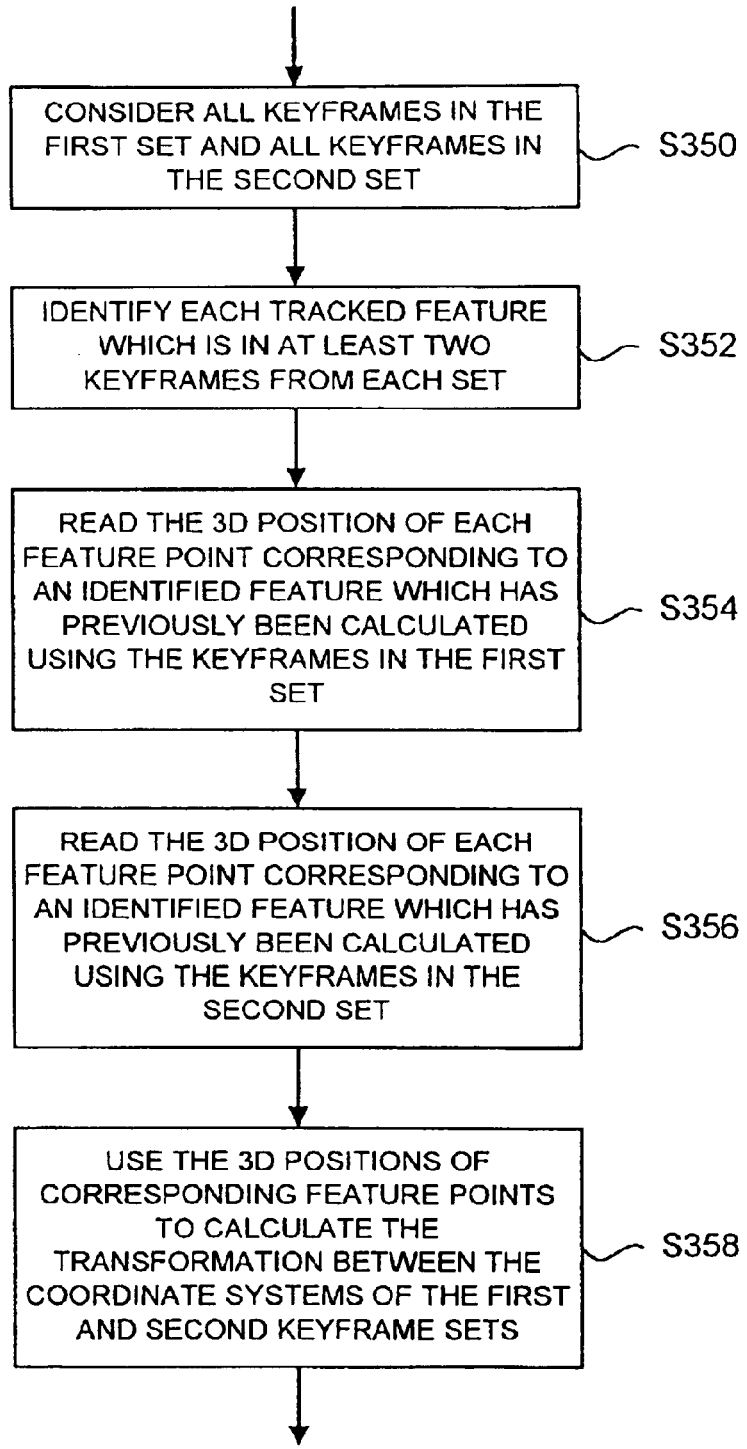
FIG. 23 shows the processing operations performed at step S332 in FIG. 22.

FIG. 23 shows the processing operations performed by camera transformation calculator 70 at step S332.

Referring to FIG. 23, at step S350, camera transformation calculator 70 considers all of the keyframes in the first set and all of the keyframes in the second set, and at step S352 identifies each tracked feature which has a position previously determined by feature detector and tracker 50 in at least two of the keyframes from each set.

At step S354, for each tracked feature identified at step S352, camera transformation calculator 70 reads the 3D position of the corresponding feature point which has previously been calculated using the keyframes in the first set at step S220, S274, S306 or S314. These 3D points are defined in a first coordinate system determined by the keyframes in the first set.

At step S356, camera transformation calculator 70 reads the 3D position of each feature point previously calculated at step S220, S274, S306 or S314 using the keyframes in the second set which corresponds to a tracked feature identified at step S350. These 3D points are defined in a second coordinate system determined by the keyframes in the second set.

The 3D points read at step S354 and the 3D points read at step S356 represent the same physical points on object 140. Therefore, a point in the first coordinate system read at step S354 and the corresponding point in the second coordinate system read at step S356 (that is, the point representing the same physical point on object 120) must have the same position in three-dimensions.

Accordingly, at step S358, camera transformation calculator 70 uses the 3D positions of each pair of corresponding feature points (that is, each pair comprising a point in the first coordinate system and the corresponding point in the second coordinate system) to calculate the transformation between the coordinate system of the first set of keyframes and the coordinate system of the second set of keyframes. In this embodiment, the processing at step S358 is performed in a conventional manner, for example as described in "Closed Form Solution of Absolute Orientation Using Unit Quaternions" by Horn in Journal of Optical Soc. of America 4(4), pages 629–649, April 1987.

Referring again to FIG. 22, at step S334, camera transformation calculator 70 determines whether there is another pair of keyframe sets in the sequence 250 which meet. Steps S330 to S334 are repeated until each pair of keyframe sets which meet has been processed in the manner described above.

As a result of performing the processing at step S292 (FIG. 19), processing apparatus 20 has merged together sets of keyframe which met in the sequence 250. Thus, referring to the example shown in FIGS. 21 and 24, set 276 and set 286 have been merged into a single set 290, in which the positions and orientations of all of the keyframes within the set are defined relative to a single keyframe within the set (keyframe 226).

Referring again to FIG. 19, at step S294, camera transformation calculator 70 performs processing to merge consecutive sets of keyframes which are separated in the sequence 250 by other keyframes (for example set 266 and set 290 in FIG. 24).

Figure 25:
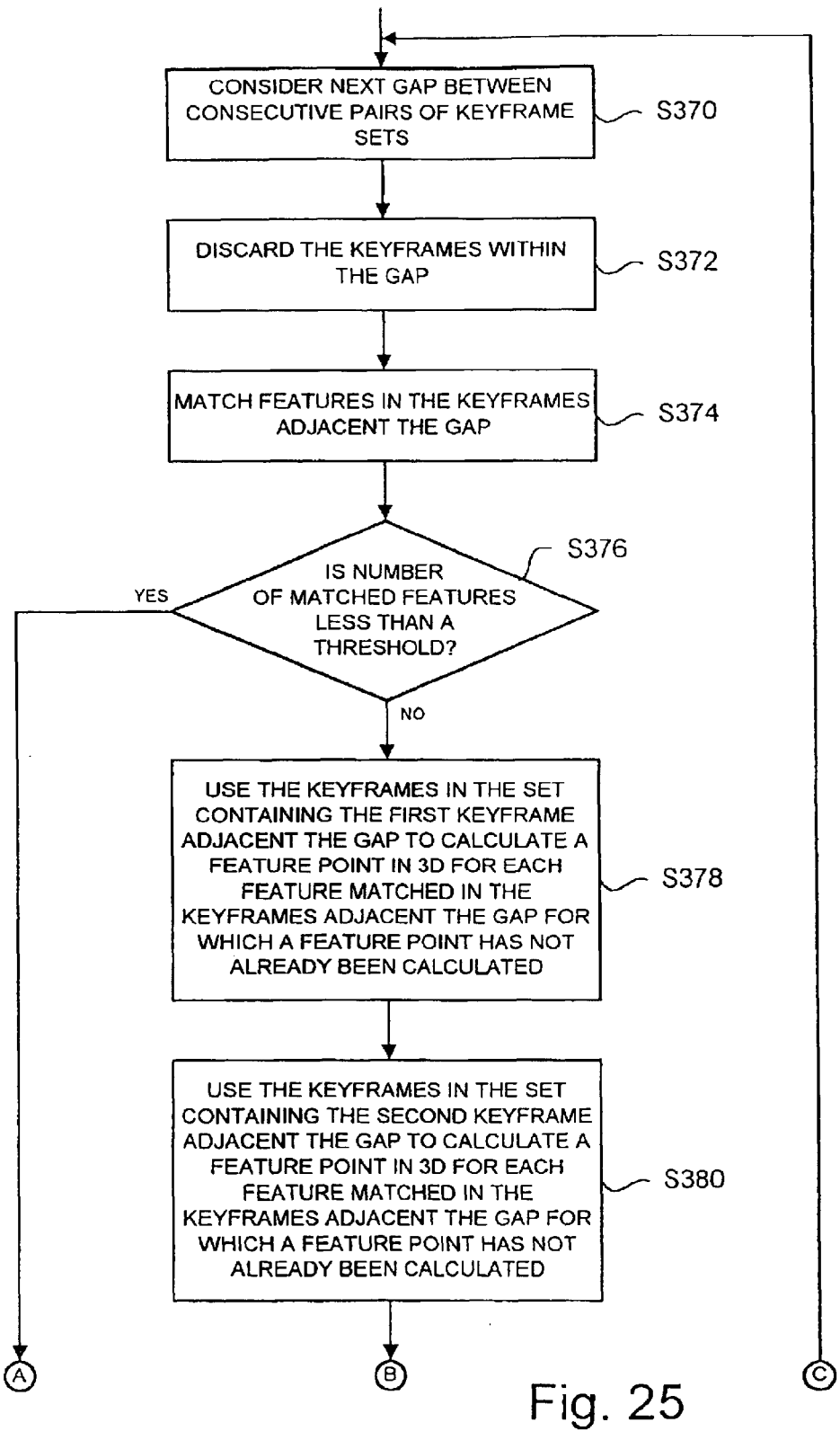
FIG. 25 shows the processing operations performed at step S294.
Figure 25:
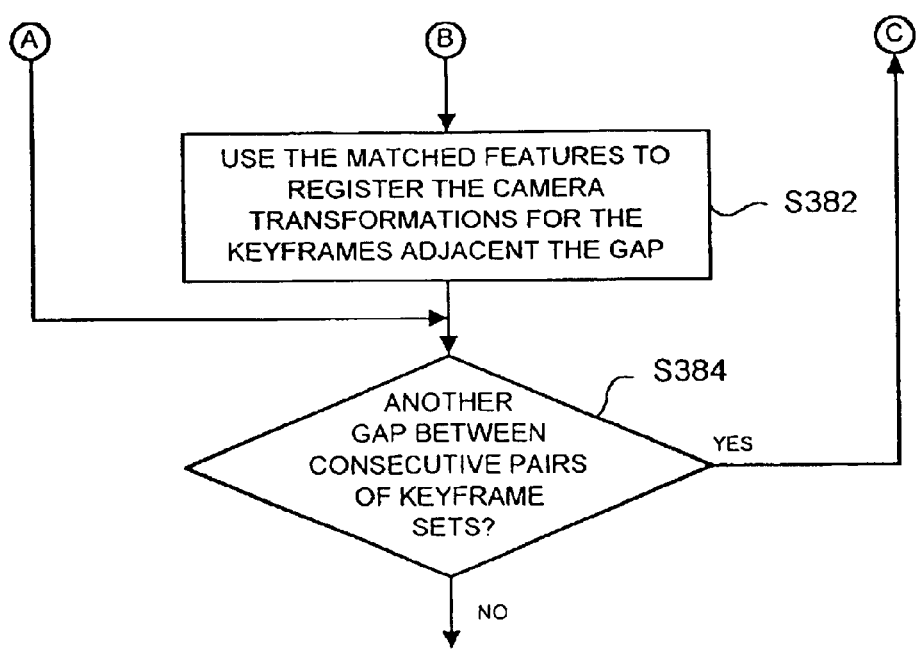

FIG. 25 shows the processing operations performed by camera transformation calculator 70 at step S294.

Referring to FIG. 25, at step S370, camera transformation calculator 70 considers the next gap between consecutive pairs of keyframe sets, and at step S372 discards the keyframes within the gap (for which no camera transformations have previously been calculated and stored). Thus, referring to the example shown in FIG. 24, at step S372, keyframes 220 and 222 are discarded.

At step S374, feature matcher 90 performs processing to match features in the keyframes adjacent the gap (that is, keyframe 218 from set 266 and keyframe 224 from set 290 in the example shown in FIG. 24). More particularly, in this embodiment, feature matcher 90 identifies matching features in two ways. In the first way, feature matcher 90 reads the positions of any feature points which have previously been tracked by feature detector and tracker 50 between the keyframes adjacent the gap and also one other keyframe in each set having the gap therebetween. In the second way, feature matcher 90 causes display processor 110 to display the keyframes which are adjacent to the gap to the user on display device 22. In addition, feature matcher 90 causes display processor 110 to display a visual indication in each of the displayed keyframes of the position of each feature tracked by feature detector and tracker 50 which also has a recorded (tracked) position in at least one other keyframe from the set containing the displayed keyframe. Thus, referring to the example shown in FIG. 24, a visual indication is displayed to the user of the position of each tracked feature in keyframe 218 which also has a recorded position in at least one of the other keyframes in set 266. Similarly, a visual indication is displayed for keyframe 244 showing the position of each tracked feature which also has a recorded position in at least one keyframe in set 290. Feature matcher 90 further causes display processor 110 to display a message requesting the user to identify matching feature points between the two displayed keyframes for which an indicator is displayed.

Signals defining the matching features input by the user using a user input device 24 are stored by central controller 30 in data store 40. If the total number of matches identified by reading the features tracked by feature detector and tracker 50 and input by the user is less than a threshold, which, in this embodiment, is set to three, then feature matcher 90 causes display processor 110 to request the user to identify further matching features from those displayed with an indicator, or to confirm that no more matching features can be identified.

At step S376, camera transformation calculator 70 determines whether the number of pairs of features matched at step S374 is less than a threshold, which, in this embodiment, is set to three.

If it is determined at step S376 that the number of matched features is greater than or equal to the threshold, then, at step S378, for each feature matched in the keyframes adjacent the gap at step S374, camera transformation calculator 70 determines whether a feature point in 3D has already been calculated at step S220, S274, S306 or S314. If a feature point in 3D has not already been calculated for a feature matched at step S374, then, camera transformation calculator 70 uses the keyframes in the set containing a first one of the keyframes adjacent the gap to calculate a feature point in 3D. This processing is performed in the same way as the processing at step S220 (FIG. 13), and accordingly will not be described again here.

At step S380, camera transformation calculator 70 repeats the processing performed at step S378, but this time to define a point in 3D for each feature matched at step S374 for which a feature point has not already been calculated using the keyframes in the set which contain the second keyframe adjacent the gap.

At step S382, camera transformation calculator 70 uses the matched features to register the camera transformations for the keyframes adjacent the gap, and hence merge the sets of keyframes having the gap therebetween. The processing performed at step S382 is the same as that performed at step S33.2 (FIG. 22), which is described above with respect to FIG. 23, and accordingly it will not be described again here. However, the processing performed at step S382 also takes into account the 3D points calculated at step S378 and step S380.

Thus, the processing performed at step S378 and S380 requires the calculation of a 3D point using the position of a feature point in at least two keyframes of a set, and the processing performed at step S382 relies on the registration of corresponding 3D points. It is for this reason that the feature points matched at step S374 comprise only points for which a position was recorded by feature detector and tracker 50 in at least two keyframes of each set.

On the other hand, it is determined at step S376 that the number of matched features is less than the threshold, then steps S378, S380 and S382 are omitted so that the pair of sets of keyframes currently being considered are not merged. A situation in which there is not a sufficient number of matched features is unlikely to arise due to the way in which processing was carried out at step S6 (FIG. 3) to define the initial triples of keyframes. However, such a situation could arise if, for example, camera 140 was switched off while it was moved to a different position during the recording of the sequence of frames 130.

At step S384, camera transformation calculator 70 determines whether there is another gap between consecutive pairs of sets of keyframes in the sequence 250. Steps S370 to S384 are repeated until each consecutive pair of keyframe sets with a gap therebetween has been processed in the manner described above.

As a result of performing the processing at step S294 (FIG. 19), processing apparatus 20 has merged into a single set all of the keyframes remaining in sequence 250, so that the relationship between the camera transformations for each keyframe relative to all of the other keyframes is known.

Thus, referring to the example shown in FIG. 26, the relative positions and orientations of all of the keyframes remaining in sequence 250 have been calculated (the break 292 in the sequence occurring as a result of keyframes 220 and 222 being discarded at step S372 (FIG. 25)).

Figure 27:
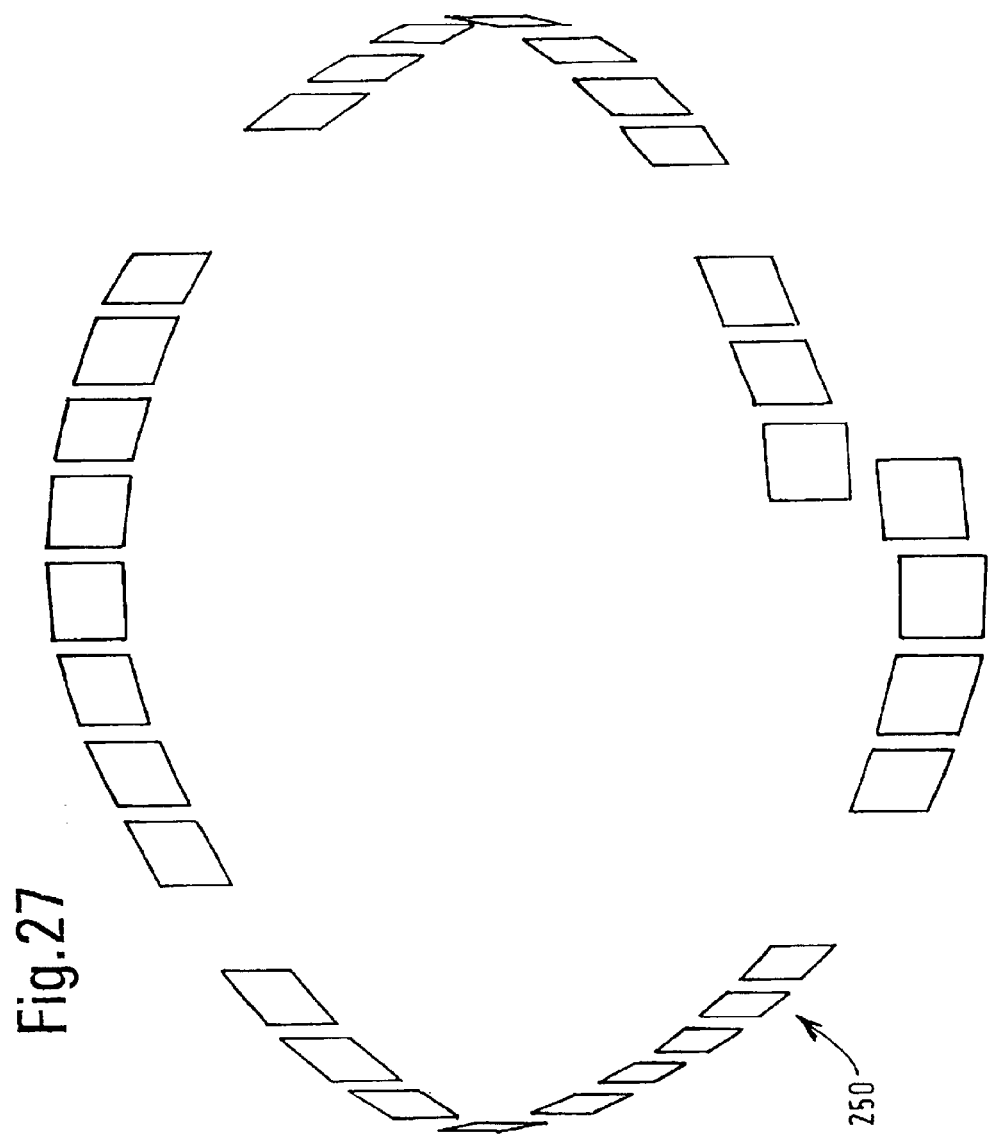
FIG. 27 schematically shows an example of a result of applying the processing at steps S4 to S12 in FIG. 3 to the example shown in FIG. 4.

Consequently, referring to the example shown in FIG. 27, the relative positions and orientations for a subset of the frames in the original sequence of images 130 (that is, the keyframes in the sequence 250) have now been calculated.

The method of calculating the relative positions and orientations of the input image frames in the manner described above in this embodiment provides a number of advantages. For example, by considering separate sets of keyframes within the sequence 250, rather than the sequence 250 as a whole, more accurate camera transformations can be calculated, and the accumulation of errors is reduced. In addition, by selecting the keyframes to form the ends of sets (that is, frame 1 and frame 3 of each triple) in dependence upon the input data, rather than using predetermined positions, and by filling in the sets (that is, calculating the camera transformations for intra-triple keyframes) and joining sets as described above, the accuracy of the camera transformations is increased further.

Referring again to FIG. 3, at step S14, central controller 30 outputs the camera transformations for the keyframes in the set 250 stored in camera transformation store 100, for example as data recorded on a storage device such as disk 102 or as a signal 104 (FIG. 2). The positions of 3D points calculated by camera transformation calculator 70 (for example at steps S220, S274, S306, S314, S378 or S380) may also be output.

A number of modifications are possible to the embodiment described above.

For example, in the embodiment above, the input images comprise a temporal sequence of frames recorded by a video camera 140. However, the processing described above can equally be applied to "still" photographs recorded at different positions and arranged in a spatial sequence (that is, an order defined by the relative positions around object 120 at which the photographs were taken).

In the embodiment above, at step S2 (FIG. 3) data input by a user defining the intrinsic parameters of camera 140 is stored. However, instead, default values may be assumed for some, or all, of the intrinsic camera parameters, or processing may be performed to calculate the intrinsic parameter values in a conventional manner, for example as described in "Euclidean Reconstruction from Uncalibrated Views" by Hartley in Applications of Invariance in Computer Vision, Monde, Zisserman and Forsyth eds, pages 237–256, Azores 1993, Springer-Verlag, ISBN 0387582401.

In the embodiment above, when calculating camera transformations, the intrinsic camera parameters are combined with the calculated camera projection for a keyframe to give the position and orientation of the keyframe. However, the processing described above can also be applied to calculate the camera projections alone for the keyframes.

When tracking features between images at step S24 and step S34 (FIG. 5), a search for new matching pixels may be carried out in a sub-sampled image, or the search may be carried out in a hierarchical coarse-to-fine manner, rather than searching every pixel in an image.

In the embodiment above, the features being tracked are "topped up" (that is, further features are identified for tracking to replace features for which track has been lost) only at keyframes. However, it is possible to identify further features for tracking when the number of tracked features falls below a threshold.

In the embodiment above, at steps S28 and S40 (FIG. 5), a calculated uncertainty score for an image frame is compared against a threshold value and, if the uncertainty score is less than the threshold value, the image frame is set as a keyframe. However, instead of using a threshold value, processing may be performed to set an image frame as a keyframe if the uncertainty score for the frame is a local minimum with respect to the uncertainty scores of the surrounding image frames.

In the embodiment above, at step S4 (FIG. 3), keyframes are selected from the input frames. This reduces the amount of processing to be carried out by selecting a subset of the original frames for further processing (the frames in the subset being selected as the frames which are likely to enable accurate camera transformations to be calculated). However, instead, all of the input frames may be processed using the techniques described above. Alternatively, the input frames may be sub-sampled to select every "n"th frame before performing the processing in the embodiment above at step S4 to select keyframes.

In the embodiment above, at step S6, triples of frames are selected, and at step S8, relative camera transformations are calculated for each triple. However, instead of using triples of frames, other numbers of frames may be used in these steps. For example "doubles" of frames may be used (for example by omitting steps S148 to S152 in FIG. 9 at which the middle frame of a triple is set).

After calculating relative transformations for a triple of keyframes at step S8, the accuracy of the calculated transformations may be increased by performing the processing described above with respect to steps S270, S272 and S274 (FIG. 16) using a window which covers the three keyframes in the triple.

In the embodiment above, during the processing performed at step S294 (FIG. 19) to merge sets of keyframes with a gap therebetween, features are matched in the keyframes adjacent the gap (step S374 in FIG. 25). As part of the processing to match features, the keyframes are displayed to a user and the user is requested to identify matching feature points. However, rather than requesting the user to match features, automatic feature matching may be performed by processing apparatus 20 to match features in the keyframes adjacent the gap in a conventional manner, for example as described in "Adaptive Least Squares Correlation: A Powerfil Image Matching Technique" by A. W. Gruen in Photogrammetry Remote Sensing and Cartography, 14(3), 1985, pages 175–187.

In the embodiment above, when adjusting the camera transformations for a given set of keyframes at step S206 (FIG. 12) the keyframes within a window 270 (FIGS. 15a–15d) are considered. The window has a constant size and is moved at each stage of the processing by one keyframe to consider a different subset of the keyframes within the set. However, the window 270 may be moved by more than one keyframe at a time provided that the number of keyframes moved is not greater than the size of the window itself. More particularly, the window 270 may still be moved sequentially through the keyframes within the set, but instead of moving the window one keyframe at a time (that is, to take in one new keyframe and to drop out one keyframe already processed), the window could be moved to take in any number of new keyframes up to the number of keyframes that can fit within the window. In this way, each keyframe still appears in the window at least one (each keyframe appearing only once if the window is moved so that there is no overlap between adjacent positions).

In addition, the size of the window may be changed as it is moved. For example, as the number of tracked feature points changes as the window 270 is moved through the keyframes in the set, the size of the window 270 may be adjusted to keep the processing to be carried out substantially constant (that is, to increase the size of the window as the number of tracked features decreases, or to decrease the size of the window as the number of tracked features increases).

Further, after the window 270 has been moved sequentially to consider each subset of the keyframes within the set, the window 270 may then be moved sequentially back through the keyframes within the set, and this forwards and backwards movement may be repeated until the solution for the calculated camera transformation and 3D points converges. That is, the window 270 may be moved as shown in FIGS. 15a, 15b, 15c and 15d, and then moved backwards as shown in FIGS. 15d, 15c, 15b and 15a, and this movement may be repeated.

In the embodiment above, at step S272 (FIG. 16) the error measurement value to be minimised (equation 21) is calculated on the basis of the measured position of every tracked feature point within the keyframes within the window 270 and every keyframe within the window 270. However, instead, the error measurement value may be calculated using different combinations of tracked feature points and keyframes. For example, the error measurement value may be calculated using the measured position in keyframes within the window of each tracked feature point which does not have a measured position in keyframes within the set which are outside the window 270 (such as feature point 2 and feature point 3 in the example shown in FIG. 17), together with each keyframe which is within window 270. In this way, the tracked feature points which contribute to the error measurement value are the same as the tracked feature points for which the 3D positions ("X" in equation 21) are varied at step S274 to minimise the error measurement value.

In the embodiment above, the error measurement value set at step S272 (FIG. 16) is given by equation (21). However, different representations of the error between estimated feature locations (based on calculated camera transformations) and measured feature locations can be used. For example, $W_{ij}$ in equation (21) could be allowed to take different values for different values of "i" and "j". This allows the error associated with an image measurement to vary, but only such that the x and y components are the same (i.e. the error is circular). In cases where an ellipsoidial error is associated with an image measurement, the error measurement value, E(P,X) can be calculated by:

$$E(P, X) = \sum_{i,j,\alpha,\beta} \left[ (X_{ij})_\alpha - \frac{(P_i X_j)_\alpha}{(P_i X_j)_3} \right] (W_{ij})_{\alpha\beta} \left[ (x_{ij})_\beta - \frac{(P_i X_j)_\beta}{(P_i X_j)_3} \right] \quad (27)$$

where: $(W_{ij})_{\alpha\beta}$ is the inverse covariance matrix, which is a 2 by 2 matrix, with $\alpha$ and $\beta$ labelling the rows and columns; and the other symbols are as defined previously for equation (21).

Further, rather than using the sum of squares of differences between projected and measured image positions as in equations (21) and (27) above, a different function of the differences between projected and measured image positions can be used. For example, E(P,X) can be calculated as:

$$E(P, X) = \sum_{i,j,\alpha} \rho \left[ (x_{ij})_\alpha - \frac{(P_i X_j)_\alpha}{(P_i X_j)_3} \right] \quad (28)$$

where $\rho$ defines the type of function which the image measurement errors take (and is defined to include the weightings, W) and the other symbols are as defined previously for equation (21). For example, the following function $\rho(x)$ may be used, as suggested in P. J. Huber in "Robust Statistics" Wiley, New York, 1981, ISBN 0471418056:

$$\rho = \begin{cases} 0.5x^2 & \text{if } |x| \le a \\ a|x| - 0.5a^2 & \text{otherwise} \end{cases} \quad (29)$$

In the embodiment above, the processing performed at step S206 (FIG. 12) to adjust the camera transformations for a given window 270 of keyframes is carried out on the basis of a calibrated perspective camera transformation model. That is, "P" in equation (21) is given by P=K[R,t], where "K" defines the known intrinsic camera parameters, as described above. However, the processing can be applied to other camera models. For example:

(i) In the case of a perspective camera transformation model in which the entries of "K" are known only approximately, then, as well as varying the values of "K" and "X" when E(P,X) is minimised at step S274, the values of the entries in "K" representing the focal length, principal point and/or first order radial distortion coefficient may be varied as well (the aspect ratio and skew angle being constant if the images are recorded with the same camera 140).

(ii) In the case of a projective camera model, in which the intrinsic camera parameters are not known, then "P" is a 3 by 4 projection matrix defined up to an overall scale. In this case, the entries of "P" are all varied independently when step S274 is performed. (The intrinsic camera parameters may then be calculated using a conventional self-calibration technique, for example as described in "Euclidean Reconstruction from Uncalibrated Views" by Hartley in Applications of Invariance in Computer Vision, Mundy, Zisserman and Forsyth eds, pages 237–256, Azores 1993.)

(iii) In the case of a weak perspective camera transformation model, has the restricted form:

$$P = K \begin{pmatrix} R_1^T & t_x \\ R_2^T & t_y \\ 0 & Z_{ave}^c \end{pmatrix} \quad (30)$$

where $R_1$ and $R_2$ are the first and second column vectors respectively which make up the 3 by 3 rotation matrix R;

$t_x$ and $t_y$ are the translations in the "x" and "y" directions respectively, $Z^c_{ave}$ is the average distance of the points in the real-world scene which are recorded in the image from the focal plane of the camera.

In this case, the term $(P_i X_j)_3$ is constant. Accordingly, iterative adjustment at step S274 using a non-linear least squares method is unnecessary, and instead, a closed form solution can be calculated based on factorisation (by finding the best decomposition of the $(x_{ij})$ matrix into the product of a $P_i$ matrix and $X_j$ matrix), in a conventional manner, for example as described in "Shape and Motion from Image Streams under Orthography: a Factorization Method" by Tomasi and Kande, IJCV 9: 2, 137–154 (1992). However, the calculation is still applied to the window 270 of keyframes, which is then moved sequentially to consider all of the keyframes within the set, in the manner described above.

(iv) In the case of an affine camera transformation model, "P" is only defined up to a scale, and corresponds to a projective camera with its optical centre at the plane at infinity. More particularly, "P" is a 3 by 4 matrix, but some of the entries are 0 as follows:

$$P = \begin{pmatrix} P_{11} & P_{12} & P_{13} & P_{14} \\ P_{21} & P_{22} & P_{23} & P_{24} \\ 0 & 0 & 0 & P_{34} \end{pmatrix} \qquad (31)$$

In this case, the term $(P_i X_j)_3$ is constant Accordingly, iterative adjustment at step S274 using a non-linear least squares method is unnecessary, and instead, a closed form solution can be calculated based on factorisation (by finding the best decomposition of the $(x_{ij})$ matrix into the product of a $P_i$ matrix and $X_j$ matrix), in a conventional manner, for example as described in "Shape and Motion from Image Streams under Orthography: a Factorization Method" by Tomasi and Kande, IJCV 9: 2, 137–154 (1992). However, the calculation is still applied to the window 270 of keyframes, which is then moved sequentially to consider all of the keyframes within the set, in the manner described above.

In the embodiment above, at step S274, iterations of the minimisation algorithm are stopped when the value of λ exceeds a threshold. However, the iterations may be stopped when the number of iterations exceeds a threshold, or in dependence upon a combination of the value of λ and the number of iterations.

In the embodiment above, at step S274, the error measurement value is minimised using a Levenberg-Marquardt algorithm. However, different algorithms may be used to minimise the error measurement value. For example, a non-linear least squares method such as the Gauss-Newton method may be used.

In the embodiment above, at step S10 (FIG. 3), the camera transformations are calculated for intra-triple keyframes and, subsequently, at step S12, the keyframe sets created at step S10 are expanded and joined together. However, step S12 may be carried out before step S10.

In the embodiment above, when creating and expanding sets of keyframes at steps S8, S10 and S12 (FIG. 3) all of the sets are processed in one step before the next step is performed. More particularly, at step S8, camera transformations are calculated for each triple and at step S110, camera transformations are calculated for the intra-triple keyframes in each triple, before each set is extended at step S290 (FIG. 19) during the processing performed at step S12. However, instead, processing may be performed on a set-by-set basis, for example as follows:

(a) calculate and test camera transformations for the next triple of keyframes using the processing at step S8 for one triple;
(b) calculate camera transformations for intra-triple keyframes within the triple processed at step (a) using the processing at step S10 for one triple;
(c) calculate camera transformations for keyframes between the triple processed at step (a) and the preceding and succeeding triples in the sequence using the processing at step S290 to extend the set until the accuracy of the calculated transformations falls below the threshold (step S310 in FIG. 20);
(d) repeat steps (a) to (c) for the next triple of keyframes, and repeat until all triples have been processed;
(e) merge the sets of keyframes as described above with respect to steps S292 and S294 in FIG. 19.

In the embodiment above, at step S206 (FIG. 12) and step S314 (FIG. 20) calculated camera transformations are adjusted. However, it is not essential that these steps are performed, although if the steps are performed, then the overall accuracy of the calculated camera transformations is increased.

In the embodiment above, processing is performed by a computer using processing routines defined by programming instructions. However, some or all, of the processing could be performed using hardware.

The present application incorporates by cross-reference the full contents of the following applications of the assignee which are being filed simultaneously herewith.

Ser. No. 09/718,413 which claims priority from UK applications 9929957.0 and 0019123.9.

Ser. No. 09/718,343 which claims priority from UK applications 9927906.9, 9927907.7, 9927909.3, 0019080.1, 0019087.6 and 0019086.8.

Ser. No. 10/793,850 which claims priority from UK applications 0001300.3, 0001479.5, 0018492.9, 0019120.5, 0019082.7 and 0019089.2.

In the embodiments described above, step S374 (FIG. 25) may be carried out using the techniques described in application Ser. No. 09/718,343 filed simultaneously herewith.

ANNEX A

1. Corner Detection 1.1 Summary

This process described below calculates corner points, to sub-pixel accuracy, from a single grey scale or colour image. It does this by first detecting edge boundaries in the image and then choosing corner points to be points where a strong edge changes direction rapidly. The method is based on the facet model of corner detection, described in Haralick and Shapiro.

1.2 Algorithm

The algorithm has four stages:
(1) Create grey scale image (if necessary);
(2 Calculate edge strengths and directions;
(3) Calculate edge boundaries;
(4) Calculate corner points.

1.2.1 Create Grey Scale Image

The corner detection method works on grey scale images. For colour images, the colour values are first converted to floating point grey scale values using the formula:

grey_scale=(0.3×red)+(0.59×green)+(0.11×blue)     A-1

This is the standard definition of brightness as defined by NTSC and described in Foley and van Damii.

1.2.2 Calculate Edge Strengths and Directions

The edge strengths and directions are calculated using the 7×7 integrated directional derivative gradient operator discussed in section 8.9 of Haralick and Shapiro[i].

The row and column forms of the derivative operator are both applied to each pixel in the grey scale image. The results are combined in the standard way to calculate the edge strength and edge direction at each pixel.

The output of this part of the algorithm is a complete derivative image.

1.2.3 Calculate Edge Boundaries

The edge boundaries are calculated by using a zero crossing edge detection method based on a set of 5×5 kernels describing a bivariate cubic fit to the neighbourhood of each pixel.

The edge boundary detection method places an edge at all pixels which are close to a negatively sloped zero crossing of the second directional derivative taken in the direction of the gradient, where the derivatives are defined using the bivariate cubic fit to the grey level surface. The subpixel location of the zero crossing is also stored along with the pixel location.

The method of edge boundary detection is described in more detail in section 8.8.4 of Haralick and Shapiro[i].

1.2.4 Calculate Corner Points

The corner points are calculated using a method which uses the edge boundaries calculated in the previous step.

Corners are associated with two conditions:
(1) the occurrence of an edge boundary; and
(2) significant changes in edge direction.

Each of the pixels on the edge boundary is tested for "cornerness" by considering two points equidistant to it along the tangent direction. If the change in the edge direction is greater than a given threshold then the point is labelled as a corner. This step is described in section 8.10.1 of Haralick and Shapiro[i].

Finally the corners are sorted on the product of the edge strength magnitude and the change of edge direction. The top 200 corners which are separated by at least 5 pixels are output.

2. 3D Surface Generation

2.1 Architecture

In the method described below, it is assumed that the object can be segmented from the background in a set of images completely surrounding the object. Although this restricts the generality of the method, this constraint can often be arranged in practice, particularly for small objects.

The method consists of five processes, which are run consecutively:

First, for all the images in which the camera positions and orientations have been calculated, the object is segmented from the background, using colour information. This produces a set of binary images, where the pixels are marked as being either object or background.

The segmentations are used, together with the camera positions and orientations, to generate a voxel carving, consisting of a 3D grid of voxels enclosing the object. Each of the voxels is marked as being either object or empty space.

The voxel carving is turned into a 3D surface triangulation, using a standard triangulation algorithm (marching cubes).

The number of triangles is reduced substantially bypassing the triangulation through a decimation process.

Finally the triangulation is textured, using appropriate parts of the original images to provide the texturing on the triangles.

2.2 Segmentation

The aim of this process is to segment an object (in front of a reasonably homogeneous coloured background) in an image using colour information. The resulting binary image is used in voxel carving.

Two alternative methods are used:

Method 1: input a single RGB colour value representing the background colour—each RGB pixel in the image is examined and if the Euclidean distance to the background colour (in RGB space) is less than a specified threshold the pixel is labelled as background (BLACK).

Method 2: input a "blue" image containing a representative region of the background.

The algorithm has two stages:
(1) Build a hash table of quantised background colours
(2) Use the table to segment each image.

Step 1) Build Hash Table

Go through each RGB pixel, p, in the "blue" background image.

Set q to be a quantised version of p. Explicitly:

$$q=(p+t/2)/t \qquad \text{A-2}$$

where t is a threshold determining how near RGB values need to be to background colours to be labelled as background.

The quantisation step has two effects:
1) reducing the number of RGB pixel values, thus increasing the efficiency of hashing;
2) defining the threshold for how close a RGB pixel has to be to a background colour pixel to be labelled as background.

q is now added to a hash table (if not already in the table) using the (integer) hashing function $$h(q)=(q\_\text{red} \ \& \ 7)*2^6+(q\_\text{green} \ \& \ 7)*2^3+(q\_\text{blue} \ \& \ 7) \qquad \text{A-3}$$

That is, the 3 least significant bits of each colour field are used. This function is chosen to try and spread out the data into the available bins. Ideally each bin in the hash table has a small number of colour entries. Each quantised colour RGB triple is only added once to the table (the frequency of a value is irrelevant).

Step 2) Segment Each Image

Go through each RGB pixel, v, in each image.

Set w to be the quantised version of v as before.

To decide whether w is in the hash table, explicitly look at all the entries in the bin with index h(w) and see if any of them are the same as w. If yes, then v is a background pixel—set the corresponding pixel in the output image to BLACK. If no then v is a foreground pixel—set the corresponding pixel in the output image to WHITE.

Post Processing: For both methods a post process is performed to fill small holes and remove small isolated regions.

A median filter is used with a circular window. (A circular window is chosen to avoid biasing the result in the x or y directions).

Build a circular mask of radius r. Explicitly store the start and end values for each scan line on the circle.

Go through each pixel in the binary image.

Place the centre of the mask on the current pixel. Count the number of BLACK pixels and the number of WHITE pixels in the circular region.

If(#WHTE pixels≧#BLACK pixels) then set corresponding output pixel to WHITE. Otherwise output pixel is BLACK.

2.3 Voxel Carving

The aim of this process is to produce a 3D voxel grid, enclosing the object, with each of the voxels marked as either object or empty space.

The input to the algorithm is:
a set of binary segmentation images, each of which is associated with a camera position and orientation;
2 sets of 3D co-ordinates, (xmin, ymin, zmin) and (xmax, ymax, zmax), describing the opposite vertices of a cube surrounding the object;

a parameter, n, giving the number of voxels required in the voxel grid.

A preprocessing step calculates a suitable size for the voxels (they are cubes) and the 3D locations of the voxels, using n, (xmin, ymin, zmin) and (xmax, ymax, zmax).

Then, for each of the voxels in the grid, the mid-point of the voxel cube is projected into each of the segmentation images. If the projected point falls onto a pixel which is marked as background, on any of the images, then the corresponding voxel is marked as empty space, otherwise it is marked as belonging to the object.

Voxel carving is described further in "Rapid Octree Construction from Image Sequences" by R. Szeliski in CVGIP: Image Understanding, Volume 58, Number 1, July 1993, pages 23–32.

2.4 Marching Cubes

The aim of the process is to produce a surface triangulation from a set of samples of an implicit function representing the surface (for instance a signed distance function). In the case where the implicit function has been obtained from a voxel carve, the implicit function takes the value −1 for samples which are inside the object and +1 for samples which are outside the object.

Marching cubes is an algorithm that takes a set of samples of an implicit surface (e.g. a signed distance function) sampled at regular intervals on a voxel grid, and extracts a triangulated surface mesh. Lorensen and Cline[iii] and Bloomenthal[iv] give details on the algorithm and its implementation.

The marching-cubes algorithm constructs a surface mesh by "marching" around the cubes while following the zero crossings of the implicit surface f(x)=0, adding to the triangulation as it goes. The signed distance allows the marching-cubes algorithm to interpolate the location of the surface with higher accuracy than the resolution of the volume grid. The marching cubes algorithm can be used as a continuation method (i.e. it finds an initial surface point and extends the surface from this point).

2.5 Decimation

The aim of the process is to reduce the number of triangles in the model, making the model more compact and therefore easier to load and render in real time.

The process reads in a triangular mesh and then randomly removes each vertex to see if the vertex contributes to the shape of the surface or not (i.e. if the hole is filled, is the vertex a "long" way from the filled hole). Vertices which do not contribute to the shape are kept out of the triangulation. This results in fewer vertices (and hence triangles) in the final model.

The algorithm is described below in pseudocode.

```
INPUT
  Read in vertices
  Read in triples of vertex IDs making up triangles
PROCESSING
  Repeat NVERTEX times
    Choose a random vertex, V, which hasn't been chosen before
    Locate set of all triangles having Vas a vertex, S
    Order S so adjacent triangles are next to each other
    Re-triangulate triangle set, ignoring V (i.e. remove selected
      triangles & V and then fill in hole)
    Find the maximum distance between Vand the plane of each
      triangle If (distance < threshold)
    Discard V and keep new triangulation
    Else
    Keep V and return to old triangulation
OUTPUT
```

-continued

```
  Output list of kept vertices
  Output updated list of triangles
```

The process therefore combines adjacent triangles in the model produced by the marching cubes algorithm, if this can be done without introducing large errors into the model.

The selection of the vertices is carried out in a random order in order to avoid the effect of gradually eroding a large part of the surface by consecutively removing neighbouring vertices.

2.6 Further Surface Generation Techniques

Further techniques which may be employed to generate a 3D computer model of an object surface include voxel colouring, for example as described in "Photorealistic Scene Reconstruction by Voxel Coloring" by Seitz and Dyer in Proc. Conf. Computer Vision and Pattern Recognition 1997, p1067–1073, "Plenoptic Image Editing" by Seitz and Kutulakos in Proc. 6th International Conference on Computer Vision, pp 17–24, "What Do N Photographs Tell Us About 3D Shape?" by Kutulakos and Seitz in University of Rochester Computer Sciences Technical Report 680, January 1998, and "A Theory of Shape by Space Carving" by Kutulakos and Seitz in University of Rochester Computer Sciences Technical Report 692, May 1998.

3. Texturing

The aim of the process is to texture each surface polygon (typically a triangle) with the most appropriate image texture. The output of the process is a VRML model of the surface, complete with texture co-ordinates.

The triangle having the largest projected area is a good triangle to use for texturing, as it is the triangle for which the texture will appear at highest resolution.

A good approximation to the triangle with the largest projected area, under the assumption that there is no substantial difference in scale between the different images, can be obtained in the following way.

For each surface triangle, the image "i" is found such that the triangle is the most front facing (i.e. having the greatest value for $\hat{n}_t \cdot \hat{v}_i$, where $\hat{n}_t$ is the triangle normal and $\hat{v}_i$ is the viewing direction for the "i" th camera). The vertices of the projected triangle are then used as texture coordinates in the resulting VRML model.

This technique can fail where there is a substantial amount of self-occlusion, or several objects occluding each other. This is because the technique does not take into account the fact that the object may occlude the selected triangle. However, in practice thus does not appear to be much of a problem.

It has been found that, if every image is used for texturing then this can result in very large VRML models being produced. These can be cumbersome to load and render in real time. Therefore, in practice, a subset of images is used to texture the model. This subset may be specified in a configuration file.

REFERENCES i R M Haralick and L G Shapiro: "Computer and Robot Vision Volume 1", Addison-Wesley, 1992, ISBN 0-201-10877-1 (v.1), section 8.

ii J Foley, A van Dam, S Feiner and J Hughes: "Computer Graphics: Principles and Practice", Addison-Wesley, ISBN 0-201-12110-7.

iii W. E. Lorensen and H. E. Cline: "Marching Cubes: A High Resolution 3D Surface Construction Algorithm", in Computer Graphics, SIGGRAPH 87 proceedings, 21: 163–169, July 1987.

iv J. Bloomenthal: "An Implicit Surface Polygonizer", Graphics Gems IV, AP Professional, 1994, ISBN 0123361559, pp 324–350.

What is claimed is:

1. A method of processing input data defining (i) the positions of features in a sequence of images of at least one object which represent features on the object, (ii) an estimate of a respective camera projection for each image defining the projection of points on the object into the image, and (iii) 3D feature points comprising estimates of the positions in three-dimensions of features on the object represented by the features in the images, to generate output data defining further estimates of the camera projections, the method comprising processing respective subsets of the images in the sequence, each subset comprising a plurality of images, by:

calculating an error for the camera projections of the images in the subset by projecting selected 3D feature points into the images in the subset using the camera projections of the images in the subset and determining the distance between the positions of the projected points and the positions of the corresponding features in the images; and calculating changed positions for at least some of the selected 3D feature points and changed camera projections for the images in the subset by using the positions in the images in the subset of the features which correspond to the selected 3D feature points to determine changed positions for at least some of the selected 3D feature points and changed camera projections for the images in the subset which reduce the calculated error, wherein the respective subsets of images are selected sequentially from the sequence so that each image in the sequence is processed in a subset at least once.

2. A method of processing input data defining (i) the positions of features in a sequence of images of at least one object which represent features on the object, (ii) an estimate of a respective camera projection for each image defining the projection of points on the object into the image, and (iii) 3D feature points comprising estimates of the positions in three-dimensions of features on the object represented by the features in the images, to generate output data defining further estimates of the camera projections, the method comprising processing respective subsets of the images in the sequence by:

calculating an error for the camera projections of the images in the subset by projecting selected 3D feature points into the images in the subset using the camera projections of the images in the subset and determining the distance between the positions of the projected points and the positions of the corresponding features in the images; and calculating changed positions for at least some of the selected 3D feature points and changed camera projections for the images in the subset by using the positions in the images in the subset of the features which correspond to the selected 3D feature points to determine changed positions for at least some of the selected 3D feature points and changed camera projections for the images in the subset which reduce the calculated error, wherein the changed positions for the 3D feature points and the changed camera positions are calculated by reducing the calculated error by performing processing in accordance with a minimization procedure to change iteratively the positions of at least some of the selected 3D feature points and the camera projections of the images in the subset and to calculate an updated error by projecting the 3D feature points from their changed positions into the images in the subset using the changed camera projections of the images in the subset, and determining the distance between the positions of the projected points and the positions of the corresponding features in the images, wherein the respective subsets of images are selected sequentially from the sequence so that each image in the sequence is processed in a subset at least once.

3. A method according to claim 2, wherein the calculated error is reduced by performing processing in accordance with a non-linear least squares minimization procedure.

4. A method according to claim 3, wherein the calculated error is reduced by performing processing in accordance with a Levenberg-Marquardt minimization procedure.

5. A method of processing input data defining (i) the positions of features in a sequence of images of at least one object which represent features on the object, (ii) an estimate of a respective camera projection for each image defining the projection of points on the object into the image, and (iii) 3D feature points comprising estimates of the positions in three-dimensions of features on the object represented by the features in the images, to generate output data defining further estimates of the camera projections, the method comprising processing respective subsets of the images in the sequence by:

calculating an error for the camera projections of the images in the subset by projecting selected 3D feature points into the images in the subset using the camera projections of the images in the subset and determining the distance between the positions of the projected points and the positions of the corresponding features in the images; and calculating changed positions for at least some of the selected 3D feature points and changed camera projections for the images in the subset by using the positions in the images in the subset of the features which correspond to the selected 3D feature points to determine changed positions for at least some of the selected 3D feature points and changed camera projections for the images in the subset which reduce the calculated error, wherein the changed positions for the 3D feature points and the changed camera projections are calculated by decomposing a matrix representing the positions in the images in the subset of the features which correspond to the 3D feature points to be changed into the product of a first matrix representing the changed camera projections of the images in the subset and a second matrix representing the changed positions of the 3D feature points, wherein the respective subsets of images are selected sequentially from the sequence so that each image in the sequence is processed in a subset at least once.

6. A method according to claim 1, wherein the selected 3D feature points used to calculate an error comprise every 3D feature point which corresponds to a feature having a measured position in at least one of the images in the subset being processed.

7. A method of processing input data defining (i) the positions of features in a sequence of images of at least one object which represent features on the object, (ii) an estimate of a respective camera projection for each image defining the projection of points on the object into the image, and (iii)

3D feature points comprising estimates of the positions in three-dimensions of features on the object represented by the features in the images, to generate output data defining further estimates of the camera projections, the method comprising processing respective subsets of the images in the sequence by:

calculating an error for the camera projections of the images in the subset by projecting selected 3D feature points into the images in the subset using the camera projections of the images in the subset and determining the distance between the positions of the projected points and the positions of the corresponding features in the images; and calculating changed positions for at least some of the selected 3D feature points and changed camera projections for the images in the subset by using the positions in the images in the subset of the features which correspond to the selected 3D feature points to determine changed positions for at least some of the selected 3D feature points and changed camera projections for the images in the subset which reduce the calculated error, wherein the 3D feature points for which changed positions are calculated comprise every 3D feature point which has a measured position in at least one of the images in the subset being processed but no measured position in any of the other images in the sequence, wherein the respective subsets of images are selected sequentially from the sequence so that each image in the sequence is processed in a subset at least once.

8. A method according to claim 1, wherein each respective subset contains the same number of images.

9. A method of processing input data defining (i) the positions of features in a sequence of images of at least one object which represent features, on the object, (ii) an estimate of a respective camera projection for each image defining the projection of points on the object into the image, and (iii) 3D feature points comprising estimates of the positions in three-dimensions of features on the object represented by the features in the images, to generate output data defining further estimates of the camera projections, the method comprising processing respective subsets of the images in the sequence by:

calculating an error for the camera projections of the images in the subset by projecting selected 3D feature points into the images in the subset using the camera projections of the images in the subset and determining the distance between the positions of the projected points and the positions of the corresponding features in the images; and calculating changed positions for at least some of the selected 3D feature points and changed camera projections for the images in the subset by using the positions in the images in the subset of the features which correspond to the selected 3D feature points to determine changed positions for at least some of the selected 3D feature points and changed camera projections for the images in the subset which reduce the calculated error, wherein the respective subsets of images are selected sequentially from the sequence so that each image in the sequence is processed in a subset at least once and wherein the number of images in a subset is set in dependence upon the number of features in the images having a position defined in the data to be processed.

10. A method of processing input data defining (i) the positions of features in a sequence of images of at least one object which represent features on the object, (ii) an estimate of a respective camera projection for each image defining the projection of points on the object into the image, and (iii) 3D feature points comprising estimates of the positions in three-dimensions of features on the object represented by the features in the images, to generate output data defining further estimates of the camera projections, the method comprising processing respective subsets of the images in the sequence by:

calculating an error for the camera projections of the images in the subset by projecting selected 3D feature points into the images in the subset using the camera projections of the images in the subset and determining the distance between the positions of the projected points and the positions of the corresponding features in the images; and calculating changed positions for at least some of the selected 3D feature points and changed camera projections for the images in the subset by using the positions in the images in the subset of the features which correspond to the selected 3D feature points to determine changed positions for at least some of the selected 3D feature points and changed camera projections for the images in the subset which reduce the calculated error, wherein the respective subsets of images are selected from the sequence with an overlap and such that each image in the sequence is processed in a subset at least once.

11. A method according to claim 1, further comprising the step of generating a signal conveying the further estimates of the camera projections.

12. A method according to claim 11, further comprising the step of recording the signal either directly or indirectly.

13. A method according to claim 1, further comprising the step of processing image data defining the images in the sequence to generate the input data.

14. A method according to claim 1, further comprising the step of using the further estimates of the camera projections to generate data defining a 3D computer model of the scene in the images.

15. A method according to claim 14, further comprising the step of generating a signal conveying the 3D computer model.

16. A method according to claim 15, further comprising the step of recording the signal either directly or indirectly.

17. An apparatus for processing input data defining (i) the positions of features in a sequence of images of at least one object which represent features on the object, (ii) an estimate of a respective camera projection for each image defining the projection of points on the object into the image, and (iii) 3D feature points comprising estimates of the positions in three-dimensions of features on the object represented by the features in the images, to generate output data defining further estimates of the camera projections, comprising a processor for processing respective subsets of the images in the sequence, each subset comprising a plurality of images, by:

calculating an error for the camera projections of the images in the subset by projecting selected 3D feature points into the images in the subset using the camera projections of the images in the subset and determining the distance between the positions of the projected points and the positions of the corresponding features in the images; and calculating changed positions for at least some of the selected 3D feature points and changed camera projections for the images in the subset by using the positions in the images in the subset of the features which correspond to the selected 3D feature points to determine changed positions for at least some of the selected 3D feature points and changed camera projections for the images in the subset which reduce the calculated error, wherein the processor is arranged to process respective subsets of images from the sequence sequentially such that each image in the sequence is processed in a subset at least once.

18. An apparatus for processing input data defining (i) the positions of features in a sequence of images of at least one object which represent features on the object, (ii) an estimate of a respective camera projection for each image defining the projection of points on the object into the image, and (iii) 3D feature points comprising estimates of the positions in three-dimensions of features on the object represented by the features in the images, to generate output data defining further estimates of the camera projections, comprising a processor for processing respective subsets of the images in the sequence by:

calculating an error for the camera projections of the images in the subset by projecting selected 3D feature points into the images in the subset using the camera projections of the images in the subset and determining the distance between the positions of the projected points and the positions of the corresponding features in the images; and calculating changed positions for at least some of the selected 3D feature points and changed camera projections for the images in the subset by using the positions in the images in the subset of the features which correspond to the selected 3D feature points to determine changed positions for at least some of the selected 3D feature points and changed camera projections for the images in the subset which reduce the calculated error, wherein the processor is arranged to calculate the changed positions for the 3D feature points and the changed camera positions by reducing the calculated error by performing processing in accordance with a minimization procedure to change iteratively the positions of at least some of the selected 3D feature points and the camera projections of the images in the subset and to calculate an updated error by projecting the 3D feature points from their changed positions into the images in the subset using the changed camera projections of the images in the subset, and determining the distance between the positions of the projected points and the positions of the corresponding features in the images, wherein the processor is arranged to process respective subsets of images from the sequence sequentially such that each image in the sequence is processed in a subset at least once.

19. An apparatus according to claim 18, wherein the processor is arranged to reduce the calculated error by performing processing in accordance with a non-linear least squares minimization procedure.

20. An apparatus according to claim 19, wherein the processor is arranged to reduce the calculated error by performing processing in accordance with a Levenberg-Marquardt minimization procedure.

21. An apparatus for processing input data defining (i) the positions of features in a sequence of images of at least one object which represent features on the object, (ii) an estimate of a respective camera projection for each image defining the projection of points on the object into the image, and (iii) 3D feature points comprising estimates of the positions in three-dimensions of features on the object represented by the features in the images, to generate output data defining further estimates of the camera projections, comprising a processor for processing respective subsets of the images in the sequence by:

calculating an error for the camera projections of the images in the subset by projecting selected 3D feature points into the images in the subset using the camera projections of the images in the subset and determining the distance between the positions of the projected points and the positions of the corresponding features in the images; and calculating changed positions for at least some of the selected 3D feature points and changed camera projections for the images in the subset by using the positions in the images in the subset of the features which correspond to the selected 3D feature points to determine changed positions for at least some of the selected 3D feature points and changed camera projections for the images in the subset which reduce the calculated error, wherein the processor is arranged to calculate the changed positions for the 3D feature points and the changed camera projections by decomposing a matrix representing the positions in the images in the subset of the features which correspond to the 3D feature points to be changed into the product of a first matrix representing the changed camera projections of the images in the subset and a second matrix representing the changed positions of the 3D feature points, wherein the processor is arranged to process respective subsets of images from the sequence sequentially such that each image in the sequence is processed in a subset at least once.

22. An apparatus according to claim 17, wherein the processor is arranged to perform processing so that the selected 3D feature points used to calculate an error comprise every 3D feature point which corresponds to a feature having a measured position in at least one of the images in the subset being processed.

23. An apparatus for processing input data defining (i) the positions of features in a sequence of images of at least one object which represent features on the object, (ii) an estimate of a respective camera projection for each image defining the projection of points on the object into the image, and (iii) 3D feature points comprising estimates of the positions in three-dimensions of features on the object represented by the features in the images, to generate output data defining further estimates of the camera projections, comprising a processor for processing respective subsets of the images in the sequence by:

calculating an error for the camera projections of the images in the subset by projecting selected 3D feature points into the images in the subset using the camera projections of the images in the subset and determining the distance between the positions of the projected points and the positions of the corresponding features in the images; and calculating changed positions for at least some of the selected 3D feature points and changed camera projections for the images in the subset by using the positions in the images in the subset of the features which correspond to the selected 3D feature points to determine changed positions for at least some of the selected 3D feature points and changed camera projections for the images in the subset which reduce the calculated error, wherein the processor is arranged to perform processing so that the 3D feature points for which changed positions are calculated comprise every 3D feature point which has a measured position in at least one of the images in the subset being processed but no measured position in any of the other images in the sequence, wherein the processor is arranged to process respective subsets of images from the sequence sequentially such that each image in the sequence is processed in a subset at least once.

24. An apparatus according to claim 17, wherein the processor is arranged to perform processing so that each respective subset contains the same number of images.

25. An apparatus for processing input data defining (i) the positions of features in a sequence of images of at least one object which represent features on the object, (ii) an estimate of a respective camera projection for each image defining the projection of points on the object into the image, and (iii) 3D feature points comprising estimates of the positions in three-dimensions of features on the object represented by the features in the images, to generate output data defining further estimates of the camera projections, comprising a processor for processing respective subsets of the images in the sequence by:

calculating an error for the camera projections of the images in the subset by projecting selected 3D feature points into the images in the subset using the camera projections of the images in the subset and determining the distance between the positions of the projected points and the positions of the corresponding features in the images; and calculating changed positions for at least some of the selected 3D feature points and changed camera projections for the images in the subset by using the positions in the images in the subset of the features which correspond to the selected 3D feature points to determine changed positions for at least some of the selected 3D feature points and changed camera projections for the images in the subset which reduce the calculated error, wherein the processor is arranged to process respective subsets of images from the sequence sequentially such that each image in the sequence is processed in a subset at least once and wherein the processor is arranged to perform processing so that the number of images in a subset is set in dependence upon the number of features in the images having a position defined in the data to be processed.

26. An apparatus for processing input data defining (i) the positions of features in a sequence of images of at least one object which represent features on the object, (ii) an estimate of a respective camera projection for each image defining the projection of points on the object into the image, and (iii) 3D feature points comprising estimates of the positions in three-dimensions of features on the object represented by the features in the images, to generate output data defining further estimates of the camera projections, comprising a processor for processing respective subsets of the images in the sequence by:

calculating an error for the camera projections of the images in the subset by projecting selected 3D feature points into the images in the subset using the camera projections of the images in the subset and determining the distance between the positions of the projected points and the positions of the corresponding features in the images; and calculating changed positions for at least some of the selected 3D feature points and changed camera projections for the images in the subset by using the positions in the images in the subset of the features which correspond to the selected 3D feature points to determine changed positions for at least some of the selected 3D feature points and changed camera projections for the images in the subset which reduce the calculated error, wherein the processor is arranged to perform processing so that the respective subsets of images are selected from the sequence with an overlap and such that each image in the sequence is processed in a subset at least once.

27. An apparatus according to claim 17, further comprising an input data generator for processing image data defining the images in the sequence to generate the input data.

28. An apparatus according to claim 17, further comprising a 3D computer model data generator for using the further estimates of the camera projections to generate data defining a 3D computer model of the scene in the images.

29. A storage device storing instructions for causing a programmable processing apparatus to become operable to perform a method as set out in at least one of claims 1 to 16.

30. A physically-embodied computer program product carrying computer program instructions for programming a programmable processing apparatus to become operable to perform a method as set out in any one of claims 1 to 16.

31. An apparatus for processing input data defining (i) the positions of features in a sequence of images of at least one object which represent features on the object, (ii) an estimate of a respective camera projection for each image defining the projection of points on the object into the image, and (iii) 3D feature points comprising estimates of the positions in three-dimensions of features on the object represented by the features in the images, to generate output data defining further estimates of the camera projections, comprising processing means for processing respective subsets of the images in the sequence, each subset comprising a plurality of images, by:

calculating an error for the camera projections of the images in the subset by projecting selected 3D feature points into the images in the subset using the camera projections of the images in the subset and determining the distance between the positions of the projected points and the positions of the corresponding features in the images; and calculating changed positions for at least some of the selected 3D feature points and changed camera projections for the images in the subset by using the positions in the images in the subset of the features which correspond to the selected 3D feature points to determine changed positions for at least some of the selected 3D feature points and changed camera projections for the images in the subset which reduce the calculated error, wherein the processing means is arranged to process respective subsets of images from the sequence sequentially such that each image in the sequence is processed in a subset at least once.

32. A method of processing data defining (i) the positions of features in a sequence of images of at least one object which represent features on the object, (ii) an estimate of a respective camera projection for each image defining the projection of points on the object into the image, and (iii) 3D feature points comprising estimates of the positions in three-dimensions of features on the object represented by the features in the images, to generate output data defining further estimates of the camera projections, the method comprising processing respective subsets of the images in the sequence, each subset comprising a plurality of images, by:

calculating an error for the camera projections of the images in the subset by projecting 3D feature points into the images in the subset using the camera projections of the images in the subset and determining the distance between the positions of the projected points and the positions of the corresponding features in the images; and calculating changed 3D positions for at least some of the 3D feature points that were projected and changed camera projections for at least some of the images in the subset by using the positions in the images in the subset of the features which correspond to the 3D feature points that were projected to determine changed 3D positions for at least some of the 3D feature points that were projected and changed camera projections for at least some of the images in the subset which reduce the calculated error, wherein the respective subsets of images are selected sequentially from the sequence so that each image in the sequence is processed in a subset at least once.

33. An apparatus for processing data defining (i) the positions of features in a sequence of images of at least one object which represent features on the object, (ii) an estimate of a respective camera projection for each image defining the projection of points on the object into the image, and (iii) 3D feature points comprising estimates of the positions in three-dimensions of features on the object represented by the features in the images, to generate output data defining further estimates of the camera projections, comprising a processor operable to process respective subsets of the images in the sequence, each subset comprising a plurality of images, by:

calculating an error for the camera projections of the images in the subset by projecting 3D feature points into the images in the subset using the camera projections of the images in the subset and determining the distance between the positions of the projected points and the positions of the corresponding features in the images; and calculating changed 3D positions for at least some of the 3D feature points that were projected and changed camera projections for at least some of the images in the subset by using the positions in the images in the subset of the features which correspond to the 3D feature points that were projected to determine changed 3D positions for at least some of the 3D feature points that were projected and changed camera projections for at least some of the images in the subset which reduce the calculated error, wherein the processor is arranged to process respective subsets of images from the sequence sequentially such that each image in the sequence is processed in a subset at least once.

34. An apparatus for processing data defining (i) the positions of features in a sequence of images of at least one object which represent features on the object, (ii) an estimate of a respective camera projection for each image defining the projection of points on the object into the image, and (iii) 3D feature points comprising estimates of the positions in three-dimensions of features on the object represented by the features in the images, to generate output data defining further estimates of the camera projections, comprising processing means for processing respective subsets of the images in the sequence, each subset comprising a plurality of images, by:

calculating an error for the camera projections of the images in the subset by projecting 3D feature points into the images in the subset using the camera projections of the images in the subset and determining the distance between the positions of the projected points and the positions of the corresponding features in the images; and calculating changed 3D positions for at least some of the 3D feature points that were projected and changed camera projections for at least some of the images in the subset by using the positions in the images in the subset of the features which correspond to the 3D feature points that were projected to determine changed 3D positions for at least some of the 3D feature points that were projected and changed camera projections for at least some of the images in the subset which reduce the calculated error, wherein the processing means is arranged to process respective subsets of images from the sequence sequentially such that each image in the sequence is processed in a subset at least once.

35. A storage device storing computer program instructions for programming a programmable processing apparatus to become operable to perform a method as set out in claim 32.

36. A physically-embodied computer program product carrying computer program instructions for programming a programmable processing apparatus to become operable to perform a method as set out in claim 32.

* * * * *